United States Patent [19]

Dummermuth et al.

[11] 4,442,504

[45] Apr. 10, 1984

[54] MODULAR PROGRAMMABLE CONTROLLER

[75] Inventors: Ernst H. Dummermuth, Chesterland; Daniel J. Galdun, Huntsburg; Raymond A. Grudowski, South Euclid; Daniel L. Stewart, Parma, all of Ohio

[73] Assignee: Allen-Bradley Company, Milwaukee, Wis.

[21] Appl. No.: 313,365

[22] Filed: Oct. 21, 1981

Related U.S. Application Data

[63] Continuation-in-part of Ser. No. 241,723, Mar. 9, 1981, abandoned.

[51] Int. Cl.³ .......................... G06F 7/00; G06F 9/30
[52] U.S. Cl. .................................................. 364/900
[58] Field of Search ... 364/200 MS File, 900 MS File, 364/136

[56] References Cited

U.S. PATENT DOCUMENTS

| | | | |
|---|---|---|---|
| 3,686,639 | 8/1972 | Fletcher et al. | 364/200 |
| 3,921,146 | 11/1975 | Danco | 364/900 |
| 3,942,158 | 3/1976 | Dummermuth | 364/900 |
| 4,215,397 | 7/1980 | Hom | 364/200 X |
| 4,217,658 | 8/1980 | Henry et al. | 364/900 |
| 4,249,248 | 2/1981 | Yomogida et al. | 364/900 |
| 4,266,281 | 5/1981 | Struger et al. | 364/900 |
| 4,307,447 | 12/1981 | Provanzano et al. | 364/200 |

*Primary Examiner*—Thomas M. Heckler
*Attorney, Agent, or Firm*—Barry E. Sammons

[57] ABSTRACT

A programmable controller is formed by connecting separate functional modules to a common backplane bus. A bus arbitration scheme and a message handling technique are disclosed to tightly couple the functional modules together to form an efficient programmable controller. A number of improvements to the CPU module and I/O scanner module are disclosed to further improve the performance of the resulting system.

17 Claims, 41 Drawing Figures

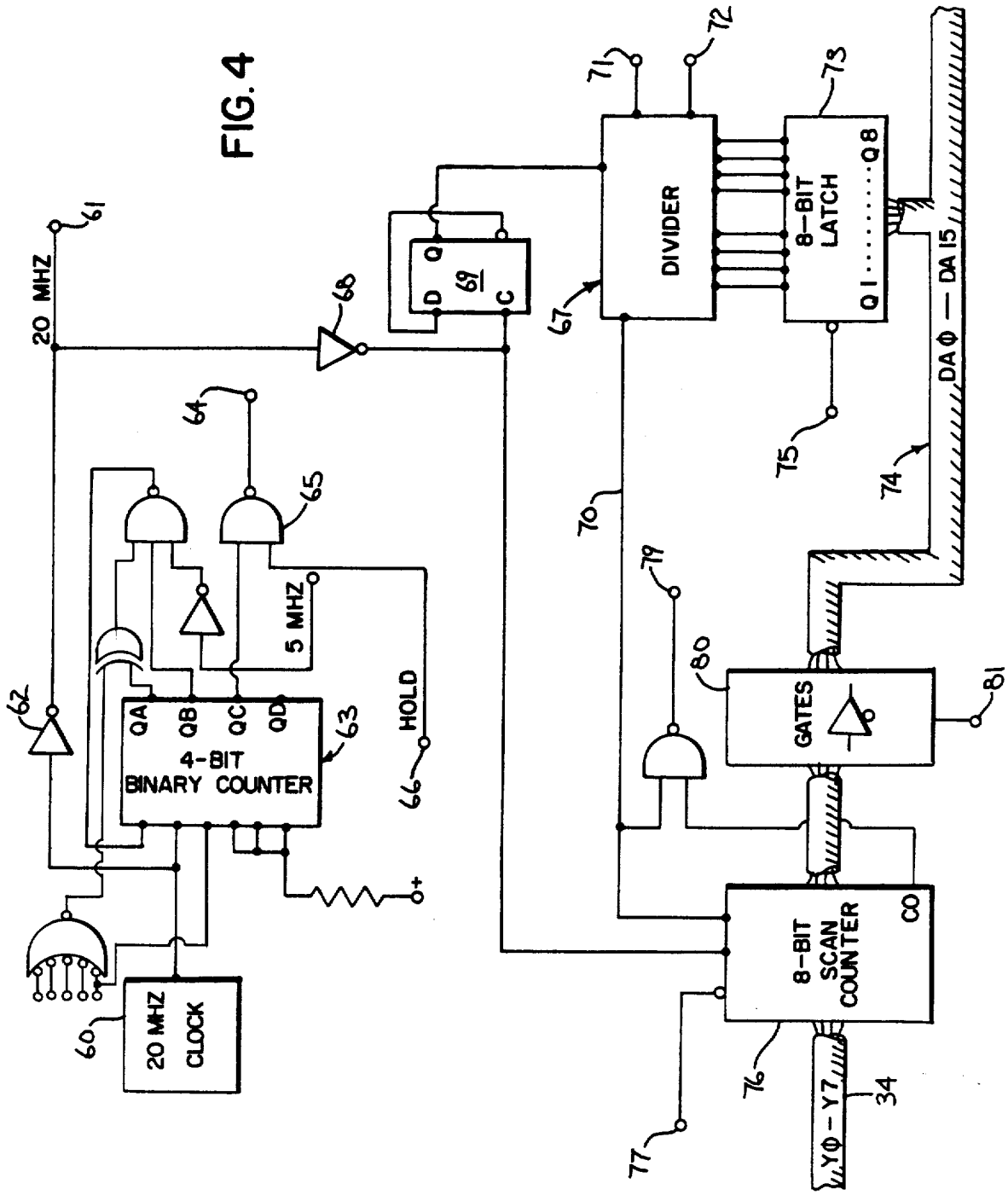

| FIELD DESCRIPTION | MICRO-SEQUENCER INSTRUCTION | SOURCE FOR JUMP | ALU INTERNAL SOURCE | ALU FUNCTION | ALU INTERNAL DESTINATION | ALU RAM "B" ADDRESS | SOURCE FOR ALU PORT 27 | ALU Y PORT 30 DESTINATION | SOURCE FOR ALU PORT 28 | READ/WRITE CONTROL | CARRY CONTROL |
|---|---|---|---|---|---|---|---|---|---|---|---|
| MICRO BIT NO. | 0 1 2 3 | 4 5 6 7 | 8 9 10 11 | 12 13 14 15 | 16 17 18 19 | 20 21 22 23 | 24 25 26 27 | 28 29 30 31 | 32 33 34 | 35 36 37 | 38 39 |
| 0 | JUMP 3 | PIPE | R=A, S=B | | RAn | B REG. 0 | INSTR | NOP | NOP | NOP | ZER |
| 1 | CONT | ALU16 | R=A, S=DB | S-R-I+Cn | RLn | B REG. 1 | INSTR | ASDR | NOP | HOLD | ONE |
| 2 | LOOP | MACRO | R=A, S=Q | R-S-I+Cn | RAnQ | B REG. 2 | DATA | BACK L | NOP | NOP | ZFL |
| 3 | LOAD | NOP | R=A, S=Q | R+S+Cn | RLnQ | B REG. 3 | RAM | FETH I | NOP | NOP | CAR |
| 4 | IMPOP | IVECT | R=DA, S=B | S+Cn | SnP | B REG. 4 | BFLOP | BACKH | IMM | BWH | |
| 5 | RET | ALU | R=DA, S=DB | S+Cn | QR | B REG. 5 | BFLOP | FETCH | IMM | BRH | |
| 6 | AGAIN | MAP | R=DA, S=Q | R+Cn | Q | B REG. 6 | TIME | DATA | MASK | WRITE | |
| 7 | BACK | VECT | R=DA, S=0 | R+Cn | SnQ | B REG. 7 | TIME | BACK D | N MASK | READ | |
| 8 | JUMP 2 | | | LOW | L An | B REG. 8 | FLAGS | NOP | | BACK W | |
| 9 | VECT | | | R AND S | L Ln | B REG. 9 | FLAGS | NOP | | BACK R | |
| A | CALL 2 | | | R XNOR S | L AnQ | B REG. 10 | NOP | IRES | | | |
| B | PUSH | | | R XOR S | L LnQ | B REG. 11 | NOP | SYST | | | |
| C | JUMP | | | R AND S | N | B REG. 12 | NOP | TIME | | | |
| D | MAP | | | R NOR S | QL | B REG. 13 | NOP | I MASK | | | |
| E | CALL | | | R NAND S | X | B REG. 14 | NOP | I LOAD | | | |
| F | RESET | | | R OR S | Sn | B REG. 15 | | | | | |
| HEXADECIMAL VALUE OF MICROFIELD | EXTERNAL ACCESS ENABLE | (MACRO FLAG LATCH ENABLE) | | | | | OR ALU RAM "A" REGISTERS | | | | |

FIG. 5B

| FIELD DESCRIPTION | IMMEDIATE DATA | |
|---|---|---|
| | CONDITION | TARGET ADDRESS |
| MICRO BIT NO | 40 41 42 43 | 44 45 46 47 48 49 50 51 52 53 54 55 |
| 0 | TRUE | |
| 1 | FALSE | |
| 2 | INTER | |
| 3 | NOP | |
| 4 | NOP | |
| 5 | NOP | |
| 6 | NOP | |
| 7 | NOP | |
| 8 | CARRY | |
| 9 | N CARR | |
| A | OVER | |
| B | N OVER | |
| C | MINUS | |
| D | PLUS | |
| E | ZERO | |
| F | N ZERO | |

HEXADECIMAL VALUE OF MICROFIELD

FIG.19A

| ID WORD | | | | |
|---|---|---|---|---|
| REMOTE ACCESS REQUEST COUNTER | | | OUTPUTS RESET REQUEST COUNTER | |
| F1 | FREEZE COUNTER | F2 | SYNCHRONOUS FREEZE COUNTER | |
| ON-LINE EDITING DATA | | | | |
| REMOTE DEVELOPEMENT DATA | | | | |
| MINOR FAULT FLAGS | | | | |
| SYSTEM MAJOR FAULT FLAGS | | | | |
| USER MAJOR FAULT FLAGS | | | | |
| SYSTEM MODE DATA | | | | |
| I/O PRESCAN COUNTER | | | DESIRED CONTEXT | ACTUAL CONTEXT |
| | | | | |
| CPU COMMAND DATA | | | | |
| CPU WATCHDOG SET POINT | | CPU WATCHDOG HIGH VALVE | | |
| SYSTEM COUNTER | | CPU WATCHDOG PRESENT VALVE | | |
| YEAR | | | | |
| MONTH | | | | |
| DAY | | | | |
| HOUR | | | | |
| MINUTE | | | | |
| SECOND | | | | |
| REAL TIME CLOCK STATUS DATA | | | | |

608, 610, 606, 620

ACCESS CONTROL BLOCK

| X | S | A | B | C |
|---|---|---|---|---|
| P | ACCESS COUNTER | | MSB OF POINTER | |
| LSB OF POINTER | | | | |
| | | | MSB OF SIZE | |
| LSB OF DATA SECTION SIZE | | | | |

FIG. 20A
RUNG CONTROL INSTRUCTIONS
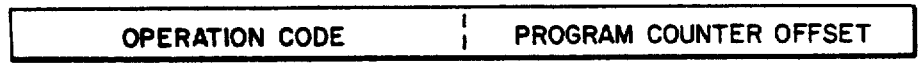
FIG. 20B
PROGRAM CONTROL INSTRUCTIONS
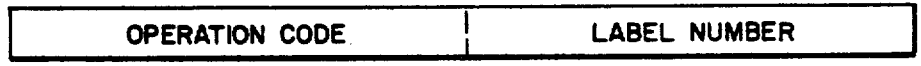
FIG. 20C
TEST/CONTROL BIT INSTRUCTIONS
FIG. 20D
TIMER/COUNTER INSTRUCTIONS
FIG. 20E
ARITHMETIC/LOGIC INSTRUCTIONS

FIG. 21
OPERAND ADDRESS STRUCTURE
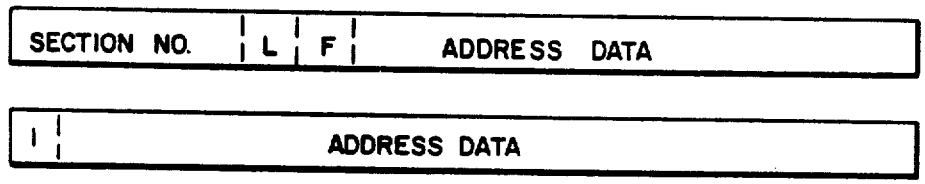
FIG. 22
FILE CONTROL WORD STRUCTURE
COMPLETE
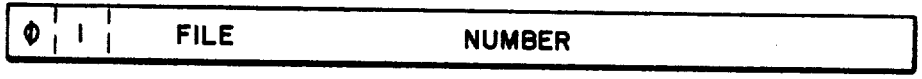
DISTRIBUTED COMPLETE
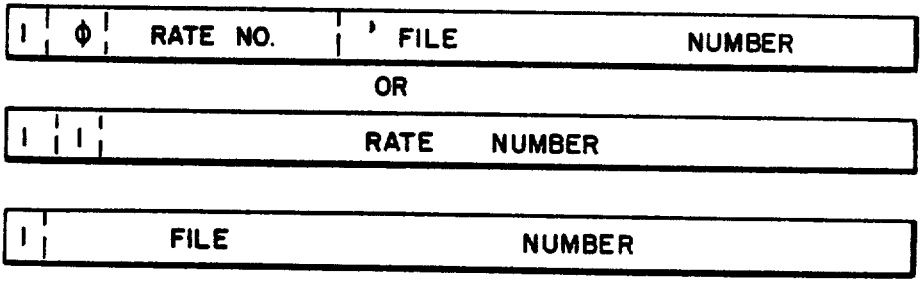
FIG. 23
TIMER/COUNTER STRUCTURE
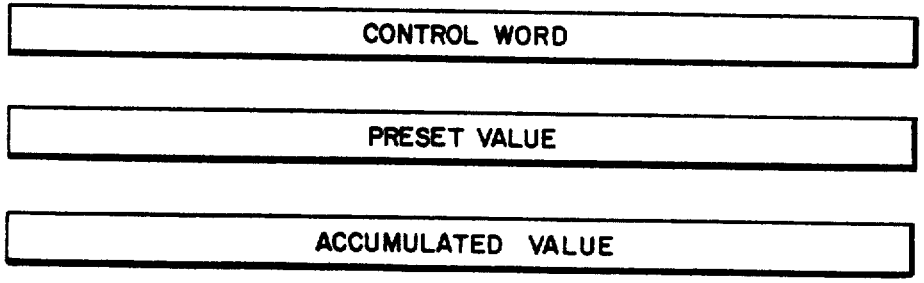

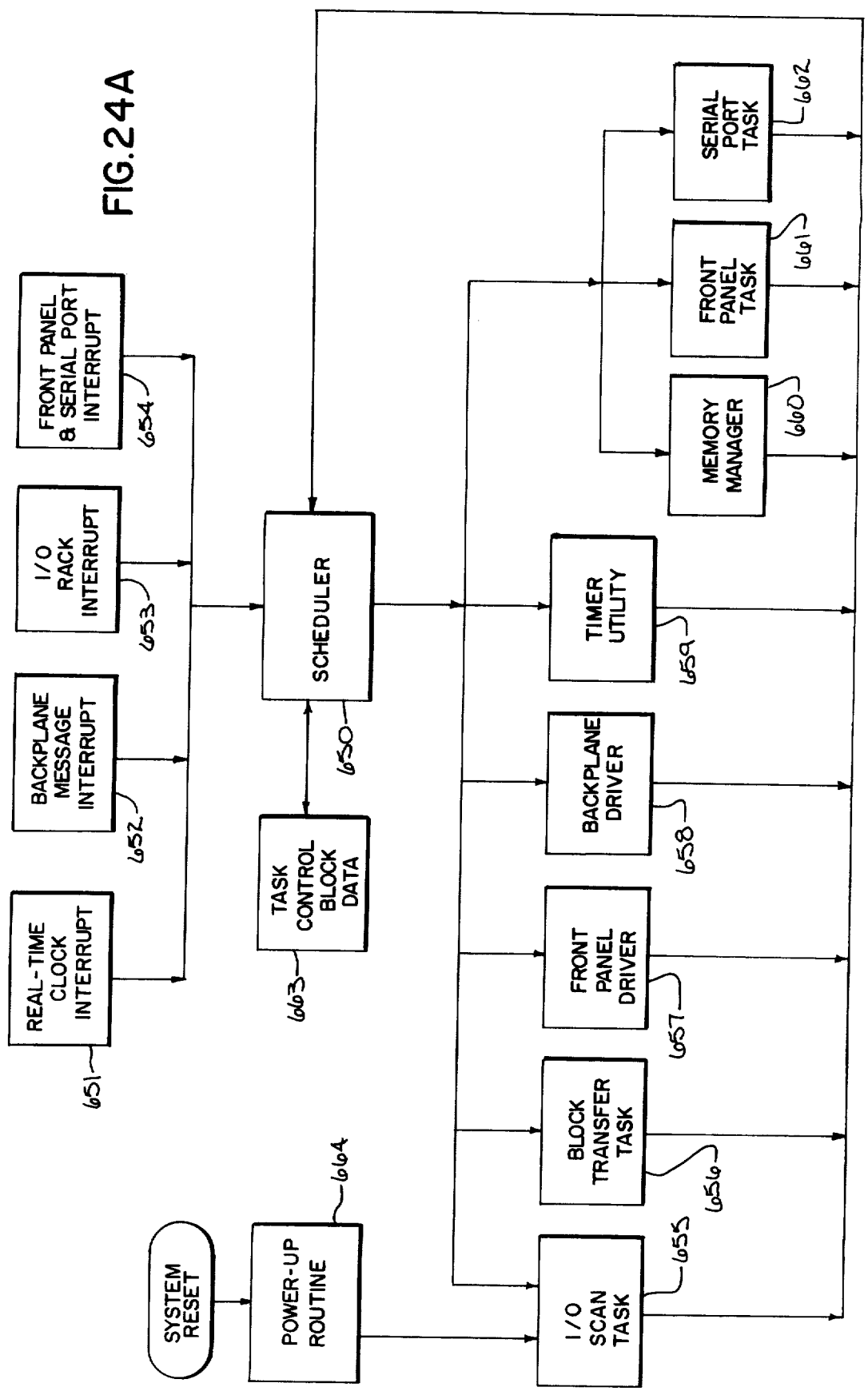

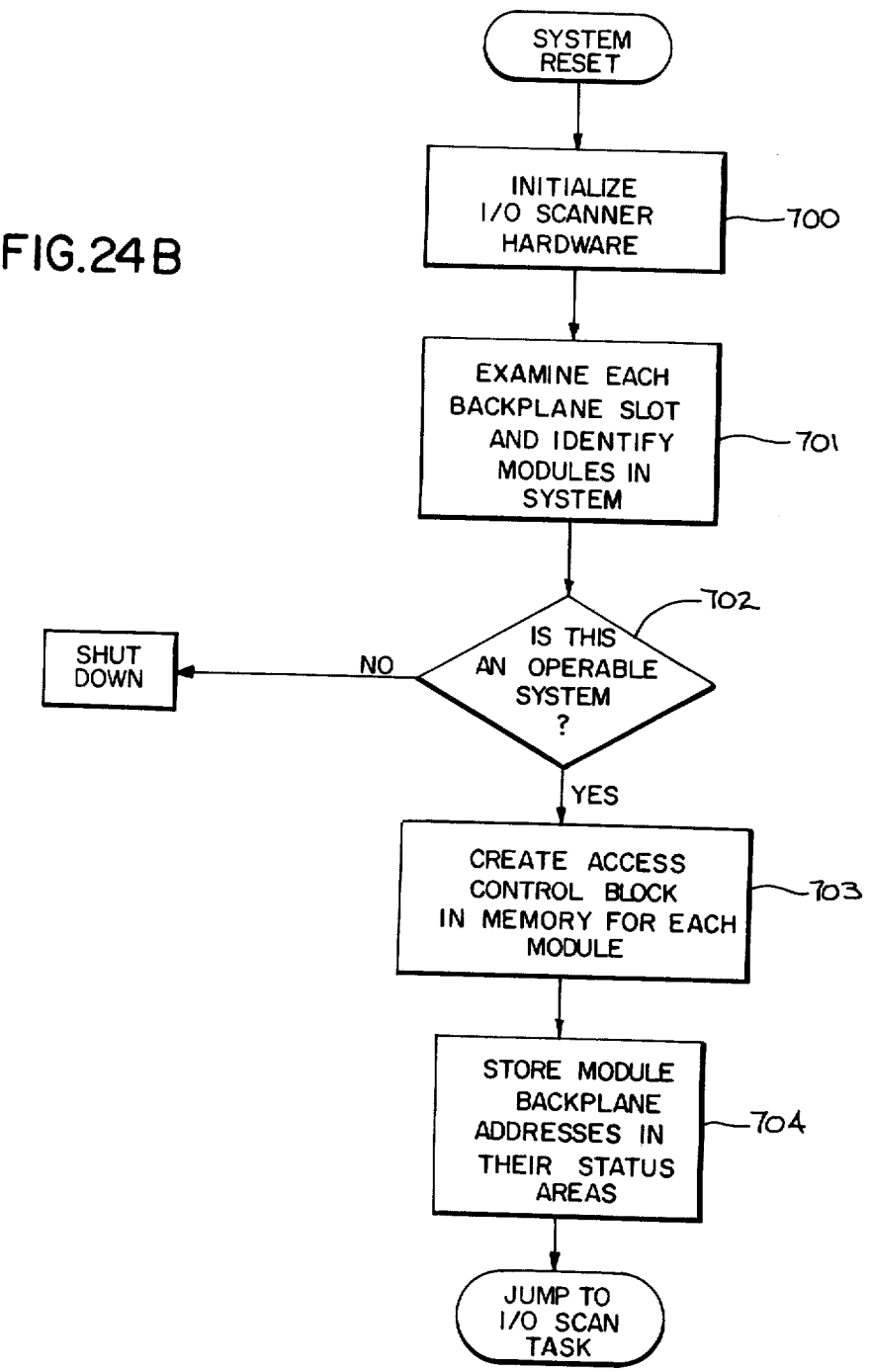

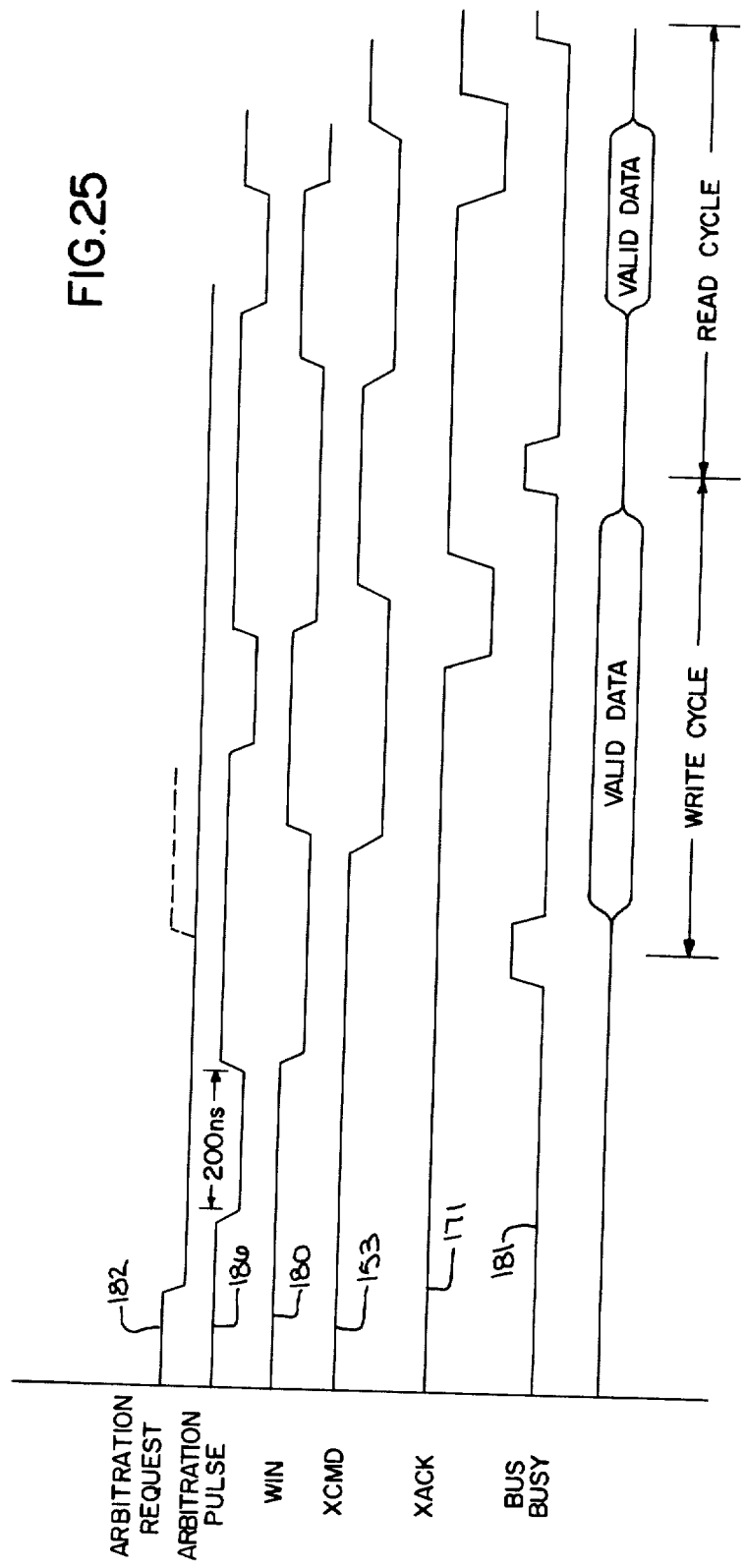

MODULAR PROGRAMMABLE CONTROLLER

RELATED APPLICATIONS

This is a continuation-in-part application of Ser. No. 241,723 which was filed on Mar. 9, 1981 and which is entitled "Programmable Controller With Multiple Processor Modules", now abandoned.

BACKGROUND OF THE INVENTION

The field of the invention is programmable controllers such as those described in U.S. Pat. Nos. 3,810,118; 3,942,158; and 4,165,534.

Programmable controllers are typically connected to industrial equipment such as assembly lines and machine tools to sequentially operate the equipment in accordance with a stored program. In programmable controllers such as those disclosed in the above cited patents, for example, the control program is stored in a memory and includes instructions which are read out in rapid sequence to examine the condition of selected sensing devices on the controlled equipment and instructions which energize or deenergize selected operating devices on the controlled equipment contingent upon the status of one or more of the examined sensing devices.

The processor in a programmable controller is designed to rapidly execute programmable controller type instructions which call for the manipulation of single-bit input data and the control of single-bit output data. The length of the control program, and hence the complexity of the system to be controlled, must be limited to insure that the entire control program can be executed, or scanned, within a set time. Such time limits are required to insure that the programmable controller will provide virtually instantaneous response to any change in the status of sensing devices on the controlled system. Therefore, the speed with which a controller processor can execute programmable controller instructions has a direct bearing on the size of the machine or process which it can effectively control.

Not only should a programmable controller processor be able to execute Boolean expressions rapidly, but it also should be able to execute certain well known programmable controller type instructions. Such instructions have become quite standardized in the industry in terms of the functions they perform and they are directly associated with elements of a ladder diagram which is easily understood by control engineers. Program panels such as those disclosed in U.S. Pat. Nos. 3,798,612 and 3,813,649 and in U.S. Pat. No. 4,070,702 have also been developed to assist the user in developing and editing a control program comprised of such programmable controller type instructions.

Another requirement of programmable controllers is that they be flexible in terms of the number and types of I/O devices with which they will operate. There are numerous types of input devices available ranging from simple switches to a variety of analog to digital converter devices. Similarly, output devices range from simple lights and solenoids to a wide variety of digital to analog conversion devices. A programmable controller should be flexible enough to handle all types of I/O devices and should be easily expandable to handle large numbers of such I/O devices.

SUMMARY OF THE INVENTION

The present invention relates to a programmable controller which is comprised of a plurality of functional modules connected together through a common backplane bus. Such modules include a memory module which stores the control program, system status data and module status data, and which serves as a means for coordinating the functions of the other modules. A CPU module connects to the backplane bus and executes control instructions stored in the memory module. To increase its execution speed, the CPU module includes its own high speed memory for storage of frequently used I/O data.

A general object of the invention is to provide a programmable controller which rapidly and efficiently executes lengthy control programs to operate a large number of I/O devices. This is achieved by a set of separately functioning modules which each perform selected functions and which communicate with one another over a common backplane bus.

Another general object of the invention is to provide a flexible programmable controller system in which size and capabilities can be varied by the selection of appropriate functional modules. The programmable controller may include one or more I/O scanner modules which function to couple data between the I/O devices and the CPU module. In addition, the programmable controller can be connected to a high speed serial data link by adding a communications network interface module and a peripheral processor module may be added to perform special functions. The numbers and types of modules, including the memory module, may be selected to accommodate a wide range of applications. Regardless of the number and type of modules used, during system power-up, status areas in the memory module are automatically initialized to reflect the selected hardware configuration.

An object of the invention is to increase the speed at which the CPU module executes the control program. In addition to the high speed memory on the CPU module, the CPU module includes means for prefetching control program instructions from the memory module. This insures a constant supply of control instructions and thus minimizes the instances in which the CPU module must wait for access to the backplane bus to obtain the next control instruction.

A more specific object of the invention is to provide an I/O scanner module which quickly updates changes in I/O status while it performs a "refresh" scan of all I/O devices. System reliability is maintained by continuously coupling data between an I/O image table and the I/O circuits. Superimposed on this I/O refresh function, however, is the detection of changes to I/O information and the immediate coupling of those changes to provide a rapid response despite the large number of I/O devices being serviced.

Another object of the invention is to provide rapid communication of message data between the asynchronously operating functional modules. This is accomplished through message blocks which are stored in the memory module for each functional module in the system. Such message blocks store a backplane address which may be read by sending modules and employed to interrupt a receiving module, and message address data which is ready by the interrupted receiving module to determine where the incoming message is located.

The foregoing and other objects and advantages of the present invention will become apparent from the following description of the preferred embodiment. Such embodiment does not necessarily represent the full scope of the invention, however, and reference is made to the claims for interpreting the breadth of the invention.

BRIEF DESCRIPTION OF THE DRAWINGS

FIG. 4 is an electrical schematic diagram of the time base and watchdog timer which forms part of the circuit of FIG. 2;

FIGS. 5A and 5B are a chart of the CPU module microfields;

FIGS. 19A-19D are schematic representations of data structures which form a part of the memory module in FIG. 1;

FIGS. 20A-20E and 21-23 are schematic representations of data structures which are employed to execute selected control program instructions;

FIGS. 24A, 24B, and 24C are charts illustrating the functions performed by the I/O scanner module of FIG. 1;

FIG. 25 is a timing diagram which illustrates a write cycle and a read cycle on the system backplane bus which forms part of the system of FIG. 1.

DESCRIPTION OF THE PREFERRED EMBODIMENT

Figure 1:
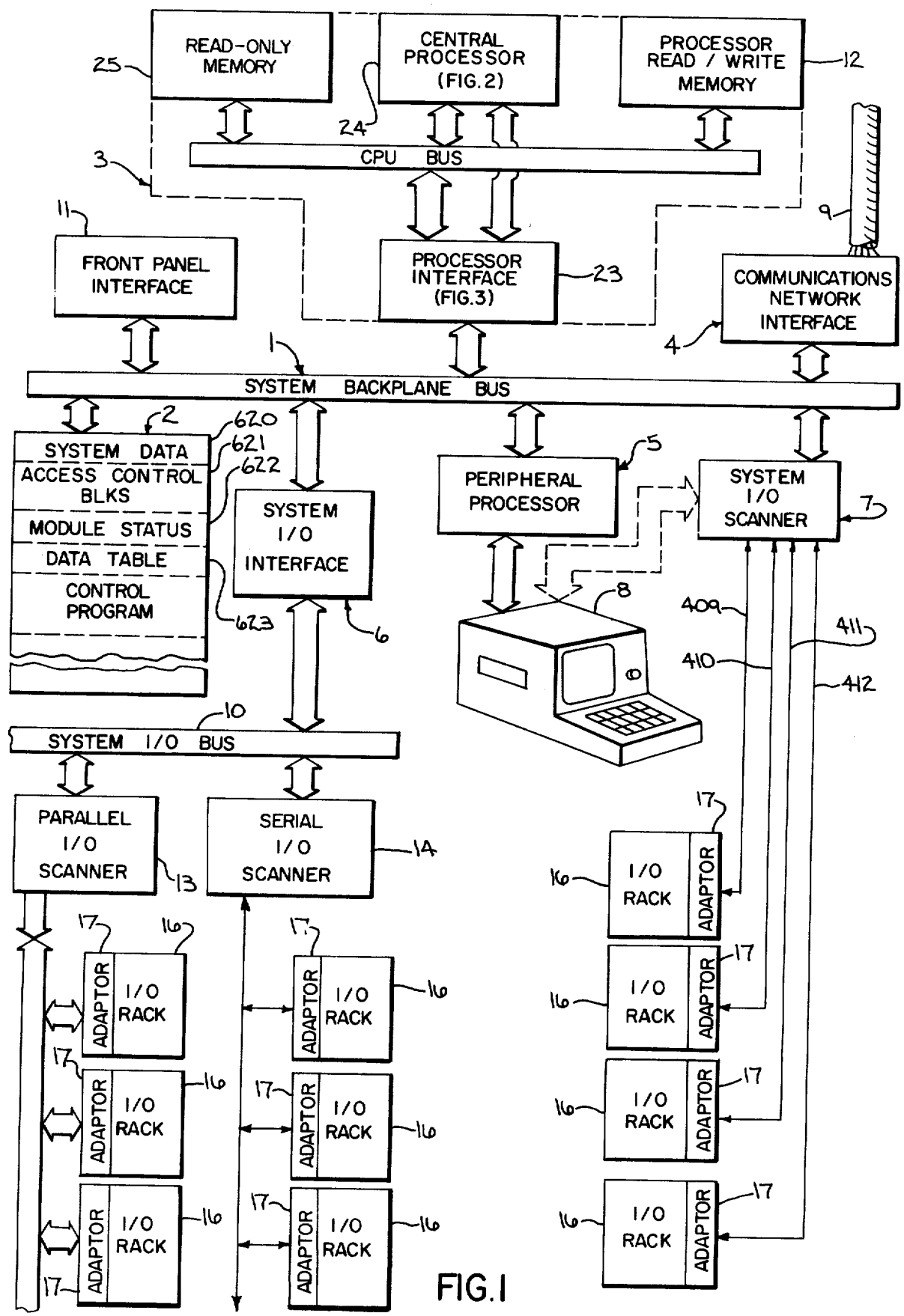
FIG. 1 is a block diagram of the programmable controller of the present invention.

Referring to FIG. 1, the programmable controller includes a number of functionally oriented modules which communicate with each other over a high-performance system backplane bus 1. The system backplane bus 1 includes 16 bidirectional data lines (D0-D15), 26 address lines (A1-A26), and a number of control lines which are employed to signal the transfer of data and to perform bus arbitration and other functions. All of the modules except a memory module 2 are potential masters of the system backplane bus 1 and each can control read and write functions on the bus 1. The backplane bus 1 is physically formed on a motherboard and the various system modules plug into edge connectors which attach to the bus leads and which form "slots" that mechanically support the module circuit boards.

There are a number of different functional modules which may be connected to the system backplane bus 1. These modules need not be present in every system, and indeed, one advantage of this architecture is that the programmable controller can be configured to a particular control function by selection of the proper type and number of modules. In addition, to the memory module 2, the programmable controller described herein includes a CPU module 3, a communications network interface module 4, a peripheral processor module 5, a system I/O bus interface module 6, a system I/O scanner module 7 and a front panel 11. Most of the modules are allocated an address space of 256K and, with the exception of the CPU module 3, all modules may be duplicated in the system.

The memory module 2 contains from 4096 (4K) to 32,768 (32K) words of storage capacity. Each word contains 16-bits of data and one error detection bit. The module 2 occupies one slot in the system backplane bus 1, however, more than one memory module 2 may be used. The memory module 2 stores the user control program which is comprised of a set of macroinstructions that are executed to perform the desired control functions. The macroinstruction set includes conventional programmable controller instructions, arithmetic instructions and logic instructions, as well as many newly-defined instructions which employ the unique architecture of this programmable controller. The macroinstruction set is described in detail hereinafter in connection with the description of the CPU module 3.

The user control program is loaded into the memory module 2 and edited using a terminal 8 which is shown connected to the peripheral processor module 5, but which also may connect to the system I/O scanner module 7. The terminal 8 includes a keyboard having keys labeled with the proper instruction set mnemonics and a display which presents the control program in rung diagram format. A terminal such as that described in co-pending U.S. patent applications, Ser. Nos. 75,175 and 75,176 filed on Sept. 12, 1979, is employed.

The communications network interface module 4 connects the programmable controller to a high speed data highway 9 which connects to other programmable controllers and computers in a network. Indeed, it may be a primary function of the programmable controller of the present invention to perform supervisory control operations in a distributed control system. The communications network interface 4 is microprocessor based and it functions to interface the network communication protocol with the system backplane bus protocol. For a detailed description of the communications network protocol and hardware interface, reference is made to co-pending U.S. patent application, Ser. No. 102,970, filed on Dec. 12, 1979 and entitled "Industrial Communications Network".

The peripheral processor 5 is a microcomputer system which provides interface capability with up to four peripheral devices through serial data links. In addition to the programming terminal 8, the peripheral processor may communicate with devices such as printers and teletypes, and with other computers, either directly or through modems. The peripheral processor 5 services each serial I/O port and communicates through the backplane bus 1 with other modules. For example, control program data entered from the terminal 8 is interpreted by the module 5 and written into the memory module 2. Of, if an editing function is input at the terminal 8, the peripheral processor 5 may perform a number of read and write cycles to shift portions of the control program in the memory module 2.

The system I/O bus interface module 6 provides a high performance interface between the system backplane bus 1 and a system I/O bus 10. The I/O bus interface module 6 includes a random access memory which stores an image of the I/O system input and output points. Changes in the state of input points in the I/O system are received by the interface module 6 from one of the thirty-two possible I/O scanner circuits attached to the system I/O bus 10. The module 6 updates the state of its own I/O image in the RAM and then obtains control of the backplane bus 1 and transfers this information to an I/O image and data table stored in a processor read/write memory 12 located in the CPU module 3, or to an I/O image and data table 623 in the memory module 2. In addition to the exchange of I/O data which reflects state changes in I/O points, the interface module 6 also performs a periodic "refresh" scan of all I/O points in the system. By this method, the integrity of the state of the I/O image and data table in memory 12 is insured as well as all output points in the I/O system.

Up to 32 separate I/O scanners or instrumentation interface circuits may be attached to the system I/O bus 10, and with these, up to 4096 input points and 4096 output points may be serviced by the programmable controller without degrading its response time. In the preferred embodiment shown in FIG. 1 only a single parallel I/O scanner 13 and a serial I/O scanner 14 are shown. Up to 32 separate I/O racks 16 may be attached to each of these scanners 13 or 14, and each I/O rack 16 contains an adapter circuit 17 which interfaces with one or more I/O modules.

The I/O modules in each rack 16 contain circuitry which connects the programmable controller to the machine being controlled. These include input circuits such as those disclosed in U.S. Pat. Nos. 3,643,115 and 4,275,307 which sense the opening and closing of switches. This circuitry also includes output circuits such as that disclosed in U.S. Pat. No. 3,745,546 which may be employed to control motors and solenoids. Although a vast majority of these modules are single-bit oriented, word oriented modules such as analog-to-digital and digital-to-analog converter modules disclosed in U.S. Pat. No. 4,104,731 may also be employed. Physically, the I/O racks 16 may take a number of forms as disclosed in U.S. Pat. Nos. 3,992,654; 4,151,580 and 4,152,750.

The system I/O scanner module 7 serves much the same purpose as the system I/O bus interface module 6, but on a smaller scale. Indeed, in smaller systems it may be the only I/O interface module employed. The system I/O scanner module 7 is microprocessor-based and it includes four serial ports which may be software configured to drive a number of components. In the preferred embodiment shown in FIG. 1, it is configured to communicate with four I/O racks 16 through their respective adapter circuits 17, but on smaller systems one port may be employed to communicate with the programming terminal 8.

The front panel module 11 provides a convenient, but rather limited means for manually entering data into the system and for displaying data and diagnostic information. It is microprocessor-based and is operable to receive commands through a keyboard and process the commands to configure the system and control its mode of operation. The contents of selected lines of the I/O image and data table memory 12 can also be displayed and changed. The module 11 is mounted on the door of the processor housing and is connected to the system I/O scanner module 7 through the system backplane bus 1 and a ribbon cable.

MEMORY MODULE

As indicated above, one or more memory modules 2 may be connected to the system backplane bus 1 and any other module in the programmable controller may read or write to these memory modules. In addition to storing one or more control programs, the memory module 2 stores considerable data which relates to the status and operation of each module in the programmable controller system. These data structures serve to coordinate the operation of the various system modules.

Referring particularly to FIGS. 1 and 19A-19D, the memory module 2 includes a system data section 620, an access control block section 621, a module status section 622, and a data table section 623. The system data section 620 occupies twenty-one words of memory and is divided into fields that are dedicated to specific functions. The access control block section 621 is comprised of a set of data blocks, each associated with a particular system module or section of the memory module 2. Each such block of data occupies five lines of memory and is divided into fields which are dedicated to specific functions. The module status section 622 of the memory module 2 is comprised of blocks of data which each contain information concerning the status of specific system modules. And finally, the data table section 623 is comprised of sixteen sections, each of which is dedicated to store a specific type of data.

Referring to FIG. 19A, the system data section includes a number of fields which provide information concerning the status of the programmable controller system. These fields are defined as follows:

Remote Access Request Counter. This counter indicates the number of remote devices requesting control of the programmable controller.

Outputs Reset Request Counter. This counter indicates the number of tasks requesting that all output devices connected to the programmable controller be reset.

(F1) Freeze Counter. F1 is a bit which indicates that the CPU module has been commanded to stop execution of the control program, and the counter indicates the number of tasks making this request.

(F2) Synchronous Freeze Counter. F2 is a bit which indicates that the CPU module has been commanded to stop execution at the end of the next scan through the control program, and the counter indicates the number of tasks making this request.

System Mode Data. This is a collection of status bits which indicate the mode of operation of the programmable controller, the memory protection mode and the programming mode.

I/O Prescan Counter. This is a four-bit counter used during initialization to indicate the number of I/O scanner modules yet to complete their I/O prescans.

CPU Timer and Counter Field. This field is comprised of four parts: a CPU watchdog timer set-point; a CPU scan time high value; a CPU scan time present value; and a system counter 606. The CPU watchdog timer set-point defines the timeout period which generates a fault condition if the CPU does not periodically reset the watchdog timer. The high value is the longest scan time actually recorded and the present value is the accumulated time of the current scan. The scan time set-point is set by the CPU during its execution of the entire control program. This value as well as the others are available to the user through the terminal 8. The system counter 606 has a number of uses. During the CPU pre-scan mode of operation this stores the number of pre-scans, and during the other CPU modes of operation this serves as a "heartbeat counter" which indicates to other modules in the system that the CPU module 3 is operating.

Real Time Clock. The remainder of the system data section 620 is occupied by a real time clock which is periodically updated by the CPU module 3. This clock has a range from years to 0.0001 seconds.

Referring particularly to FIGS. 1 and 19B, the access control block section 621 of the memory module 2 includes a five word block of data associated with each logical unit in the programmable controller. Each access control block includes a number of fields which are dedicated to performing the following functions.

(X) Configure Command Bit. When this bit is set it indicates that this logical unit should be initialized and included in the system configuration prior to running the programmable controller.

(S) Status Bit. When set this bit indicates that the logical unit is ready to run.

(A) Memory Section Number. This six-bit number indicates the memory module section number to which the logical unit relates. These are as follows:
- 0 = System data section
- 1 = Access control block section
- 2 = Module status section
- 3 = Data table section
- 4 = Control program section
- 5 = Messages section
- 6 = System symbols
- 7 = User symbols
- 63 = End of memory (B) Subsection Number. This four-bit number is a further definition of the logical unit. If the logical unit is a module, this number defines the type of module as follows:
- 1 = Memory module
- 2 = CPU module
- 3 = I/O Scanner module
- 4 = Peripheral processor module
- 5 = Communications network module On the other hand, if the logical unit is a data structure, this number indicates one of a plurality of such data structures, or in other words, the context of the data structure.

(C) Subsection Number. This four-bit number is yet a further definition of the logical unit. If the logical unit is a module, it indicates one out of a plurality of similar modules. If the logical unit is a section of memory it defines a subsection of that data structure. Referring particularly to FIG. 19D for example, this number identifies a subsection of the data table portion of the memory as follows:
- 1 = Output image table
- 2 = Input image table
- 3 = Timer structures
- 4 = Counter structures
- 5 = Binary integers
- 6 = Floating point numbers
- 7 = BCD integers
- 8 = Binary data
- 9 = ASCII characters
- 10 = Gray code data
- 11 = Twelve-bit I/O data (P) Write protect bit. When set, data is not to be written to the logical unit.

Access Counter. This indicates the number of processes which are currently accessing the logical unit.

Pointer. This is an address pointer to the start of the logical unit. If the logical unit is a data structure it points to its memory address and if the logical unit is a module, it points to the memory address for the module's status area.

The remaining two lines of the access control block 621 defines the size of the logical unit when it is a data structure stored in the memory module 2. This information is needed to perform certain editing functions.

Figure 19C:
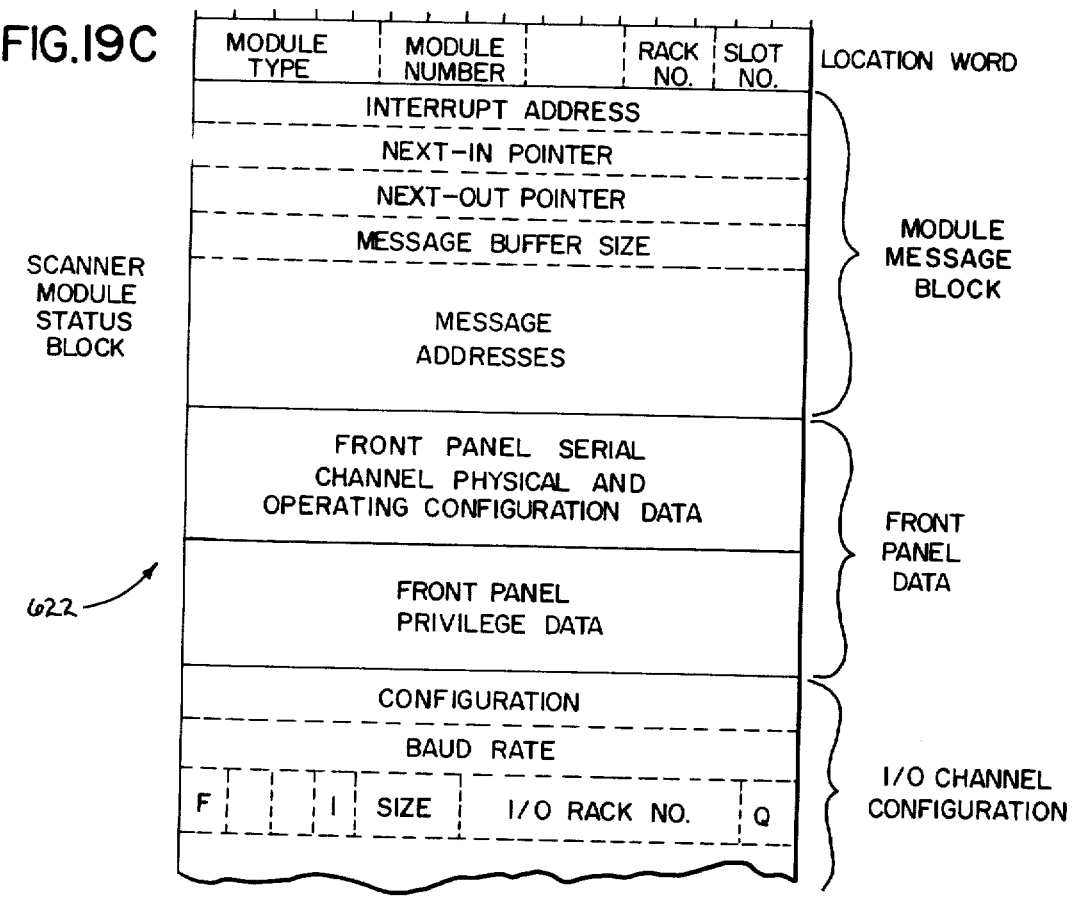
Figure 19D:
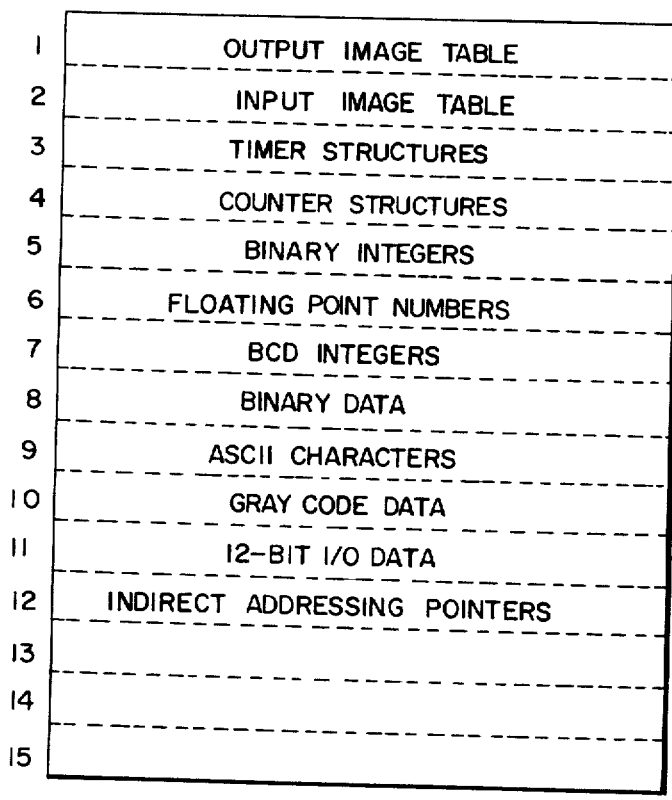

Referring particularly to FIGS. 1 and 19C, each module in the system includes a corresponding block of data in the module status section 622 of the memory 2. Although much of the data in these module status blocks 622 is unique to each type of module, they do contain some common data structures. Such structures include a location word that identifies the module type, the module number, and its physical location on the system backplane. In addition, those modules which support processor-to-processor communications include a "module message block" data structure. As will be described in more detail hereinafter, the message data block includes an interrupt address for that module, as well as a buffer containing the backplane address of each message for the module. A pair of pointers indicate the next message address into and out of this buffer and a third word indicates the buffer's size.

When a module supports the front panel 11, its module status block 622 also includes a front panel data structure. In the preferred embodiment described herein the front panel is supported by the I/O scanner module 7 and thus this data structure appears in its module status block 622 as shown in FIG. 19C. This data includes both physical and operating configuration data for the front panel serial port, as well as data regarding the control privileges allowed the front panel 11.

Referring still to FIG. 19C, the module status block 622 for the I/O scanner module 7 includes data structures corresponding to each of the four I/O channels. Each of these data structures includes a configuration word which indicates if the I/O channel is active, and if so, what purpose it is serving. Another word indicates the baud rate at which communications is occurring as well as further data which is peculiar to the particular purpose it is serving. In the preferred embodiment each I/O channel is connected to an I/O rack 16, and this further data is a single word which indicates the size, nature and address space of the I/O rack 16.

In summary, the module status blocks 622 store data which is available to all modules on the backplane bus 1 and which indicates the number and type of modules in the system and the basic functions they are performing. For example, by examining the module status blocks 622 the CPU module 3 can determine which module and channel on that module is supporting the terminal 8 and the front panel interface 11.

Referring particularly to FIGS. 1 and 19D, the data table 623 in the memory module 2 is divided into fifteen sections, each of which stores a specific data type. Section 2 stores input data which is received through the system I/O interface module 6 or the system I/O scanner module 7. This data is written into the memory module 2 by the module 6 or 7 as it is received from the I/O racks 16. It is, therefore, an "image" of the state of the sensing devices which connect to the machine being controlled. Similarly, Section 1 of the data table 623 stores output data which is an image of the state of the operating devices on the machine being controlled.

The form of the data in the input and output image tables is the same as that of the particular input or output device to which it relates. A position encoder which serves as an input device to the system may, for example, generate a digital number using a "gray" code, where as a bar code reader may generate input data as a series of "ASCII" characters. Such data is input automatically to the input image table by the programmable controller and the control program may contain a "MOVE" instruction to transfer this data to the appropriate data type section of the data table 623. Such a transfer of data using the MOVE instruction does not perform a data conversion. However, when the MOVE instruction is used to transfer data of one type to a data table section of another type, a data conversion is made which is completely transparent to the user. Thus for example, a transfer of data using the MOVE instruction from the "binary data" section to the "BCD integer" section will make the appropriate data conversion. In addition, when data is read from a particular data type section of the data table 623 by the CPU module 3, it is automatically converted to a "native" data type which is consistent with the function being performed by the CPU module 3. Conversely, when data is written back to the data table 623 by the CPU module 3, the data is automatically converted from the native data type back to the indicated form.

CPU Module

Figure 2:
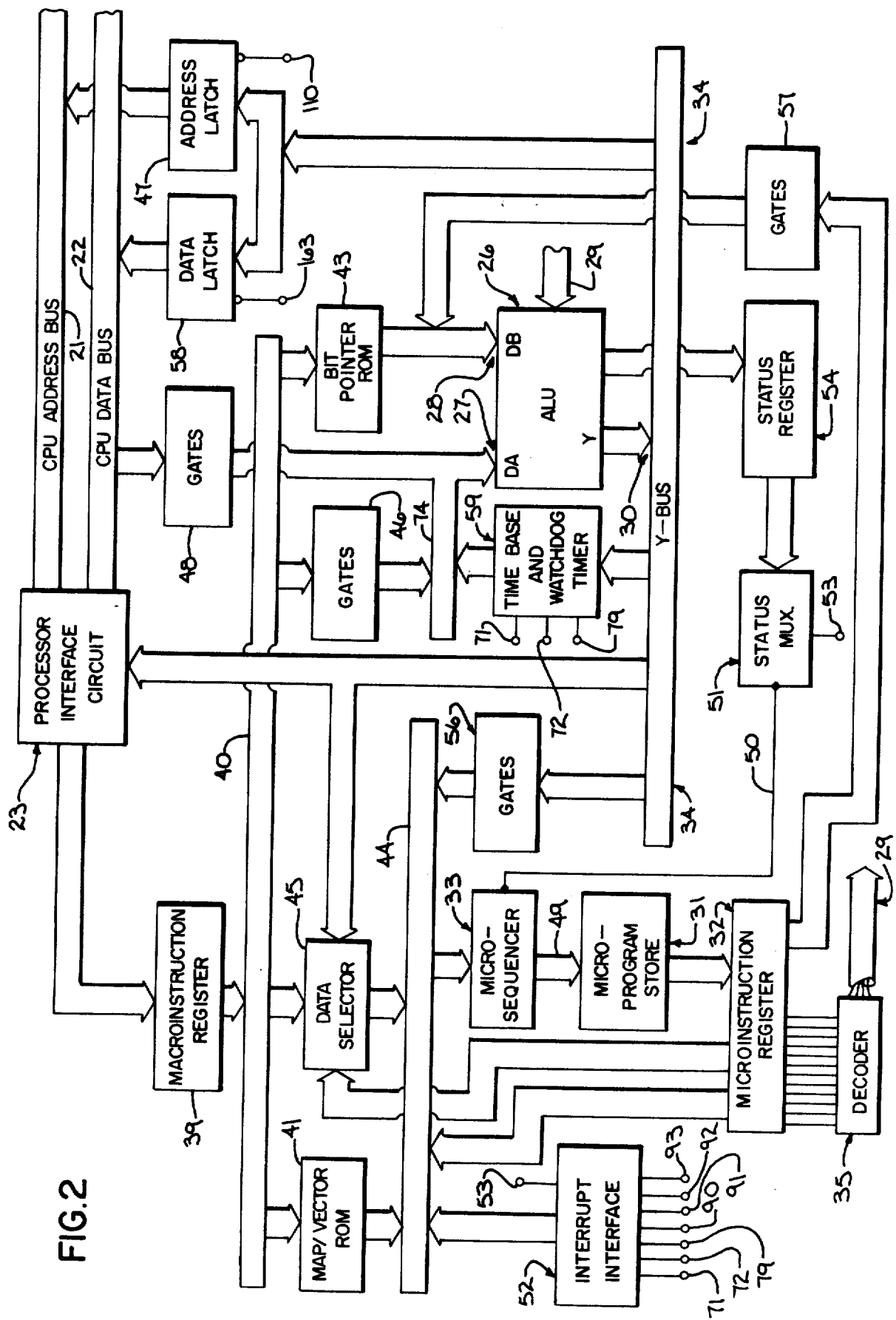
FIG. 2 is a block diagram of the CPU module which forms part of FIG. 1.

Referring particularly to FIGS. 1 and 2, the CPU module 3 is structured around a CPU bus 20 which includes a 16-lead CPU address bus 21 and a 16-lead bi-directional CPU data bus 22. These are coupled to the system backplane bus 1 by a processor interface circuit 23 and they connect to a central processor 24, a read-only memory 25 and the I/O image and data table memory 12. The read-only memory 25 is an 8K×16-bit high-speed EPROM which stores power-up and house keeping programs, masks, and other constants. This data is read onto the CPU data bus 22 either in response to microinstructions executed by the central processor 24 or in response to a read operation initiated by one of the modules connected to the system backplane bus 1. In the latter case, the data is coupled through the processor interface circuit 23 and backplane bus 1 to the requesting module.

The I/O image and data table memory 12 is a high-speed random access memory organized as 4K×16-bit words. This memory 12 stores an image of the most often accessed portion of the I/O image table. The central processor 24 accesses the memory 12 to determine the status of system inputs, and the central processor 24 modifies the contents of the memory 12 to effect changes in system outputs. The remainder of the I/O image table is stored in the data table portion 623 of the memory module 2, and the central processor 24 accesses this data as well. The CPU module 3 couples data which indicates "changes" made in the I/O image table through its processor interface circuit 23 to the corresponding I/O images tables in the I/O bus interface module 6 and I/O scanner module 7. The memory 12 also stores data associated with the execution of certain macroinstructions, and in general, it provides storage for data which is to be accessed at high speed.

Referring particularly to FIG. 2, the central processor 24 is a 16-bit, microprogrammed processor which fetches macroinstructions (user control program instructions) from the memory module 2, and decodes each into one or more microinstructions which perform the required operations. The processing of a macroinstruction may also require further access to the memory module 2 or the RAM memory 12 for operands or other required data.

The central processor 24 is structured about an arithmetic and logic unit, ALU 26, which is comprised of four cascaded 4-bit bipolar microprocessor slices (AM2903) manufactured by Advanced Micro Devices, Inc. The ALU 26 includes sixteen internal registers (Reg 0-15) and it receives 16-bit data input words at a DA port 27 or a DB port 28. The ALU 26 performs a number of arithmetic and logic functions in response to signals on a control bus 29 and 16-bit data output words are generated at a Y port 30. For a detailed description of the ALU 26 reference is made to "The AM2900 Family Data Book" published in 1979 by Advanced Micro Devices, Inc.

The operation of not only the ALU 26, but also the remaining elements of the central processor 24 is controlled by 56-bit microinstructions which are sequentially read from a microprogram store 31 to a microinstruction register 32. Referring particularly to FIGS. 2, 5A and 5B, the 56-bit microinstructions which control the operation of the central processor 24 are divided into micro fields. Each micro field is a code of one or more bits in length which is decoded to provide control signals to specific elements of the central processor 24. For example, the micro field formed by bits 0-3 of each microinstruction operate a microsequencer 33 to control the order in which microinstructions are read from the microprogram store 31. The micro field formed by bits 12-15 on the other hand, control the arithmetic and logic functions performed by the ALU 26 and the micro field formed by bits 28-31 control the various latches and gates which attach to the ALU Y-port 30 through a 16-bit Y-bus 34. Some of the microinstruction bit lines are attached directly to the elements which they control while others are combined and decoded to provide control signals for various system elements. This decoding circuitry is shown collectively in FIG. 2 as reference number 35 and the resulting control lines form the control bus 29. The actual control lines have not been shown in FIG. 2, but instead, Appendix A lists the function performed by each decoded micro field using the mnemonics in FIGS. 5A and 5B.

Referring particularly to FIG. 2, the macroinstructions from the user control program are read into the central processor 24 through the processor interface circuit 23 and stored in a 16-bit macroinstruction register 39. The macroinstruction register 39 retains the macroinstruction word for reference during the execution of the resulting microroutine. A 10-bit operation code in the macroinstruction is applied through a macro-bus 40 to the address inputs of a map/vector ROM 41, and a 4-bit bit-pointer code is applied to the address inputs of a bit pointer rom 43. The operation code is converted by the ROM 41 to a twelve-bit microaddress which is applied to a microbranch address bus 44. This decoded operation code is employed to address a microroutine which is then executed to perform the functions indicated by the operation code. The four least significant bits of the macroinstruction may also directly drive the four least significant bit leads in the 12-bit microbranch address bus 44 through a data selector 45. The data selector 45 is enabled when special 16-way microbranch instructions are executed that require four bits from the macroinstruction.

The microsequencer 33 is an address sequencer for controlling the sequence of execution of microinstructions stored in the microprogram store 31. During the execution of each microinstruction, the microsequencer 33 provides a 12-bit address on a bus 49 to the microprogram store 31. This address selects one of 4096 microinstructions to be executed next. The address generated by the microsequencer 33 may originate from one of four sources within the microsequencer 33: (1) a microprogram address register, which usually contains an address one greater than the previous address; (2) an external direct input from the microbranch address bus 44; (3) a register/counter retaining data loaded during a previous microinstructions; or (4) a five-deep last-in, first-out stack register which provides return address linkage when executing microsubroutines or loops. The microsequencer 33 is responsive to microinstruction bits 0-3 to perform one of sixteen operations, nine of which are conditioned by a signal on a control line 50. That is, an operation such as a jump is performed only if the control line 50 is at a logic low voltage. The microsequencer 33 is available in integrated circuit form as the AM2910, and for a more complete description of its structure and operation, reference is made to "The AM2900 Family Data Book With Related Support Circuits" published in 1979 by Advanced Micro Devices, Inc.

The control line 50 is driven by a status multiplexer 51 which is controlled by bits 40-43 in each microinstruction. The status multiplexer 51 receives a status signal from an interrupt interface circuit 52 through a control line 53 and it receives status signals from a 4-bit status register 54. The inputs of the status register 54 are driven by the "carry", "overflow", "zero" and "sign" status outputs of the ALU 26. The operation of the microsequencer 33 can thus be conditioned by the status of the ALU 26 or by the existence of an interrupt request from the interrupt interface circuit 52.

Referring still to FIG. 2, a microprogram address may be supplied to the microsequencer 33 through the bus 44 from a number of sources. For example, when a macroinstruction is fetched its operation code is applied to the map/vector ROM 41, and it is converted, or mapped, to a 12-bit microprogram address which is generated on the bus 44. In this manner, each macroinstruction is mapped to its corresponding microroutine. Also, when a jump microinstruction is executed, bits 44-45 of the microinstruction are coupled directly to the bus 44 from the microinstruction register 32. This "target address" identifies the point in the microprogram at which processing is to continue. In addition, a 12-bit microaddress may be coupled from the Y port 30 of the AlU 26 through a set of gates 56. This allows, for example, the target address of a microjump to be calculated by the ALU 26. And finally, microaddress data may be coupled to the microsequencer 33 from a data selector 45 and an interrupt interface 52.

Referring to FIG. 2, the central processor 24 includes other elements which enable it to perform a wide variety of functions. Gates 46 couple data from the bus 40 to the ALU 26, and when enabled for example, they allow the 9-bit operand address which accompanies a bit pointer code to be coupled through the ALU 26 to an address latch 47 and then to the CPU address bus 21. Gates 48 on the other hand, connect the CPU data bus 22 to the DA port 27 on the ALU 26. This enables a 16-bit data word from either the processor interface circuit 23, the I/O image and data table memory 12 or the read-only memory 25 to be applied through the gates 48 directly to the ALU 26. In addition, bits 40-55 of the microinstruction register 32 are coupled to a set of sixteen gates 57 and the outputs of gates 57 are connected to the DB port 28 on the ALU 26. A sixteen bit data word can thus be applied to the ALU 26 "immediately" by a microinstruction. Such a data word might be, for example, a mask which is logically combined with a data word applied to the ALU DA port 27. Also, the output of the ALU 26 may be coupled through the Y-bus 34 to a 16-bit data latch 58, the address latch 47 or the processor interface circuit 23. The data latch 58 connects to the CPU data bus 22 and the output of the ALU 26 can thus be written into the I/O image and data table memory 12. And finally, the ALU Y-bus 34 connects to the input of a time base and watchdog timer circuit 59. As will now be described in more detail, the output of this circuit 59 also connects to the ALU DA input port 27.

Referring particularly to FIGS. 2 and 4, the time base and watchdog timer circuit provides the system clock signals and the real time clock signals employed in timer macroinstructions. It includes a 20 megahertz single phase clock 60 which drives a clock line 61 through a driver 62. The 20 megahertz clock 60 also drives a 4-bit binary counter 63 which generates a system clock signal on a line 64. The system clock provides a time base of 200, 250 or 300 nanoseconds depending on the type of instruction being executed. The system clock can be inhibited, by a NAND gate 65 which is responsive to a HOLD signal on a control line 66.

The 20 megahertz clock also drives a divider circuit 67 through an inverter 68 and a D-type flip-flop 69. The divider 67 is comprised of a series of dividers and counters which reduce the clock rate to values that provide the desired time bases. More specifically, a time base of one millisecond is generated on a line 70, a time base of 0.01 seconds is generated on a line 71 and a time base of 0.1 seconds is generated on a line 72. In addition, an 8-bit latch 73 connects to the divider 67 to store a 4-bit binary count of the 0.01 second time intervals, a 2-bit binary count of the 0.1 second time intervals and a 2-bit count of 0.5 second intervals. The eight Q outputs on the latch 73 connect to the ALU DA port 27 through bus 74, and when a logic low control signal is received on a line 75, the contents of the latch 73 are read into the ALU 26.

The line 70 increments an 8-bit scan counter 76 which serves as a means for measuring the time required to execute the user's control program. The eight inputs to the scan counter 76 are connected to the eight least significant leads in the Y-bus 34 and it is preset through a control line 77 to the one's compliment of the maximum allowable scan time prior to each pass through the user's control program. As the user's control program is executed, the counter is incremented in ten millisecond time increments until it overflows, or is again preset at the beginning of the next scan. A NAND gate 78 connects to detect an overflow and it generates a logic low voltage on a control line 79 when this event occurs. As will be explained in more detail below, the control line 79 connects to the interrupt interface circuit 52 to initiate an interrupt when the scan counter "times out". In addition, a set of eight tri-state gates 80 connect to the outputs of the scan counter 76, and when a logic low voltage is applied to control line 81, the contents of the counter 76 is read onto the bus 74 and into the ALU 26. In this manner, the time required to execute the control program, or portions of it, can be measured.

Figure 6:
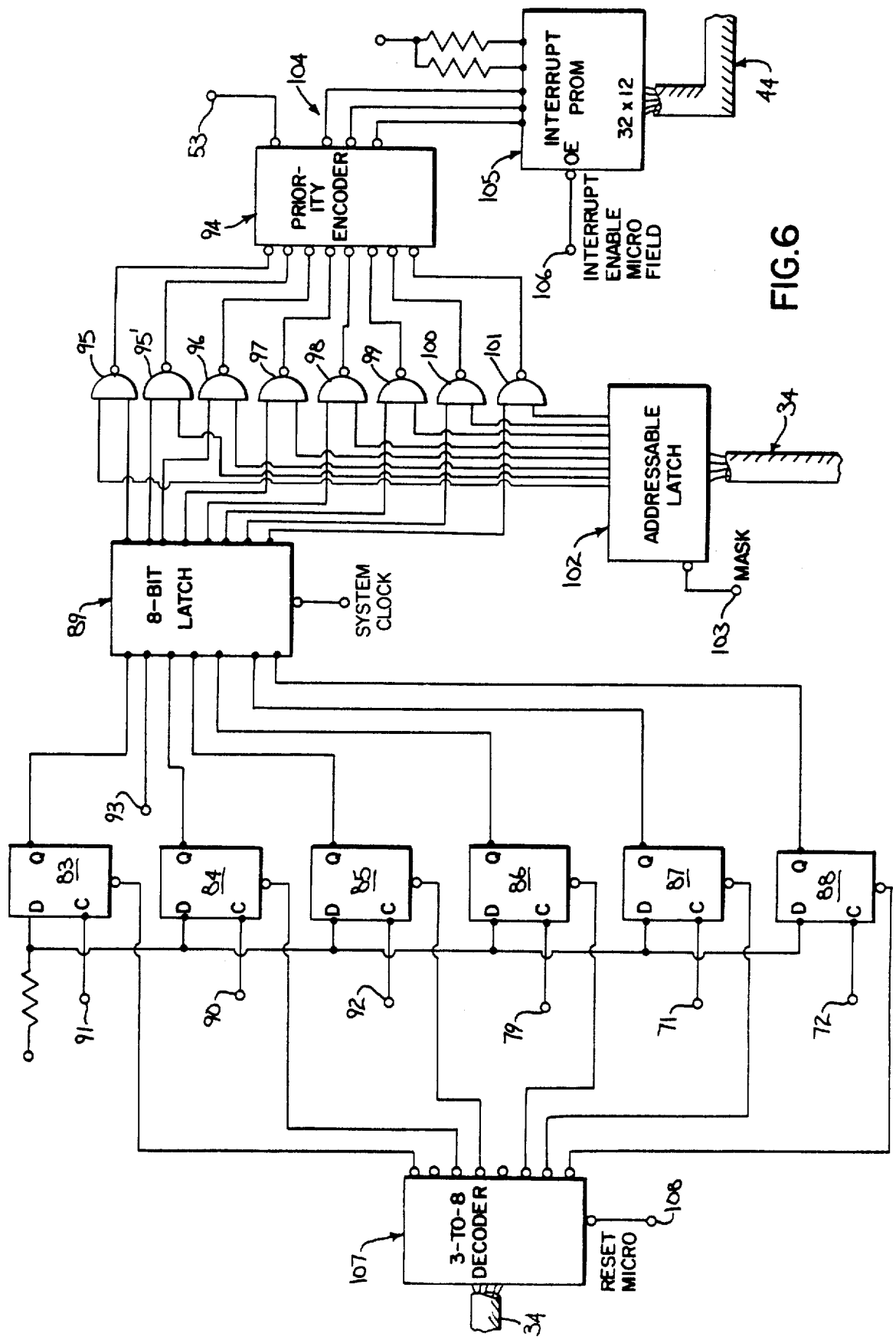
FIG. 6 is an electrical schematic diagram of the interrupt interface circuit which forms part of the circuit of FIG. 2.

Referring particularly to FIGS. 2 and 6, the interrupt interface circuit 52 receives interrupt requests from seven sources, prioritizes them, and generates a code to an interrupt PROM which supplies the starting address on the microbranch address bus 44 of the highest priority service routine. Six of the interrupt requests are received at the clock terminals of respective D-type flip-flops 83-88 and the seventh is applied directly to one input of an 8-bit latch 89. Three of the interrupt requests eminate from the time base and watchdog timer circuit described above to interrupt processing when the allowable scan time has been exceeded or when the 0.01 second real-time clock has "ticked" or when the 0.1 second real-time clock has ticked. A fourth interrupt request eminates from a line 90 in the backplane bus when a module attached thereto requests an interrupt, and a fifth interrupt is requested by line 91 when a.c. power failure is detected. The remaining two interrupts are fault related. The first appears on line 92 when an error is detected during a read or write operation to the system backplane bus 1 and the other appears on line 93 when a fault such as a memory parity error occurs.

Any interrupt requests remain in the respective flip-flops 83-88 until serviced. The Q outputs of flip-flops 83-88 are connected to inputs on the latch 89 and the interrupt requests are latched in synchronizm with the 5 MHZ system clock. The eight latch outputs are coupled to a priority encoder 94 through respective NAND gates 95-101.

The NAND gates 95-101 enable interrupt requests to be masked. A second input on each connects to a respective output of an eight-bit addressable latch 102 which has its three latch select inputs and its data input connected to the Y-bus 34. When a control line 103 is driven low, a selected one of the NAND gates 95-101 may be either enabled or disabled (i.e. mask the interrupt) by data which is output from the ALU 26 to the addressable latch 102.

The priority encoder 94 generates a three-bit binary code at its outputs 104 which identifies the highest priority interrupt applied to its eight inputs. A "EO" output on the priority encoder 94 connects to the control line 53 and it is driven high if any interrupts are requested. The outputs 104 connect to the address inputs of the interrupt PROM 105, and the 3-bit code thereon is mapped to the starting address of the corresponding interrupt service microroutine. When the interrupt PROM 105 is enabled by control line 106, this address is applied to the bus 44 and loaded into the microsequencer 33.

After an interrupt has been serviced the request is reset. Referring still to FIG. 6, this is accomplished by a 3-line-to-8-line decoder 107 which has its three inputs connected to lead 0-2 in the Y-bus 34. Six of its outputs are connected to reset terminals on respective flip-flops 83-88, and when enabled by a control line 108, the flip-flop indicated by the 3-bit code on the Y-bus 34 is reset. The interrupt indicated on line 93 requires a manual reset following correction of the indicated fault.

It should be apparent that the interrupt interface circuit 52 may be expanded to enable additional interrupt input events and that the nature of the interrupt events can be easily changed by altering the contents of the interrupt PROM 105.

There are certain functions performed by a programmable controller which to a great extent determine its capacity in terms of the number of I/O points it can support. The preferred embodiment described herein is intended to service up to 4096 input points and 4096 output points without degradation of the scan time (i.e. the time needed for a single execution of the user control program). This is accomplished in part by maintaining the I/O image and data table in the memory 12, which is not only constructed using high speed memory devices, but which is also physically located on the same circuit board as the central processor 24. Most operations performed by the central processor 24 involve this local high speed memory, because most instructions in the typical user control program require the examination of a single bit in the I/O image table or the setting of a single bit in the I/O image table. The separation of the CPU bus 20 from the system backplane bus 1 and the use of local high speed memory therefore substantially enhances the speed of the CPU module 3.

As indicated above, it is the function of the system I/O bus interface module 6 and the I/O scanner module 7 to periodically update the state of the I/O image table in the memory 12 and it is a function of the central processor 24 to fetch control instructions (i.e. macroinstructions) from the memory module 2. These functions require bi-directional communications between the central processor 24 and the system backplane bus 1. Also, because a number of asynchronously operating modules are connected to the system backplane bus 1, an arbitration means must be provided to allocate the backplane bus 1 to the requesting system module or the cental processor 24 in accordance with a preselected priority scheme.

Figure 3A:
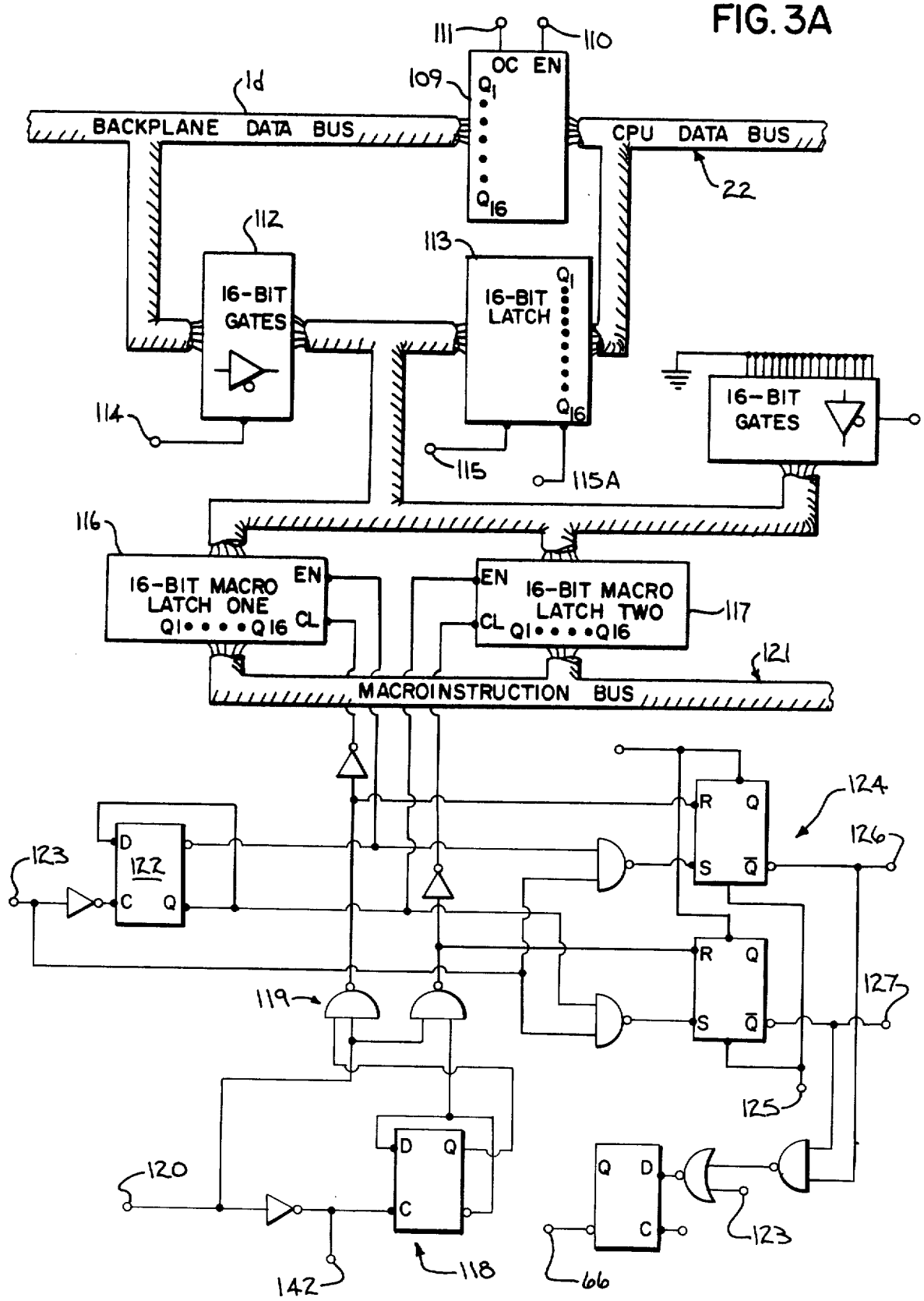
FIGS. 3A-3D are electrical schematic diagrams of the processor interface circuit which forms part of the circuit of FIG. 2.

These functions are performed by the processor interface circuit 23. Referring particularly to FIGS. 1, 2 and 3A, the sixteen leads in the CPU data bus 22 are coupled to the sixteen leads in the system backplane bus 1d by a 16-bit latch 109. Data is clocked into the latch 109 from the bus 22 when a control line 110 goes high and this data is applied to the backplane data bus 1d when a control line 111 becomes active. On the other hand, a set of sixteen tri-state gates 112 and a latch 113 couple the backplane data bus 1d to the CPU data bus 22. When enabled by control lines 114 and 115 data from the backplane bus 1 may be coupled through the gates 112 and the latch 113 and written to an addressed destination in the central processor module 24. It is in this manner, for example, that the system I/O bus interface module 6 updates the I/O image and data table memory 12 with changes occurring at input points in the I/O racks 16.

In addition to coupling the respective data buses 1d and 22, the gates 112 also input control program macroinstructions which are fetched from the memory module 2. These macroinstructions are applied to the inputs of a first macro latch 116 and to the inputs of a second macro latch 117. As fetched macroinstructions are received, they are alternately loaded into the respective latches 116 and 117. This enables macroinstructions to be "prefetched" so that the central processor module 24 can operate at maximum speed without waiting for the next macroinstruction. Control of the latches 116 and 117 is accomplished by a flip-fop 118 and a pair of NAND gates 119. The flip-flop 118 serves to alternately clock the latches 116 and 117 and to time the clock pulse such that the macroinstruction is latched properly when received from the memory module 2. As a result, when a macroinstruction is fetched, a control line 120 becomes active and one of the two NAND gates 119 is momentarily gated to clock one of the latches 116 or 117.

The output of the latches 116 and 117 connect to the leads in a macroinstruction bus 121 which connects to the inputs of the macroinstruction register 39. A flip-flop 122 connects to the enable terminals on the respective latches 116 and 117, and the contents of the latches are alternately output to the macroinstruction register 39 in response to signals on control line 123. A set of flip-flops and gates indicated generally at 124 keep track of the macroinstructions loaded into and read out of the latches 116 and 117, and if a request is made for another macroinstruction and none is available, an active signal is generated on the control line 66 to disable the central processor clock (see FIG. 4). The central processor is thus held in an idle state until another macroinstruction is received from the memory module 2. Control lines 126 and 127, which also emanate from this circuit, indicate when either of the latches 116 or 117 is empty, and as will be described below, these signals initiate a prefetch of another macroinstruction when either of the macro latches 116 or 117 is empty.

As long as the control program macroinstructions are executed in sequence, the subsequent macroinstructions are prefetched to the macro latches 116 and 117 and are available when needed by the central processor 24. Howwever, when the control program deviates from a straight sequential execution of macroinstructions, as occurs during a jump or branch, the prefetched macroinstructions in the latches 116 and 117 are of no use. When this occurs, a control line 125 is enabled and the flip-flops 124 are reset to indicate that no macroinstructions are available for execution.

Figure 3B:
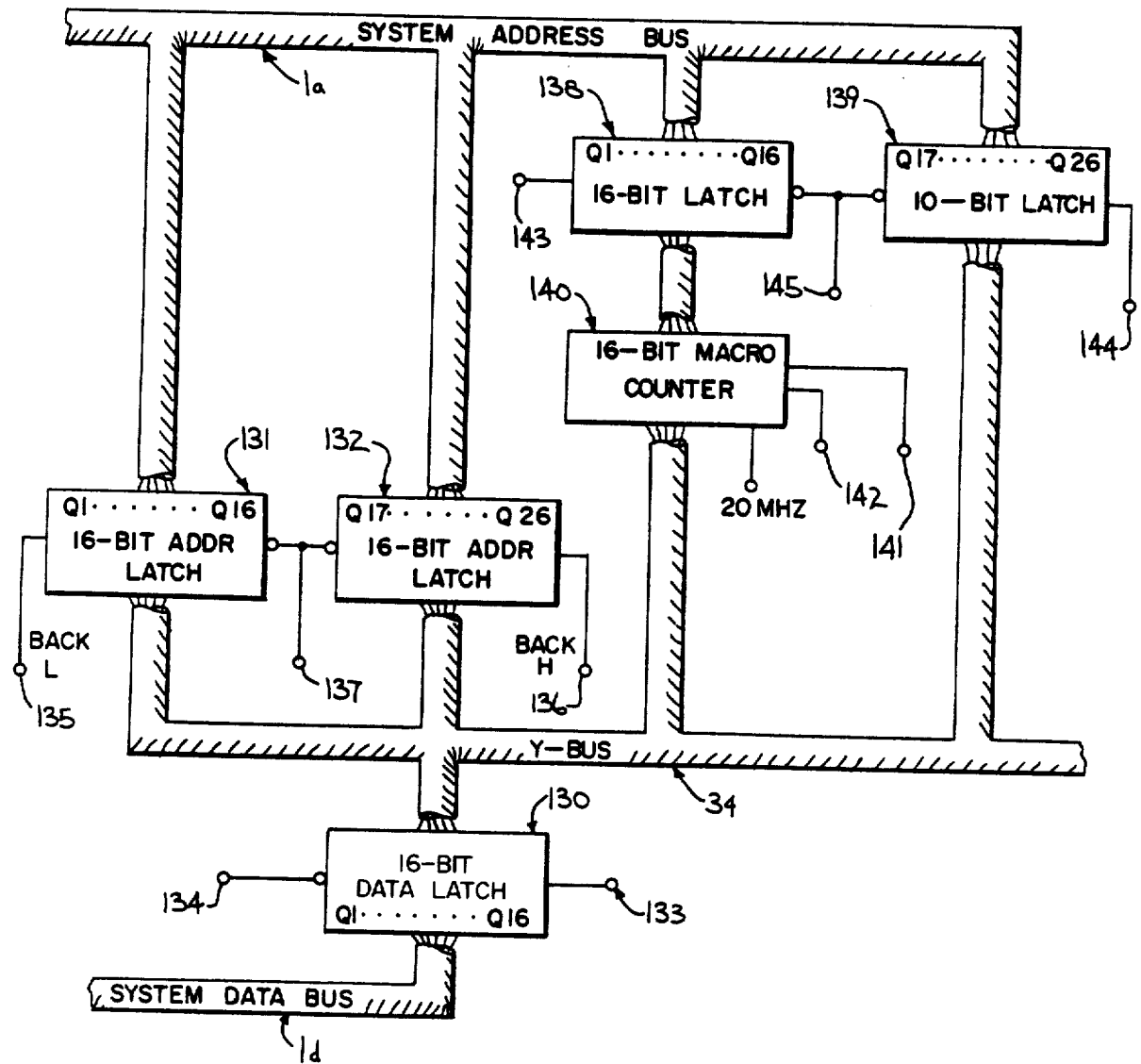

Referring particularly to FIGS. 2 and 3B, the ALU Y-bus 34 is also coupled to the system backplane bus 1 through the processor interface circuit 23. It connects to the system data bus 1d through a 16-bit data latch 130 and it connects to the system address bus 1a through a pair of address latches 131 and 132. The data latch 130 is loaded with data which is output from the ALU 26 when a control line 133 is active (i.e. micro-bits 28–31 =BACKD) and this data is written onto the backplane data bus 1d when a control line 134 is active. Similarly, address data is output to the respective latches 131 and 132 when control lines 135 and 136 are active (i.e micro-bits 28–31=BACKL or BACKH) and this 26-bit address is applied to the backplane address bus 1a when a control line 137 is active. Data and addresses can thus be generated directly by the ALU 26 for application to the backplane bus 1, and hence to other modules in the system.

Control program macroinstructions stored in the memory module 2 are addressed by the CPU module 3 by means of data stored in a 16-bit latch 138 and a 10-bit latch 139. The inputs of the 10-bit latch 139 are connected directly to leads in the Y-bus 34, however, the inputs to the 16-bit latch 138 are driven by a 16-bit "macro" counter 140. The macro counter 140 may be preset to an address generated by the ALU 26 on the Y-bus 34 when a control line 141 is active (i.e. micro-bits 28–31=FETCH) and the counter 140 is incremented each time a macroinstruction is fetched. This is accomplished by a control line 142 which emanates from the clock terminal of flip-flop 118 (see FIG. 3A). The contents of the macro counter 140 are loaded into the latch 138 when control line 143 becomes active, and the 10-bit latch 139 is loaded with high order addres data from the Y-bus 34 when the control line 144 becomes active. The resulting 26-bit address is applied to the backplane address bus 1a when the central processor module 24 obtains access to the backplane bus 1 and a control line 145 becomes active.

Figure 3C:
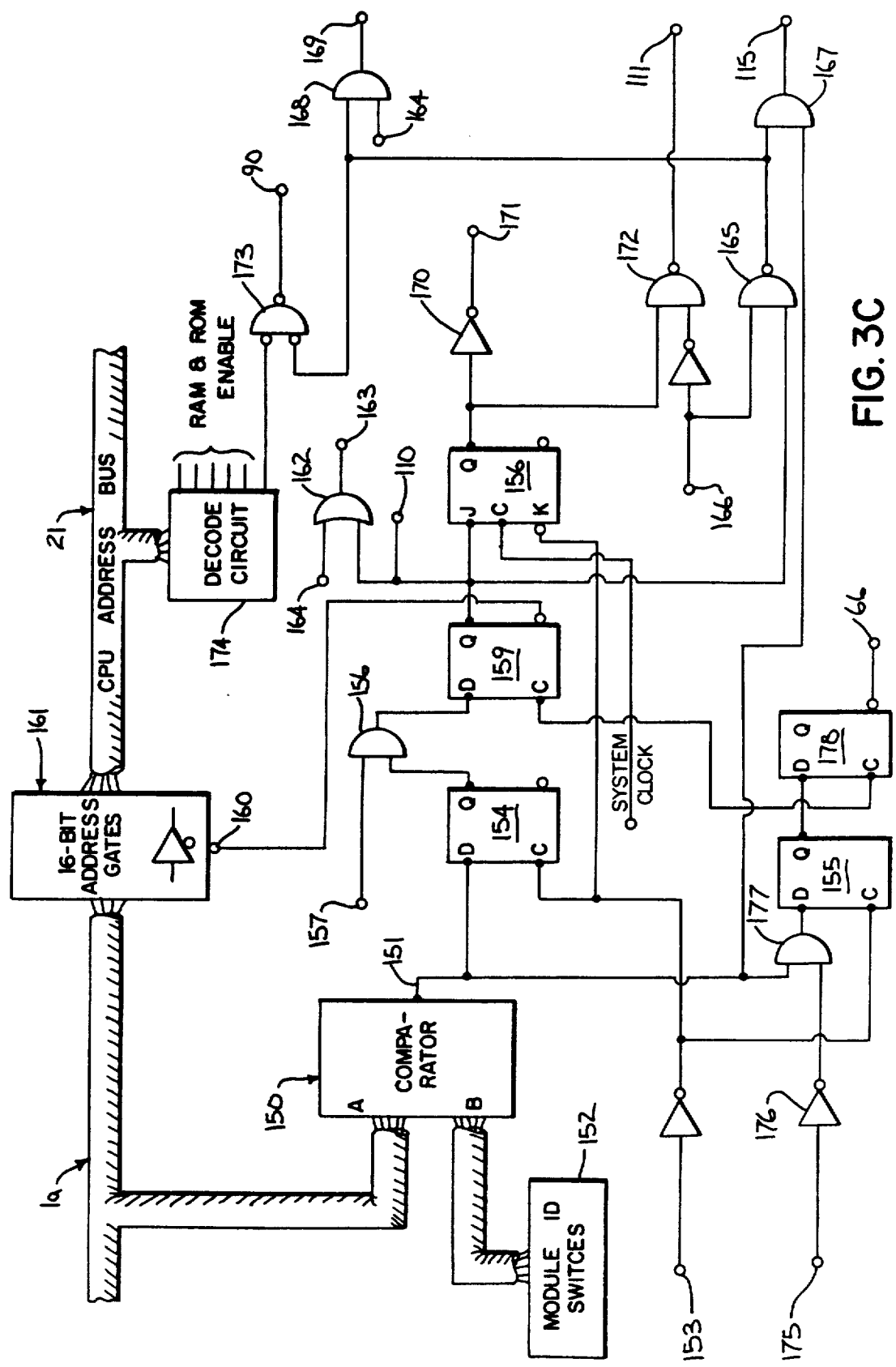

Referring to FIGS. 2 and 3C, a module connected to the system backplane bus 1 accesses the CPU module 3 by asserting an address within a preselected range on the address bus 1a and asserting the proper signals on the system backplane bus control lines. Ten of the most significant digit leads in the system address bus 1a couple to the "A" inputs of a comparator circuit 150, and when the CPU module 3 is addressed by another module, the comparator 150 generates a logic high voltage at an output 151. A set of module ID switches, or jumpers 152, connect to the "B" inputs of the comparator and these serve as a means for preselecting the CPU access address range.

The module requesting access to the CPU module 3 also asserts a logic low voltage on a backplane control line (XCMD) 153 to indicate that valid data is present on the backplane bus 1. This signal is inverted and applied to the clock terminals on two D-type flip-flops 154 and 155 and to the K terminal on a J-K flip-flop 156. The output of the comparator 150 is thus clocked into the flip-flop 154 and applied to one input of an AND gate 156. A second input 157 on AND gate 156 connects to receive bit 4 from the microinstruction register 32, and if access to the CPU module 3 is to be blocked, it is set low. Otherwise, the output of AND gate 156 is clocked into a second D-type flip-flop 159.

The Q and $\overline{Q}$ outputs on the second D-type flip-flop 159 enable a number of elements in the CPU module 3. The $\overline{Q}$ output connects to an enable terminal 160 on a set of sixteen address gates 161 and a sixteen bit address is thus applied to the CPU address bus 21 when access to the CPU module 3 is obtained. The Q output of flip-flop 159 connects directly to control line 110 to disable the address latch 47 (FIG. 2) and to enable the inputs of the latch 109 (FIG. 3A). In addition, this Q output connects through an OR gate 162 to a control line 163 which disables the data latch 58 (FIG. 2) when external access is granted. A second input on the OR gate 162 is driven by a control line 164 which becomes active during a central processor write operation (i.e. micro-bits 35-37). The Q output on flip-flop 159 also connects to one input of a NAND gate 165. The second input on this NAND gate 165 is driven by a control line 166, and when data is to be read by the CPU module 3, the output of gate 165 is driven low. The output of gate 165 drives a pair of AND gates 167 and 168. The AND gate 167 in turn drives the control line 115 which controls latch 113 (FIG. 3A) and the AND gate 168 drives a CPU WE control line 169. When a module on the system backplane bus 1 writes to the CPU module 3, therefore, the control lines 115 and 169 are driven low.

The J-K flip-flop 156 is set shortly after the flip-flop 159 by the system clock applied to its clock terminal. The Q output on flip-flop 156 connects to an inverter gate 170 that drives a backplane acknowledge (XACK) control line 171. The signal thus generated on the XACK control line 171 indicates to the requesting module that the CPU module 3 has received its request and that valid data is on the system bus 1. The flip-flop 156 also drives a NAND gate 172, and if a read operation is indicated by the backplane read/write line 166, the output of this gate 172 is driven low to enable the outputs of latch 109 (FIG. 3A) through control line 111. The flip-flops 154 and 154 are reset by the backplane control line XCMD 153 and the signal is removed from the XACK control line 171 by the flip-flop 156 to indicate that the data transfer is complete.

Referring to FIGS. 2 and 3C, in addition to reading from or writing to the CPU module 3, an external module may also interrupt the central processor 24 or force it into a "hold" state. An interrupt request is accomplished by writing to a specific address which causes an interrupt request to be generated on a line 90 by a NAND gate 173. One input to this gate 173 is enabled low by the NAND gate 165 when a backplane write operation is indicated, and its other input is enabled low when the preselected interrupt address is present on the CPU address bus 21. A decoder circuit 174 detects not only this interrupt address, but it also decodes other addresses on the bus 21 to generate appropriate chip enable signals to the I/O image and data table memory 12 and the read only memory 25.

An external module may also place the central processor 24 in "hold" by asserting a logic low voltage on a backplane control line (CPU HOLD) 175. This signal is coupled through an inverter gate 176 and AND gate 177 to the D input of the flip-flop 155. The Q output of flip-flop 155 connects to the D input of another D-type flip-flop 178 and the Q output of this flip-flop 178 connects to the hold control line 66 to disable the system clock (FIG. 4). The central processor 24 remains in the hold condition until another backplane command is generated to reset the flip-flops 155 and 178.

Figure 3D:
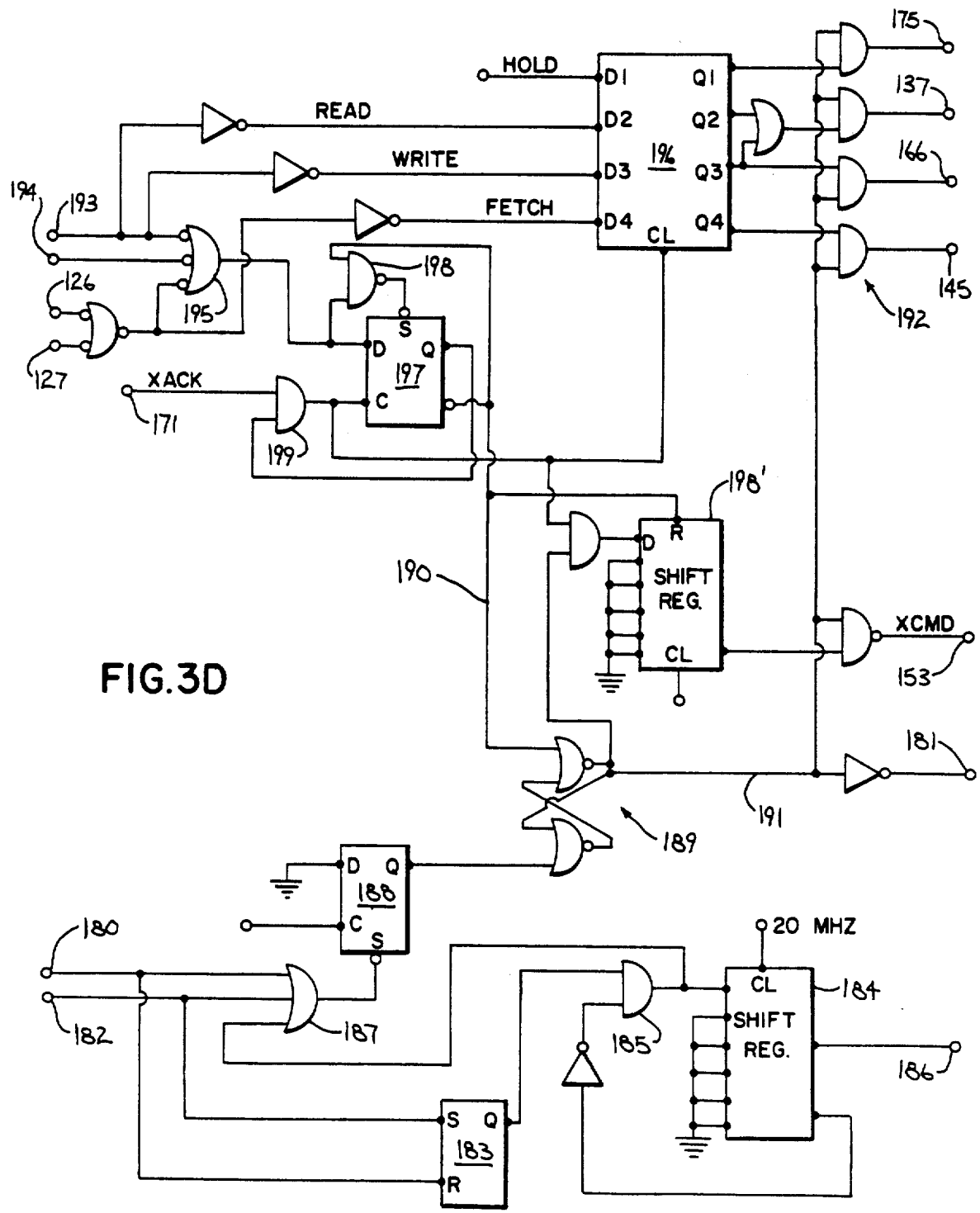

Referring particularly to FIGS. 2, 3D and 25, the central processor 24 contains circuitry for determining which module in the programmable controller may have access to the backplane bus 1. An arbitration request control line 182 connects to each module on the backplane bus 1 and when a module wants access, it asserts an arbitration request logic signal to the arbitration circuit on the central processor 24. This signal sets a flip-flop 183, which in turn applies a logic signal to a shift register 184. The shift register 184 generates a 200 nanosecond arbitration pulse on a backplane control line 186, and as will be described in more detail hereinafter, the requesting module having the highest priority will respond to this pulse by asserting a signal on a WIN control line 180. The successful module will then assert a "bus busy" signal on a backplane control line 181 and initiate a data transfer.

The central processor module 24 may gain access to the backplane bus 1 when no other module in the programmable controller needs it. Referring to FIG. 3D, this condition is sensed by an OR gate 187 which sets a flip-flop 188 when the backplane bus 1 is not requested by another module. The flip-flop 188 drives a pair of NOR gates 189 and when the central processor module 24 wants access, as indicated by the logic state of a WANT control line 190, a logic high enabling signal is generated on an IGOT control line 191. The IGOT control line 191 drives the BUS BUSY control line 181 and it enables a series of AND gates 192 which couple the processor module 24 to the backplane HOLD control line 175, the control line 137 (see FIG. 3B), the backplane read/write control line 166 and the control line 145 (see FIG. 3B).

The WANT control line 190 is enabled whenever the central processor module 24 requires the backplane bus 1 to perform a read operation, a write operation or a macroinstruction FETCH. A BACK READ control line 193 is enabled when a BACKR microcode is executed and a BACK WRITE control line 194 is enabled when a BACW microcode is executed. These signals along with the macroinstruction buffer empty signals on lines 126 and 127 are applied to an OR gate 195 and to the respective inputs of a quad D-type flip-flop 196. The output of the OR gate 195 drives a D-type flip-flop 197 which is set by a NAND gate 198 when access is desired and the flip-flop 197 generates a logic low signal on WANT control line 190. This logic low voltage releases a shift register 185 from reset and a logic high voltage is generated by the flip-flop 197 to an AND gate 199 to clock the quad flip-flop 196. The contents of the quad flip-flop 196 is gated to the respective control lines 175, 137, 166 and 145 by the AND gates 192, and a short time thereafter, the XCMD backplane control line 153 is activated by the output of the shift register 185 to indicate that valid data is on the system backplane bus 1. When the module with which the central processor module 24 is communicating acknowledges that the data transfer has occurred, the backplane control line XACK 171 rises to a logic high voltage to clock the flip-flop 197 and to thereby either initiate another transfer or reset it.

Referring particularly to FIG. 25, the arbitration process is performed concurrently with the transfer of data between modules. That is, prior to the completion of a read or write cycle on the backplane bus 1, the arbitration process has already occurred and the highest priority module desiring access to the backplane bus 1 has been found and is ready to perform a read or write operation when the bus becomes available. Bus availability is indicated by a logic high on the bus busy control line 181 and shortly thereafter the new "master" module of the backplane bus initiates a read or write cycle. The master module drives the XCMD control line 153 low to indicate that a valid address is on the backplane bus 1 and the addressed "slave" module responds by driving the XACK control line 171 low. The XCMD control line 153 is released by the master module shortly thereafter and the slave module responds by releasing the XACK control line 171 to complete the read or write cycle.

Any module, except the CPU module 3, can request arbitration by driving the control line 182 low. As described previously, this causes an arbitration pulse to be sent to all modules through the control line 186, and the highest priority module will drive the WIN control line 180 low to terminate arbitration. That module will then take control of the backplane bus 1 when the bus busy control line 181 goes high.

Referring particularly to FIGS. 1, 2, 18 and 19, when the CPU module 3 is powered up it operates in one of five possible modes. In mode 1 the CPU module 3 is not processing, but is waiting for other modules in the system to initialize. In mode 2, it is waiting for the I/O scanner module 7 to perform a "prescan" which initializes the I/O image and data table memory 12 and the data table in the memory module 2. In mode 3 the CPU module 3 performs a "program prescan" in which the control program is executed, but all output devices are disabled. Mode 4 is the "run" mode in which the control program is executed to operate the devices connected to the programmable controller, and mode 5 is the program load mode in which the control program is entered and edited from the terminal 8. The current CPU mode is stored in the CPU ram 12 and in the system status portion of the memory module 2.

Figure 18:
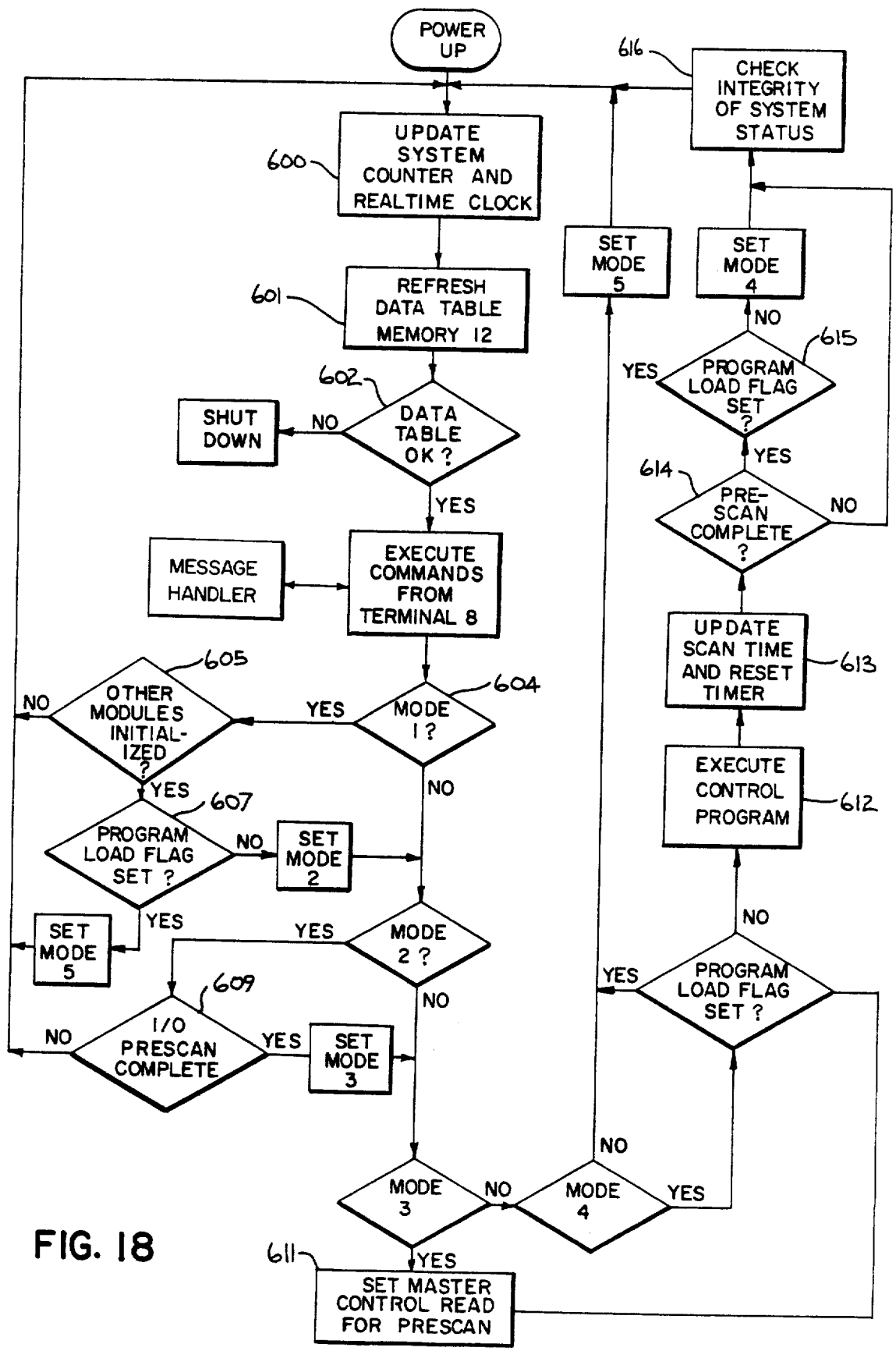
FIG. 18 is a flow chart of the functions performed by the CPU module of FIG. 1.

Referring particularly to FIGS. 18 and 19, regardless of the mode of operation, the CPU module 3 periodically performs a number of housekeeping chores. As indicated by process block 600, a set of instructions are executed to increment the system counter and the real time clock which are both stored in the system data portion 620 of the memory module 2. The system counter indicates to other modules in the system that the CPU module 3 is functioning and the real time clock provides day and time information. As indicated by process block 601 the CPU module 3 then refreshes certain data in its memory 12. More specifically, it reads data from the access control block portion 621 of the memory module 2 which indicates the memory location of various portions of the control program and the data table stored in the memory module 2. These "pointers" are maintained in the CPU memory 12 to reduce the time required to access data in the memory module 2 during execution of the control program. If this data is in error, as indicated by decision block 602, the CPU module is shut down and all output devices are disabled. Normally, however, the CPU module 3 next executes commands it has received from the terminal 8 as indicated by process block 603. As will be explained in more detail hereinafter, the CPU module 3 includes a message handler routine which communicates with other backplane modules, and which couples command messages from the module that supports the terminal 8. Such commands may be, for example, editing commands which call for the deletion or addition of instructions in the control program.

Referring still to FIGS. 18 and 19, after these housekeeping functions have been performed, the CPU module 3 determines which mode it is operating in and performs the functions required. Immediately following power-up the CPU module is in mode 1 as determined by decision block 604, and the only function performed is to determine if the other modules in the system have been initialized and are ready to run. This is determined by instructions indicated by decision block 605 which examine the system status counter 606 stored in the system data portion of the memory module 2. As will be explained in more detail hereinafter, the system I/O scanner module 7 is responsible for setting the system status counter 606 to the number of modules present during power-up. As each module initializes itself, it decrements the system counter. Until this counter is decremented to zero, the CPU module 3 remains in the mode 1 loop comprised of blocks 600-605.

When all system modules have initialized the CPU module 3 may switch to mode 2. Before doing so, however, a check is made to determine if the system has been set to the "program load mode." This is indicated at decision block 607 and is accomplished by examining the system mode field 608 in the system status portion 620 of the memory module 2. As will be explained in more detail hereinafter, it is another one of the functions of the system I/O scanner module 7 to monitor the front panel switches through the front panel interface module 11 and to maintain the system mode field 608.

In mode 2 the CPU module 3 waits for the I/O scanner module 7 to perform an I/O prescan in which the data tables in both memory module 2 and CPU ram 12 are initialized to the current state of all input devices connected to the programmable controller. Instructions indicated by decision block 609 are executed to examine an I/O prescan counter 610 in the system status portion of memory module 2. Each I/O scanner module 7 and system I/O bus interface module 6 in the system decrements this I/O prescan counter 610 when it has completed its prescan, and when the counter 610 reaches zero, the CPU module 3 switches to mode 3.

In mode 3 the CPU module 3 executes a "prescan" of the control program to build a table of target addresses for jump instructions and subroutine calls as described in U.S. Pat. No. 4,115,853. As indicated by process block 611, a master control relay is first set by the CPU module 3 to insure that all logic decisions made during the control program prescan are false and that no output devices are energized. Also, during the prescan no branches jumps or subroutine calls are executed to insure that each and every instruction in the control program is fetched and executed. As indicated by process block 612, each control program instruction is fetched from the memory module 2, mapped to the proper microprogram in the CPU module 3 and executed. The last microinstruction in each microprogram includes a FETCH code which directs the CPU module 3 to read the next control program instruction from the memory module 2.

This sequence continues until the "END" instruction is fetched. The END instruction functions to reset the control program counter to the start of the control program and to read the scan counter 76 (FIG. 4). The scan counter 76 is reset to zero and the scan time is saved in the system data section (FIG. 19) as indicated by process block 613 in FIG. 18. The scan time is a measure of the time required to execute the control program and is particularly useful in time-critical applications where the effects of changes to the control program during program development cannot be easily predicted.

Referring still to FIG. 18, if the control program prescan is complete as determined at decision block 614, the CPU module 3 is ready to run. First, however, a check is made at decision block 615 to determine if the program load mode has been requested, but if not, the module is set to mode 4. Regardless of the mode, after the control program has been executed a check is made of the system data section to determine if any major fault conditions have occurred as indicated at process block 616. The system loops back to commence another scan if no problems exist. Otherwise, the system shuts down.

Referring particularly to FIG. 1, the control program instructions, or "macroinstructions," are loaded into the memory module 2 using the terminal 8. The terminal 8 operates in combination with the peripheral processor module 5 to not only load macroinstructions into the memory module 2, but to also edit the resulting control program and to monitor the system operation as the control program is being executed by the CPU module 3. As will become more evident from the description to follow, a number of macroinstructions infer or expressly define operands, which are stored in the I/O image and data table memory 12. This memory 12 is on the CPU module 3 and is constructed of very high speed devices which enable the macroinstructions to be executed more efficiently. Typically, each macroinstruction is prefetched by the CPU module 3 from the memory module 2 and it is held until the previous macroinstruction has been executed. When that is completed, the macroinstruction operation code is mapped to a stored microprogram which carries out the indicated functions. Typically, the function is carried out with one or more operands located in the I/O image and data table memory 12.

The macroinstruction set includes many instructions which are common to programmable controllers such as bit manipulating instructions and timers and counters. Others are less common and some are unique either in the function they perform or the manner in which they perform the function. The macroinstruction set can be grouped into a number of subsets as set forth in Table A.

Referring particularly to FIGS. 20A–20E, each macroinstruction includes an operation code and an operand or operand address. The "rung control" and "program control" macroinstructions are one 16-bit word in length and each includes a 8-bit operation code. The rung control instructions also include an 8-bit offset number which may be added to the macroinstruction counter to branch around control program instructions which are not to be executed. The program control instructions include an 8-bit label number which identifies an entry in the label table which is stored in the CPU ram 12 and which is created during the control program prescan.

The "test/control bit" macroinstructions are formed by a 16-bit word containing the 8-bit operation code and a 4-bit pointer code followed by one or more operand address words. "Timer/counter" macroinstructions are similar except they include a 7-bit timer/counter number and a single bit (L) which indicates whether or not the macroinstruction includes additional words for addressing beyond the range of the 7-bit timer/counter number.

The "arithmetic/logic" instructions are more complex. In addition to the first word which contains the 8-bit operation code, they include one or more words which indicate the address of a first source of data, a second source of data and a destination for the output of the arithmetic or logical operation. The first word of the arithmetic and logic instructions also includes a bit (I) which indicates if any of the data to be operated upon is floating point and a bit (F) which indicates if any of the data to be operated upon is more than one word (i.e., a file). The remaining 5 bits in the first word indicate the total number of words in the macroinstruction. If a data file is operated upon as indicated by the F bit, the first word in an arithmetic or logic macroinstruction is followed by one or more file control words which indicate how the file is to be processed.

The address structure referred to above in connection with FIGS. 20C–20E is shown in more detail in FIG. 21. It is comprised of one or two words as determined by a single bit (L) in the first word. Another bit (F) in the first word indicates if a file is being addressed and the first four bits of the word indicate which of the sixteen sections of the data table is being addressed. The remaining ten bits of the first word identify a location in the indicated data table section or they form the most significant bits of a much larger address when a second word is present in the structure. The structure of the data table portion of the memory module 2 is shown in FIG. 24 and it should be apparent from the above description that the size of any of the sixteen sections of this data table can range to a very large capacity.

When arithmetic or logic macroinstructions operate on a file, they require a file control word shown in FIG. 20E. The structure of such file control words is shown in more detail in FIG. 22. The structure is comprised of one or two words as determined by the first two bits of the first word and the same two bits determine in which of two modes, complete or distributed complete, the file is to be operated upon. In the complete mode the file control word is a transfer number which indicates the number of words to be operated upon in the indicated file or files. Each time the macroinstruction is executed, the arithmetic or logic operation is sequentially performed on the number of words in the file indicated by this number. In contrast, the distributed complete mode of operation requires a rate number in addition to the transfer number, and each time the macroinstruction is executed, only the number of words indicated by the rate number are operated upon. This continues until the total number of words indicated by the transfer number are operated upon. The distributed complete mode of operation on a data file enables the operations to be distributed over a number of scans so that the control program scan time is not excessive when an operation on a large data file is made.

Referring particularly to FIG. 23, for each timer and counter required by the control program there exists a three-word data structure in the timer or counter sections of the data table stored in memory module 2. This structure includes a control word which indicates the status of the timer or counter, a preset value word, and an accumulated value word. The accumulated value word stores the number of counts or time increments which have taken place and the preset value word stores the total with which the accumulated value is compared.

TABLE A

MACROINSTRUCTION SET

1. Rung Control Instructions

| | |
|---|---|
| STRT | Transparent "start of rung" instruction which includes a program counter offset to the first conditional or branch output instruction in the rung. It sets the condition of the rung to the state of the master control relay (MCR) and it provides the information needed to skip instructions that need not be executed. |
| STMC | Same as STRT, but it sets the rung condition true irrespective of the MCR or ZCL state. |
| BST | Defines the start of a branch in a rung and includes a program counter offset to the next |

TABLE A-continued
MACROINSTRUCTION SET

| | |
|---|---|
| NXB | NXB instruction to allow skipping of instructions in a false branch. Defines the start of another branch and includes a program counter offset to the next NXB or BND instruction to allow skipping of instructions in a false branch. |
| BND | Defines the end of one or more branches and checks to determine if any of the branches are true. If not, it includes the program counter offset to the output instruction to enable skipping of unnecessary instructions. |
| STOB | Defines the start of output branches each containing an output instruction. It contains the program counter offset to the first output instruction to enable skipping of further test instructions when the rung or output branch tests false. |
| NXOB | Defines start of additional output branches and contains the program counter offset to the output instruction in the branch it defines. |

2. Program Control Instructions

| | |
|---|---|
| MCR | Defines a master control relay that is included as an output instruction in a rung. When set false, all rungs which follow are set false by STRT instructions, thus enabling the MCR to control entire blocks of output devices. Rungs which start with an STMC instruction are not affected by the state of the MCR. |
| LBL | Creates a table containing the absolute memory address of targets for JMP and JSR instructions. See U.S. Pat. No. 4,115,853. |
| JMP | A conditional jump to its corresponding LBL instruction. The jump is made if the rung in which it appears is true. |
| JSR | A call to a subroutine identified by the corresponding LBL instruction. The return program counter value is saved and the call occurs only if the rung containing the JSR instruction is true. |
| RET | Signals the end of a subroutine and returns to the instruction following the JSR instruction which called the subroutine. |
| ZCL | Defines the start and end of a block of instructions which are to be skipped when the rung containing the first ZCL instruction is false. |
| HALT | Unconditional emergency stop of the programmable controller processor with a fault indication. |
| END | Unconditional end of program which resets the watchdog timer and restarts the execution of the control program at its beginning. The END instruction also defines the set time of the watchdog timer enabling the user to control the maximum allowable scan time. |

3. Test Bit Instructions

| | |
|---|---|
| XIC | Test the status of a bit in the I/O image |
| XOE | table. The rung condition remains true if the bit is on (1) and is set false if the bit is off (0). The instruction includes the address of the I/O image table word and a bit pointer which identifies the particular bit in that word. |
| XIO | Same as XIC and XOE except rung condition is |
| XOD | set false when the tested bit is on (1) and remains unchanged when the bit is off (0). |

4. Control Bit Instructions

| | |
|---|---|
| OTE | If the rung condition is true and the master control relay (MCR) is inactive this instruction sets an indicated bit in the I/O image table on (1). Otherwise, the bit is set off (0). |
| OTL | Same as OTE except that the indicated bit is not set off (0), but is instead left unchanged. |
| OTU | If the rung condition is true and the master control relay (MCR) is inactive, this instruction resets a bit in the I/O image table to off (0). Otherwise, no action occurs. |

5. Timer/Counter Instructions

| | |
|---|---|
| CTU | If the rung condition becomes true and the master control relay (MCR) is inactive, the indicated counter is incremented one count. |
| CTD | Same as CTU but the indicated counter is decremented one count. |
| RTO | This retentive timer instruction sets a "done bit" to on (1) at a preset time interval after the rung condition becomes true. If the rung condition becomes false during the time interval, timing stops but the accumulated time is retained. |
| RES | This instruction resets the accumulated count in an indicated counter or it resets the accumulated time in a retentive timer. |
| TON | This timer instruction sets a "done bit" to on (1) at a preset time interval after the rung condition becomes true. If the rung condition becomes false the done bit is reset to off (0) and the accumulated time is reset. |
| TOF | This timer instruction resets a "done bit" to off (0) at a preset time interval after the rung condition becomes false. If the rung condition becomes true, the done bit is set to on (1) and the accumulated time is reset. |

6. Arithmetic and Logical Instructions

| | |
|---|---|
| ADD | This instruction adds two source operands together and stores the sum in the indicated destination. The appropriate status register bits (result zero, carry, overflow and sign) are set. |
| SUB | This instruction subtracts the second source operand from the first source operand and stores the difference in the indicated destination. The appropriate status register bits are set. |
| MULT | This instruction multiplies the two source operands together and stores the product in the indicated destination. The appropriate status register bits are set. |
| DIV | This instruction divides the first source operand by the second source operand and stores the quotient at the indicated destination. The appropriate status register bits are set. |
| NEG | This instruction subtracts the first source operand from zero and stores the result in the indicated destination. The appropriate status register bits are set. |
| SQRT | This instruction takes the square root of the first source operand and stores the result at the indicated destination. The appropriate status register bits are set. |
| MOVE | This instruction moves the data at the first source operand to the indicated destination and sets the appropriate status register bits. Data is automatically converted when the source and destination are different data type sections of the data table 623. |
| CMP | This instruction subtracts the second source operand from the first source operand and sets the rung condition false if the comparison fails. The particular comparison to be made is indicated by the destination operand and includes:<br>Equal<br>Not Equal<br>Greater Than<br>Less Than<br>Greater Than Or Equal To<br>Less Than Or Equal To |
| LIMIT TEST | This instruction sets the rung condition false if the first source operand is not between the second source operand and the destination operand. |
| AND | This instruction performs a logical AND on each bit of the first source operand with the corresponding bits of the second source operand. The results are stored in the destination operand and the appropriate status register bits are set. |
| OR | Same as the AND instruction except a logical |

| | TABLE A-continued |
|---|---|
| | MACROINSTRUCTION SET |
| | OR is performed on each bit. |
| XOR | Same as the AND instruction except an exclusive OR function is performed on each bit. |
| NOT | This instruction takes the complement of each bit in the first source operand and stores the result in the destination. The appropriate status register bits are set. |
| | 7. Transparent Instructions |
| SKIP | This instruction is employed to set off portions of the control program which contains nonexecutable data. Such data may be, for example, comments which are to be displayed on the terminal 8. |

PERIPHERAL PROCESSOR

The peripheral processor module 5 provides interface capability for up to four peripheral devices through serial ports. Such peripheral devices may include the industrial terminal 8, a host computer, the front panel interface module 11, a teletype or similar terminal. The peripheral processor module 5 is microprocessor based and the protocol of each of its four serial ports is under software control. This enables the module 5 to be easily configured to accommodate a wide variety of peripheral devices.

Figure 7:
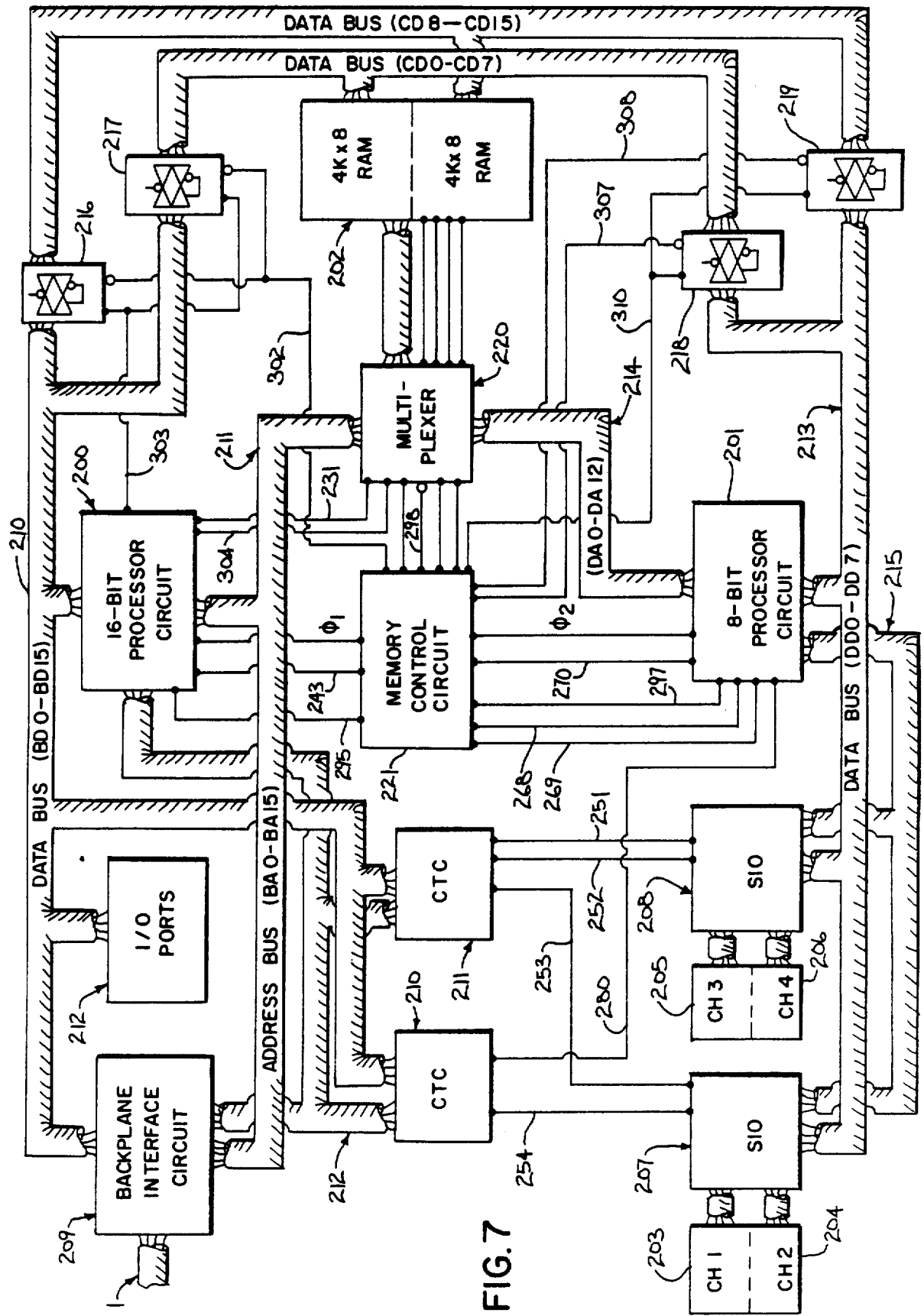
FIG. 7 is an electrical block diagram of the peripheral processor module which forms part of FIG. 1.

Referring particularly to FIG. 7, the peripheral processor module 5 includes a 16-bit processor 200 and an 8-bit processor 201 which share a common random access memory (RAM) 202. The 8-bit processor 201 services the four serial ports indicated at 203–206 using two serial input/output (SIO) circuits 207 and 208. The 16-bit processor 200 operates to communicate with other modules on the backplane bus 1 through a backplane interface circuit 209, and it operates two counter timer circuits (CTC) 210 and 211. The 16-bit processor 200 also drives a set of parallel I/O ports 212 which include inputs for switches and outputs for status indicator lights.

The 8-bit processor 201 inputs characters received through the serial ports 203–206, performs some code conversion functions on this data, and writes the data to the common RAM 202. It also reads data from the common RAM 202, performs code conversions on this data and outputs it to the proper serial I/O port 203–206. The 16-bit processor communicates with the other modules in the programmable controller through the backplane bus 1 and it reads data from and writes data to the common RAM 202. The 16-bit processor 200 functions under the direction of an operating system which assigns functional modules to each of the four serial ports and provides an environment which supports the functions assigned to each serial port 203–206. Such functions may include, for example, the execution of commands which are input from the industrial terminal 8 through one of the serial ports 203–206. Such a command is comprised of a series of characters stored in the common memory 202, and when detected, the 16-bit processor 200 may perform a function such as reading a portion of the control program stored in the memory module 2 and outputting it to the industrial terminal 8 or creating a gap in the control program and writing a new control program instruction into the resulting memory space.

Referring still to FIG. 7, the 16-bit processor 200 is connected to the backplane interface circuit 209, the CTC 210, the CTC 211, and the common memory 202 by a 16-bit address bus 210 and a 16-bit address bus 211. A number of control lines also connect these elements, some of which are indicated collectively as a control bus 212. Similarly, the 8-bit processor 201 is coupled to the SIO 207, SIO 208 and the common memory 202 by an 8-bit data bus 213, a 13-bit address bus 214 and a number of control lines, some of which are indicated collectively as a control bus 215.

The 16-bit data bus 210 is coupled to the common memory 202 through two sets of bi-directional data gates 216 and 217 and the 8-bit data bus 213 is coupled to the common memory 202 by two sets of bidirectional data gates 218 and 219. The respective address buses 211 and 214 are coupled to the common memory 202 by a multiplexer circuit 220, which operates in response to signals from a memory control circuit 221 to allow either the 16-bit processor 200 or the 8-bit processor 201 access to the common memory 202. As will be described in more detail hereinafter, the memory control circuit 221 operates the bidirectional gates 216 and 217 and the multiplexer 220 to enable the 16-bit processor 200 to read or write a 16-bit word to the common memory 202, or it operates the bidirectional gates 218 or 219 and the multiplexer 220 to enable the 8-bit processor to read or write an 8-bit byte to the common memory 202.

Figure 8:
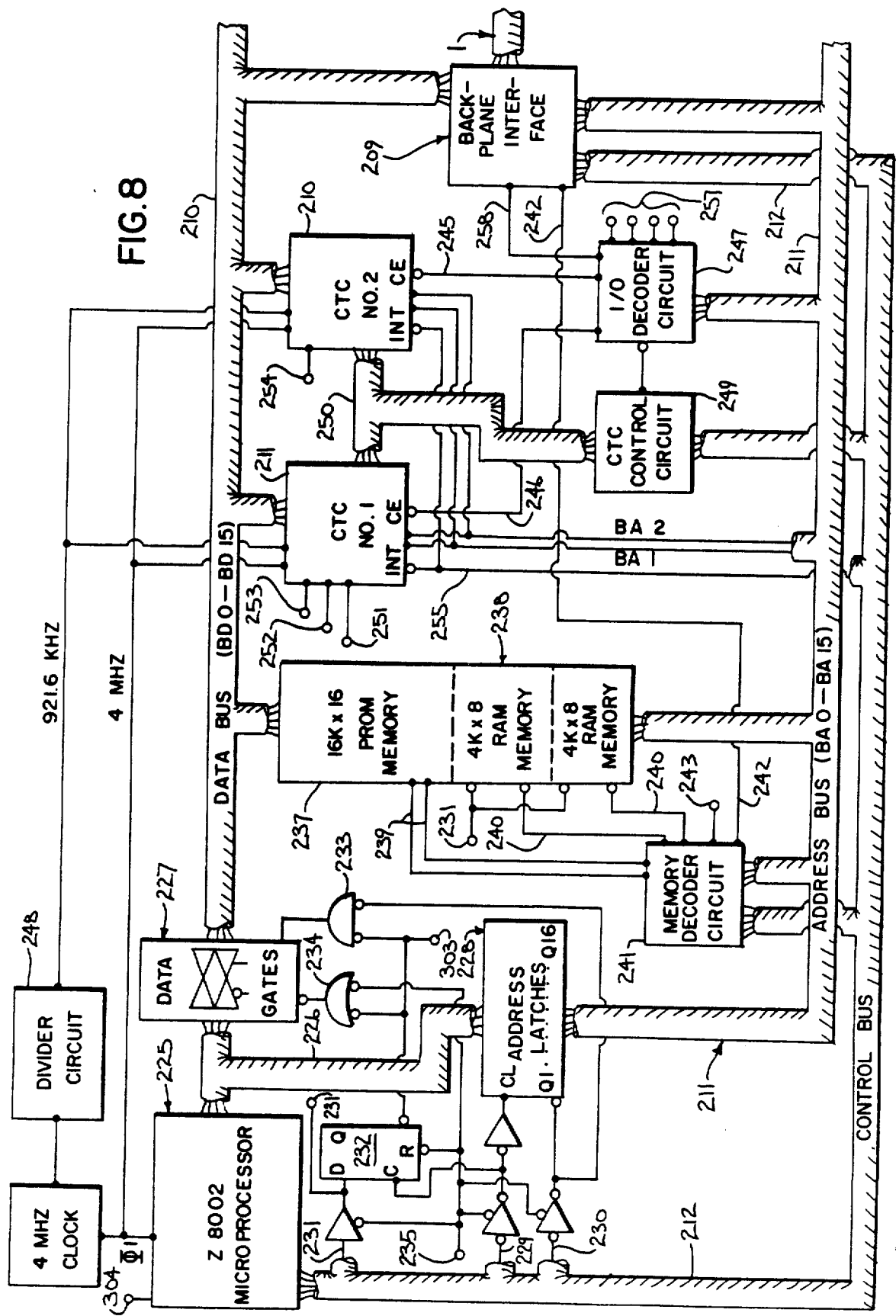
FIG. 8 is an electrical schematic diagram of the 16-bit processor circuit which forms part of the circuit of FIG. 7.

Referring to FIGS. 7 and 8, the 16-bit processor 200 is formed around a 16-bit microprocessor 225 which is commercially available as the model Z8002. The microprocessor 225 drives a 16-lead data/address bus 226 which is coupled to the 16-lead data bus 210 by a set of bidirectional data gates 227 and which is coupled to the 16-lead address bus 211 by a set of latches 228. The data gates 227 and the latches 228 are controlled by the microprocessor 225 through an address strobe line 229, a data strobe line 230 and a read/write line 231. These control lines as well as many others connected to the microprocessor 225 are indicated as part of the control bus 212. During each read operation, the read/write line 231 sets a flip-flop 232 to activate a gate 233 and an address generated by the microprocessor 225 is then clocked into the latches 228 by the address strobe line 229. The data strobe line 230 is then driven low to both enable the address in the latches 228 to be applied to the address bus 211 and to enable the gate 233 to input data from the data bus 210. During a write operation the flip-flop 232 is reset to enable a gate 234 and an address is again clocked into latches 228. During the subsequent data strobe, data is coupled from the microprocessor 225, through the gates 227 to the data bus 210 and the address in the latches 228 is applied to the address bus 211. As will be described in more detail hereinafter, a bus disable line 235 may be driven low to disable this circuitry and thus effectively disconnect the microprocessor 225 from the buses 210 and 211 and the read/write line 231. For a detailed description of the 16-bit microprocessor 225 and its operation, reference is made to the "AMZ8000 Family Data Book" published in 1980 by Advanced Micro Devices, Inc.

The microprocessor 225 operates in response to instructions which are stored in a read-only memory 237 and it operates on data which is stored in a random access memory 238. The memories 237 and 238 are connected to the least significant digit leads in the address bus 211 and to the sixteen leads in the data bus 210. The read-only memory 237 is comprised of a block containing 8K 16-bit words and the RAM 238 is comprised of two blocks each containing 4K 8-bit bytes. The read-only memory circuit chips are activated by a pair of chip select lines 239 to enable any of its 8K words to be addressed. Either or both of the RAM memory circuit chips may be activated by a pair of chip enable lines 240 to enable any of the 8K bytes to be addressed or to enable any of 4K 2-byte words to be addressed.

The control lines 239 and 240 are driven by a memory decoder circuit 241 which connects to the three most significant digit address bus leads and to a number of microprocessor control lines in the bus 212. In addition to enabling the memories 237 and 238 when their addresses appear on the bus 211, the decoder circuit 241 also generates a backplane request signal on a line 242 and a common memory request signal on a line 243. As will be described in more detail hereinafter, the backplane request signal is generated to initiate an arbitration process in the backplane interface circuit 209, and the common memory request signal indicates to the memory control circuit 221 that the 16-bit processor 200 wants access to the common memory 202.

Referring particularly to FIGS. 7 and 8, the 16-bit microprocessor 225 initializes the counter timer circuits (CTC) 210 and 211 to generate clock signals of the proper frequency to each of the SIO channels. Each CTC 210 and 211 is a programmable component which can operate under various modes and conditions to interface with a wide range of peripheral devices. Each CTC 210 and 211 is programmed by control data received from the 16-bit microprocessor 225 through the data bus 210. This control data is written into the CTC 210 or 211 when enabled by respective control lines 245 or 246 and it is directed to one of four internal channels as determined by the address bus leads BA1 and BA2. The CTC enable lines 245 and 246 are driven by an I/O decoder circuit 247 which connects to the address bus leads BA4, BA5 and BA6 and which is enabled by a CTC control circuit 249. The CTC control circuit 249 not only enables the decoder 247, but it also interfaces the CTC control lines 250 with the microprocessor control lines 212 as described in "A Small Z8000 System" published in 1980 by Zilog, Inc. The CTC 210 and CTC 211 also receive the 4 MHZ clock signal which drives the microprocessor 225 and they receive a 921.6 KHZ clock from a divider circuit 248 which is employed to derive the standard serial communication baud rates.

The CTC 211 generates baud rate clock signals through three lines 251–253 to the SIOs 208 and 207 and the CTC 210 generates a baud rate clock through a line 254 to the SIO 207. In addition, the CTCs 210 and 211 connect to an interrupt line 255 which connects to the 16-bit microprocessor 225. The CTCs 210 and 211 may thus be programmed to generate interrupts at selected time intervals or when internal counters are decremented to zero. They also may provide the address vectors to corresponding interrupt service routines stored in the read-only memory 237. For a more detailed description of the CTCs 210 and 211, reference is made to the "Z80A-CTC Technical Manual" published in 1977 by Zilog, Inc.

The I/O decoder circuit 247 not only enables the CTCs 210 and 211, but it also enables the I/O ports 212 and an address latch in the backplane interface circuit 209. The I/O ports include an eight bit output port which drives serial port status indicators, and two 8-bit input ports for monitoring serial port status. These are enabled through control lines 257. A control line 258 connects to the backplane interface circuit 209 and enables the 16-bit microprocessor 225 to write a page address into a latch prior to requesting access to the backplane bus 1. As will be described in more detail hereinafter, this allows the peripheral processor module access to the full address space provided on the backplane bus 1.

Figure 9:
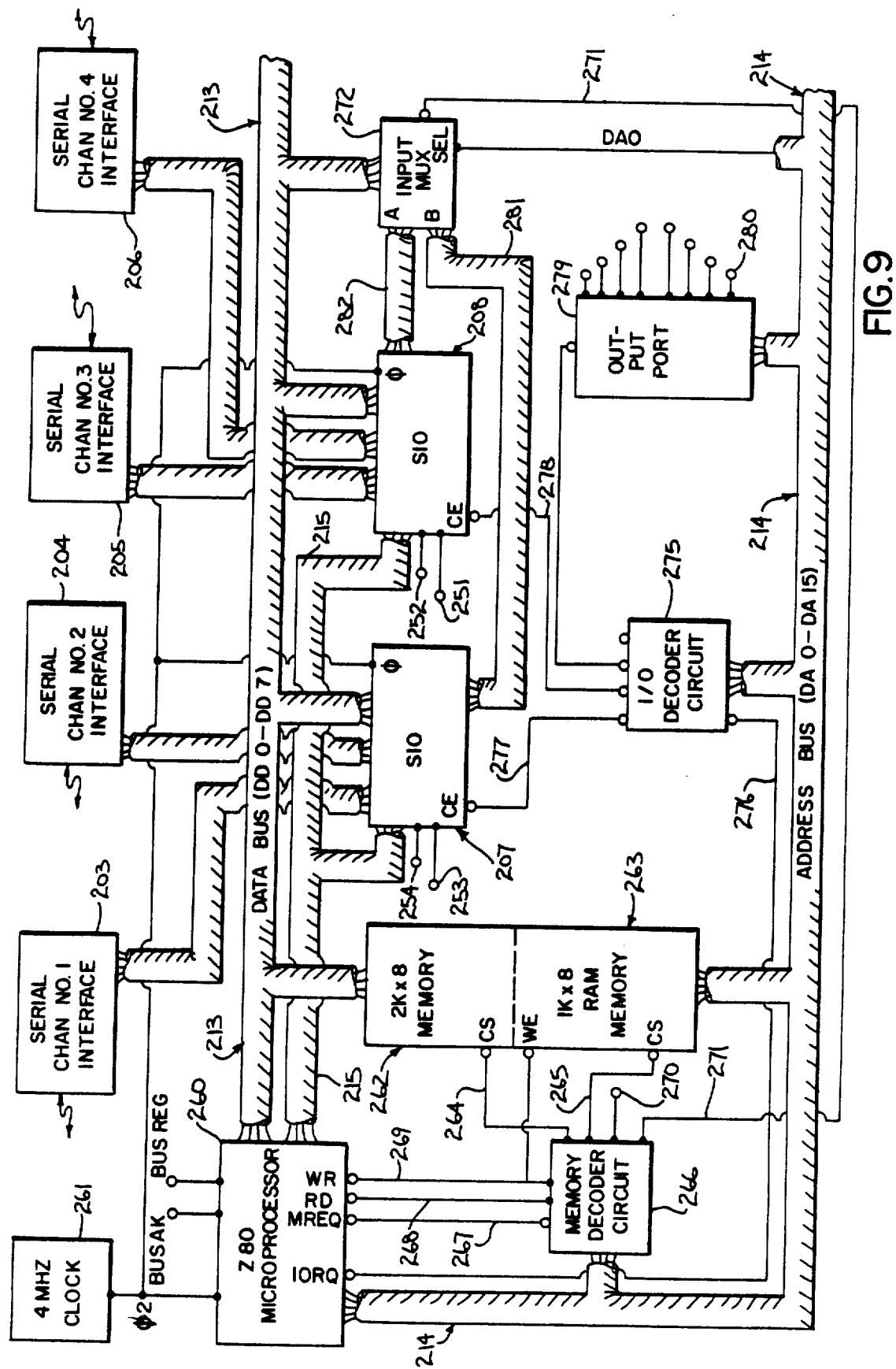
FIG. 9 is an electrical schematic diagram of the 8-bit processor circuit which forms part of the circuit of FIG. 7.

Referring particularly to FIGS. 7 and 9, the 8-bit processor 201 is formed around an 8-bit microprocessor 260 which is commercially available as the model Z80. It connects directly to the 8-bit data bus 213, the 16-bit address bus 214 and the control bus 215. The 8-bit microprocessor 260 is driven by a 4 MHZ clock 261 and it operates in response to instructions stored in a read-only memory 262 to process data stored in a random access memory 263.

The memories 262 and 263 are connected to the data bus 213 and address bus 214, and when addressed, they are enabled through control lines 264 and 265 by a memory decoder circuit 266. The decoder circuit 266 is operated by a pair of address bus leads and a set of three microprocessor control lines 267–269. The decoder circuit 266 also drives a common memory request line 270 which connects with the memory control circuit 221 and it drives a multiplexer enable line 271 which connects with an input multiplexer 272.

The SIOs 207 and 208 perform parallel-to-serial and serial-to-parallel conversion of 8-bit bytes of data which are conveyed between the serial channels 203–206 and the data bus 213. The SIOs 207 and 208 each contain two channels which can be separately configured with control data generated by the microprocessor 260 to accommodate virtually all byte or bit-oriented, synchronous or asynchronous protocols. Control data or message data can be written to either SIO 207 or 208 or read from it by generating their respective addresses on the bus 214. An I/O decoder circuit 275 connects to the address bus 214 and an IORQ control line 276 and it generates an enabling signal on control line 277 or 278 when the respective SIOs 207 or 208 is addressed. The I/O decoder 275 also enables a parallel output port 279 which may be employed to operate external devices such as modems and which may also be employed to generate an interrupt request to the 16-bit processor 200 through a line 280 which connects with the CTC 210.

The input multiplexer 272 receives status data from each of the SIOs 207 and 208 through respective buses 281 and 282. When enabled by the control line 271, the multiplexer selects one of the two applied status words and couples it to the data bus 213. In this manner status information such as ready-to-receive, ready-to-send, parity error, framing error, overflow, etc. can be input to the microprocessor 260 and analyzed. For a more detailed description of the SIOs 207 and 208 reference is made to the "Z-80 SIO Technical Manual" published in 1978 by Zilog, Inc.

Figure 10:
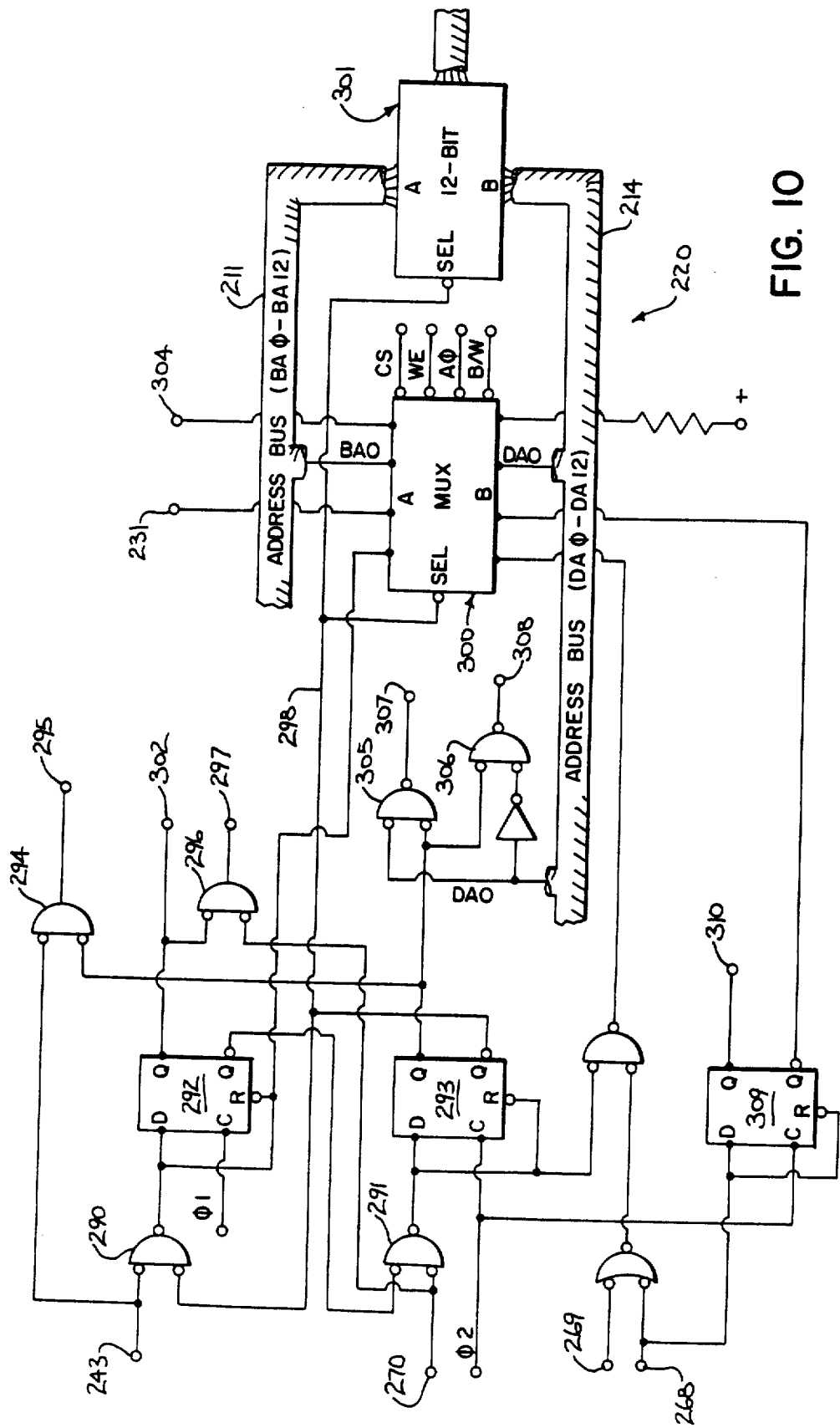
FIG. 10 is an electrical schematic diagram of the memory control circuit which forms part of the circuit of FIG. 7.

Referring particularly to FIGS. 7 and 10, the memory control circuit 221 controls access to the common memory 202, both in response to requests generated by the 16-bit processor 200 on the control line 243, and in response to requests generated by the 8-bit processor 201 on the control line 270. These requests are coupled through respective gates 290 and 291 to the data input on respective D-type flip-flops 292 and 293. If the memory 202 is available, the request resets the corresponding flip-flop 292 or 293 and inhibits the operation of the other flip-flop. Otherwise, the requesting microprocessor is put in a "wait" state until the memory 202 becomes available. Gate 294 generates a wait signal on a line 295 to the 16-bit processor 200 when the memory is busy, and a gate 296 generates a wait signal on line 297 to the 8-bit processor 201 when it is not allowed access to the memory 202. A select line 298 is driven by the flip-flop 293 and it connects to select terminals on both a 4-bit multiplexer 300 and a 12-bit multiplexer 301. The multiplexer 300 connects the selected processor control lines to the common memory 202 and the multiplexer 301 connects the selected processor address bus 210 or 211 to the common memory 202.

When the 16-bit processor 200 gains access to the common memory 202 the flip-flop 292 is reset and the flip-flop 293 is set. The Q output of flip-flop 292 is at a logic low voltage and this is applied to the enable terminals on the bidirectional data gates 216 and 217 through a control line 302. The direction of data flow is determined by a read/write control line 303 which eminates directly from the 16-bit processor 200 and the common memory 202 is cycled to perform a read or write operation in response to the state of the read/write control line 231. The operation will involve a 16-bit word if a B/W control line 304 is low and it will involve an 8-bit byte if this line is high. The selection of the most significant byte or least significant byte is determined by bit BAO in the address bus 211.

If the 8-bit processor 201 has access to the common memory 202 the flip-flop 293 is reset and the flip-flop 292 is set. The Q output of flip-flop 293 is applied to two gates 305 and 306 and the DAO bit in the address bus 214 enables one of them to generate an enabling signal on a control line 307 or 308 to a corresponding one of the bidirectional data gates 218 or 219. The direction of data through the gates 218 or 219 is determined by the read line 268 which sets or resets a D-type flip-flop 309. The Q output of this flip-flop is applied to the multiplexer 300 to control the write enable (WE) control line on the common memory 202 and its Q output controls the direction of the data gates 218 and 219 through a control line 310.

Figure 11A:
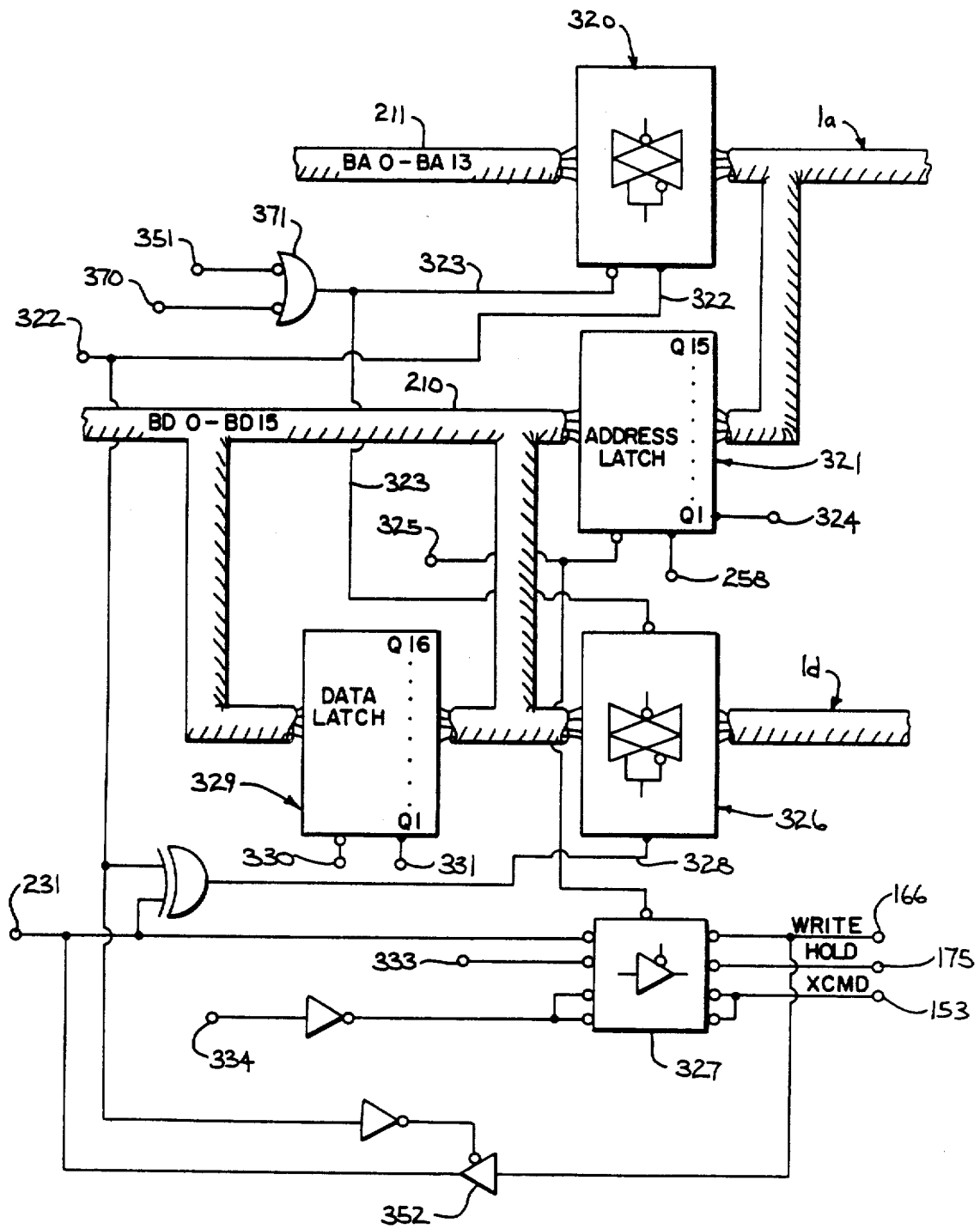
FIGS. 11A-11C are circuit diagrams of the backplane interface circuit which forms part of the circuit of FIG. 7.
Figure 11B:
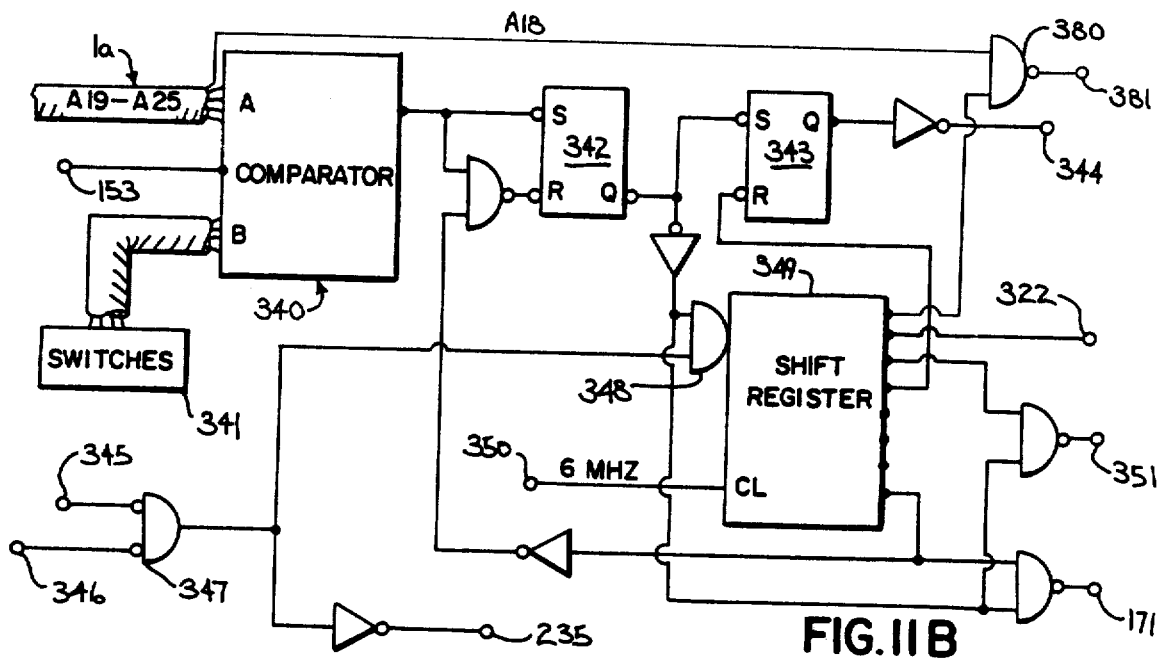

Referring particularly to FIGS. 7, 11A and 11B, the backplane interface circuit 209 arbitrates for possession of the backplane bus 1, sends data from the peripheral processor module 5 to other modules on the backplane bus 1, recognizes data on the backplane bus 1 for the peripheral processor module 5, and inputs such data. As shown in FIG. 11A, the sixteen-bit processor address bus 211 couples to the backplane address bus 1a through a set of bidirectional gates 320 and the sixteen-bit processor data bus 210 also couples to the backplane address bus 1a through an address latch 321. The gates 320 couple address data between the buses 211 and 1a in a direction controlled by the state of a direction control line 322 and the gates 320 are enabled through an enable control line 323. The address latch 321 receives and stores address data generated on the data bus 210 when the control line 258 is active and this stored address data is generated on the backplane bus 1a when a control line 325 is active.

Prior to accessing the backplane bus 1, the 16-bit processor 200 loads a "page number" address in the latch 321. This page number address is applied to the most significant digit leads in the backplane address bus 1a and it defines an 8K address space which has been assigned to another module on the backplane bus 1. The gates 320 connect the fourteen least significant digit leads in the address buses 211 and 1a, and they therefore identify one location in the selected 8K address space. A backplane enable control line 324 is also driven by the address latch 321, and it becomes active when a backplane request is made.

The backplane interface circuit 209 also connects the data bus 210 to the data bus 1d as well as selected control lines. Referring still to FIG. 11A, the data buses 210 and 1d are connected through a set of sixteen bidirectional gates 326 and a set of peripheral processor control lines are coupled to the backplane control lines XCMD 153, HOLD 175 and WRITE 166 by a set of gates 327. The direction of data through the gates 326 is determined by the logic state of a control line 328 and the gates 326 are enabled along with the address gates 320 by the control line 323. Although data is input from the backplane data bus 1d directly to the sixteen-bit processor data bus 210, data is output using a sixteen-bit data latch 329. More specifically, the sixteen-bit processor 200 writes data to the data latch 329 and this data is latched when a control line 330 becomes active. A control line 331 is active when access to the backplane bus 1 is granted and the data in latch 329 is then coupled through the bidirectional gates 326 to the backplane data bus 1d.

The gates 327 are enabled by the control line 325 to couple selected peripheral processor control lines to the backplane bus. These include the sixteen-bit processor read/write line 231, a XHOLD control line 333 and a CMD control line 334 which drive the respective backplane control lines WRITE 166, HOLD 175 and XCMD 153.

Referring particularly to FIG. 11B, when another module on the backplane bus 1 addresses the peripheral processor module 5, the 8-bit and 16-bit processors 200 and 201 stop processing and data is either written to or read from the module 5. The backplane address bus 1a connects to the "A" inputs of a comparator circuit 340, and when the address thereon compares with that applied to the "B" inputs by a set of switches 341, and the backplane XCMD control line 153 is active, access to the peripheral processor 5 is gained. A pair of flip-flops 342 and 343 are set when this occurs, and a direct memory access (DMA) request is generated through a control line 344 to both microprocessors 225 and 260. When both microprocessors 225 and 250 acknowledge the request through control lines 345 and 346, gates 347 and 348 are enabled and a logic high is input to a shift register 349. Concurrently, the control line 235 is driven low to effectively disconnect the 16-bit microprocessor 225 from its buses and control lines. The shift register is then clocked through a line 350 to sequentially drive the control line 322, a control line 351 and the backplane XACK control line 171. The shift register 349 also resets the flip-flops 342 and 343.

Referring to FIG. 11A, the control line 322 sets the bidirectional gates 320 to input an address from the backplane bus 1a and it enables a tristate gate 352 to drive the 16-bit processor read/write line 231 in response to the state of the backplane WRITE line 166. The backplane WRITE line 166 then controls data direction in the gates 326 through an exclusive OR gate 353. The control line 351 is then activated to enable the address to be applied to the 16-bit processor bus 211 through the gates 320 and to enable the data gates 326 to transfer data in the proper direction. A logic low voltage is then generated on the backplane XACK control line 171 to acknowledge the transfer of data. The circuit is then reset in preparation for the next request from the backplane bus 1.

Figure 11C:
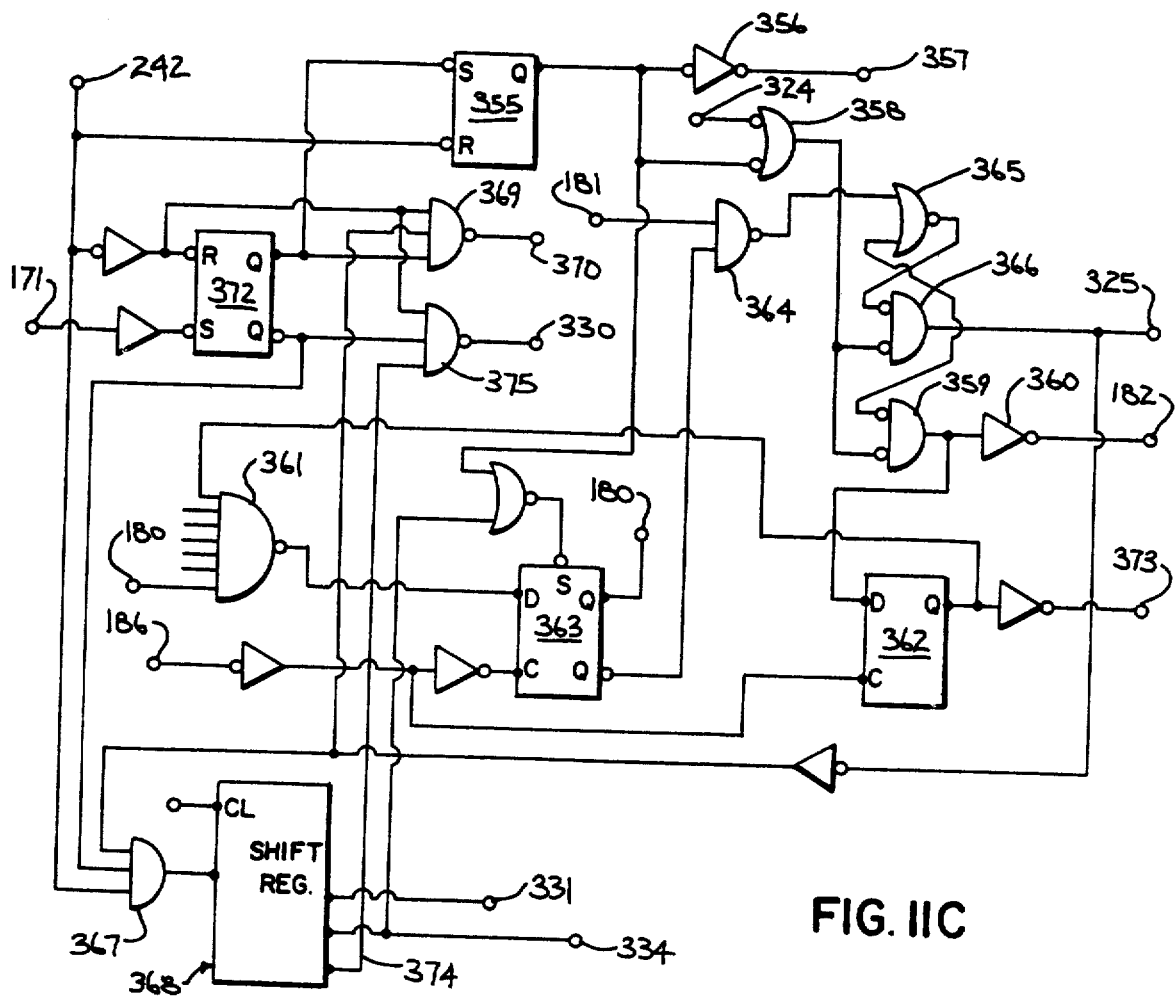

Referring particularly to FIGS. 11A and 11C, when the peripheral processor module 5 is to read or write from another module on the backplane bus 1, the 16-bit processor 200 generates a logic low voltage on the control line 242 to initiate a bus request. The control line 242 resets a flip-flop 355 which outputs a signal through gate 356 and control line 357 to drive the 16-bit microprocessor 225 into its "wait" state. The microprocessor 225 is held in this state until access to the backplane bus 1 is obtained and the data transfer can be made. The flip-flop 355 also generates a signal through gates 358–360 to the arbitrate request control line 182 to bid for control of the backplane bus 1.

The arbitrate request signal on line 182 initiates the arbitration process in the central processor module 3. It responds by generating an arbitration pulse on backplane arbitration control line 186 which is applied to the clock terminals on respective D-type flip-flops 362 and 363. The flip-flop 362 is set when this occurs to generate a logic low voltage on a backplane bus request control 373 to indicate to all other modules in the system that the peripheral processor module 5 is bidding for access. The output of the flip-flop 362 also connects to a NAND gate 361 which also receives bus request signals generated by other modules in response to an arbitration pulse as well as a WIN signal on the backplane control line 180. Only those modules having a higher priority than the peripheral processor module 5 are connected to generate bus request signals to the NAND gate 361, and in the preferred embodiment, this priority is determined by the physical location of the modules on the motherboard.

If the peripheral processor 5 is the highest priority module requesting backplane access, the NAND gate 361 is enabled by the arbitration pulse generated on the arbitration control line 186 and the D-type flip-flop 363 is reset. If the backplane bus is not currently busy, as indicated by backplane control line 181, a NAND gate 364 is then enabled by the flip-flop 363 and a flip-flop formed by gates 365 and 366 is set to assert the control line 325 and to thereby enable the latch 321 and the control line gates 327 (FIG. 11A). The output of flip-flop gates 366 also enables a gate 367 which drives the input of a shift register 368 and a NAND gate 369. The NAND gate 369 drives control line 370, and as shown in FIG. 11A, control line 370 connects to gate 371 which enables the address gates 320 and the data gates 326 to thereby connect the peripheral processor module to the backplane bus 1.

Referring particularly to FIGS. 11A and 11C, the shift register 368 provides timing for the data transfer. Shortly after the peripheral processor module 5 gains access to the backplane bus 1 the data latch 329 is enabled through control line 331 to output its contents. If a backplane write operation is being performed, this data is coupled through gates 326 to the backplane data bus 1d. A control line 334 is then driven high by the shift register 368 and this is coupled through the gates 327 to the backplane XCMD control line 153. This signals other modules that valid data is on the backplane 1. The control line 334 also sets the flip-flop 363 to reset the circuitry and when the data is received by the other module, it acknowledges through XACK control line 171 to set the flip-flop 372. And finally, if a read operation is being performed, the shift register 368 generates an active signal on a line 374 to a NAND gate 375. The NAND gate 375 controls the data latch 329 through control line 330 and the data which has been input through gates 326 from the backplane data bus 1d is now output to the peripheral processor data bus 210. The flip-flop 372 is set by the XACK signal from the module from which data is read and the flip-flop 355 is set to release the microprocessor 225 from its wait state.

The backplane interface 209 thus serves to respond to requests made from the backplane 1 for a read from the peripheral processor module 5 or a write to the peripheral processor module 5, and it responds to requests made by the peripheral processor module 5 to perform read or write operations on the backplane bus 1. The peripheral processor module 5 contends with other modules in the system for use of the backplane bus 1, and except for the CPU module 3, the priority of each module is determined by the physical slot it is connected to on the motherboard.

Referring again to FIGS. 8 and 11B, other modules on the backplane bus 1 can interrupt the operation of the peripheral processor module 5. This is accomplished by generating a specific address within the peripheral processor's address space. One lead (A18) in the backplane bus 1a connects to a NAND gate 380, and when the interrupt address is generated on the backplane bus 1, the NAND gate 380 generates an interrupt request on a line 381 which is applied to the CTC 210. The CTC 210 interrupts the microprocessor 225 and vectors it to a backplane message interrupt service routine. As will be explained in more detail hereinafter, this enables backplane modules to communicate with one another by exchanging message data.

SYSTEM I/O SCANNER MODULE

The system I/O scanner 7 is a single board microprocessor based module which directly interfaces the system backplane bus 1 with from one to four serial I/O buses which each connect to one or more I/O racks 16. The module 7 will also support communications with the front panel interface 11, and through a connector on the front panel interface 11, the system I/O scanner module 7 will also support the terminal 8. Indeed, although the system I/O scanner module 7 may be employed along with the other system modules as shown in FIG. 1, it is contemplated that the module 7 may also be configured as the sole means for performing I/O functions on small systems containing only a CPU module 3, a memory module 2 and a front panel interface 11.

Figure 12:
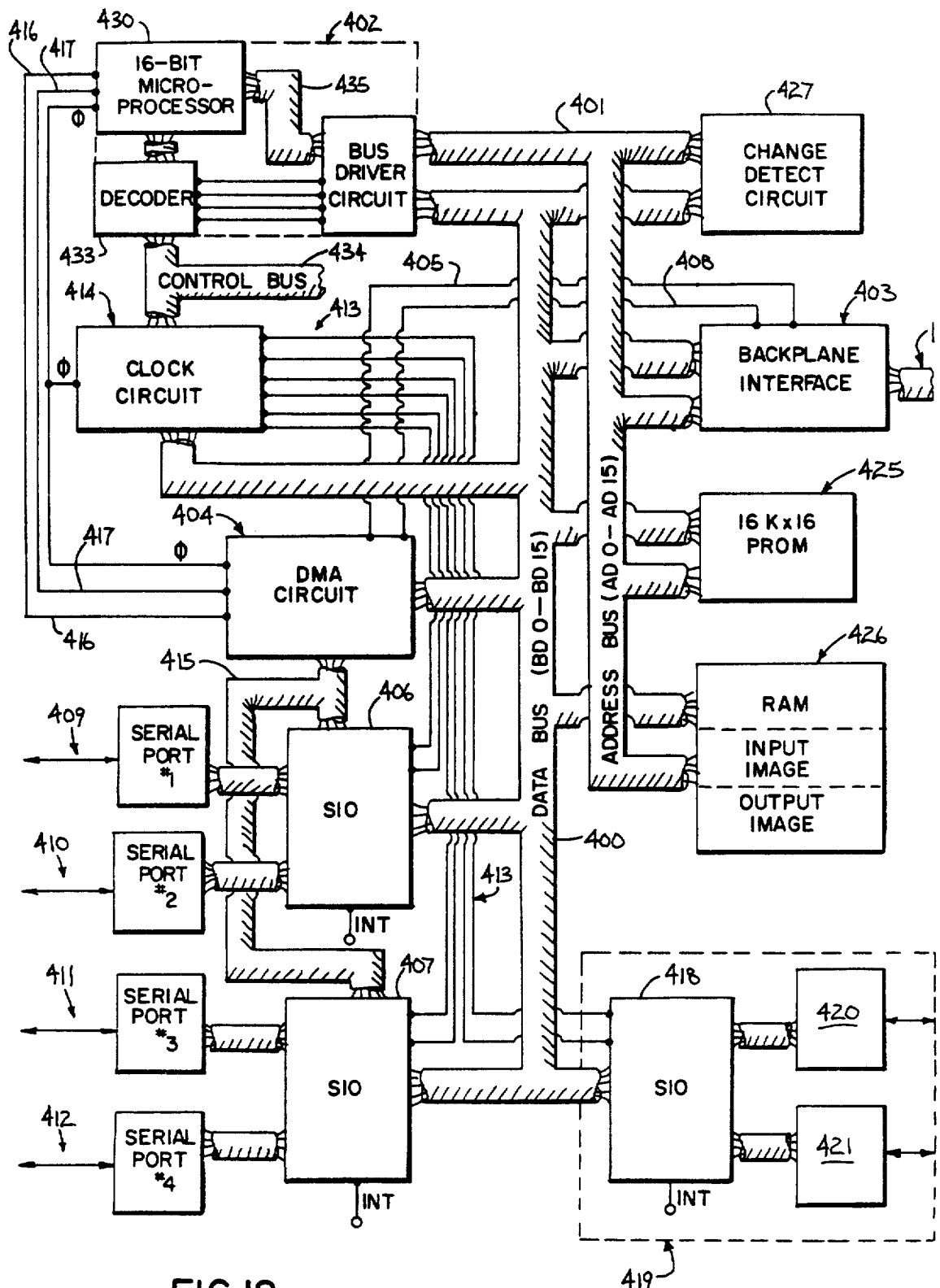
FIG. 12 is a block diagram of the I/O interface module which forms part of the system of FIG. 1.

Referring particularly to FIGS. 1 and 12, the system I/O scanner module 7 is structured about a sixteen-bit data bus 400 and a sixteen-bit address bus 401 which are controlled by a microprocessor circuit 402. The buses 400 and 401 are coupled to the system backplane bus 1 through a backplane interface circuit 403 and when data is to be transferred to or from the system backplane bus 1, the backplane interface circuit 403 makes a request to a DMA circuit 404 through a BPREQ control line 405. As will be explained in detail below, the DMA circuit 404 acknowledges the request through a BPACK control line 408 when the backplane interface circuit 403 can have access to the buses 400 and 401 to perform its data transfer. The structure and operation of the backplane interface circuit is virtually identical to the corresponding circuit in the peripheral processor module 5 described above.

The DMA circuit 404 responds not only to requests from the backplane interface circuit 403, but also to similar requests received from two serial input/output circuits (SIOs) 406 and 407. The two SIOs 406 and 407 provide an interface to four serial I/O buses 409, 410, 411 and 412 which connect to I/O racks 16. The two channels in each SIO 406 and 407 are driven by clock lines 413 which connect to a clock circuit 414. When the SIOs 406 or 407 are ready to transmit a message or have received a message from a serial port 409-412, they generate a request signal to the DMA circuit 404 through a bus 415. The DMA circuit 404 generates a DMA request to the microprocessor 402 through a request line 416, and when the microprocessor 402 completes execution of its current instruction, it grants the DMA request through a line 417. The DMA circuit 404 then takes control of both the buses and the SIOs 406 and 407 to perform the message data transfer. When an end-of-message character is received by an SIO 406 or 407, it generates an interrupt request on control line INT to the microprocessor 402. As will be explained below, the microprocessor 402 responds to the interrupt by transferring the incoming message to the proper module in the system and by sending a message to one of the I/O racks 16.

Referring particularly to FIG. 12, a third SIO 418 also connects to the module data bus 400 and is driven through a pair of the clock lines 413. The SIO 418 forms part of an optional circuit 419 which interfaces the module 7 to the front panel 11 through a pair of serial ports 420 and 421. Both serial ports 420 and 421 connect to lines in the system backplane bus 1 which connect to the ribbon connector leading to the front panel. Serial port 420 exchanges data at 4800 baud with the processor in the front panel circuit 11 and the serial port 421 exchanges data through an RS 232C connector which is mounted on the front panel. The SIO 418 is interrupt driven and when data is received, the microprocessor 402 is interrupted and vectored to the proper interrupt service routine.

The microprocessor 402 operates in response to instructions which are stored in a read-only memory (PROM) 425. These include interrupt service routines which are executed in response to interrupt requests on the INT control line, programs for executing tasks and communicating through the system backplane 1 with other modules in the system, and programs for configuring and driving the SIOs 406, 407 and 418.

The primary function of the system I/O scanner module 7 is to couple input/output data between the I/O image and data table 12 in the CPU module 3 and the I/O racks 16 which connect to the scanner module 7. The speed with which the scanner module 7 performs this function is an important factor in the operation of the programmable controller system and the preferred embodiment of the invention provides a unique structure to accomplish this. More specifically, a random access memory (RAM) 426 connects to the module buses 400 and 401, and in addition to providing work space for the microprocessor 402, it stores a copy of the output portion of the CPU module's I/O image table memory 12. The microprocessor 402 continuously updates the image table in the RAM 426 by reading output status data from the CPU module 3 and reading input status data from the I/O racks 16. The microprocessor 402 also continuously writes its output image table data to the I/O racks 16 and writes its input status data to the CPU module 3. This continuous updating, or "refreshing", of the I/O devices and associated I/O image tables is done at a relatively low priority and it is performed regardless of whether or not changes are occurring in the status of input/output devices.

Superimposed on this I/O refresh process is a high speed I/O update process which couples data indicative of changes in input/output status data. When data is written to the image table in the RAM 426 by the CPU module 3 (via the backplane interface 403) a change detect circuit 427 is enabled and stores an indication of which line in the RAM image table 426 was changed. The microprocessor 402 operates to repeatedly test the change detect circuit for such changes in I/O status data, and when a change is detected, to rapidly relay the detected change on to the I/O rack 16. In this manner, changes in status data are rapidly processed while the continuous I/O refresh process of all I/O points is carried on in the background.

Figure 13:
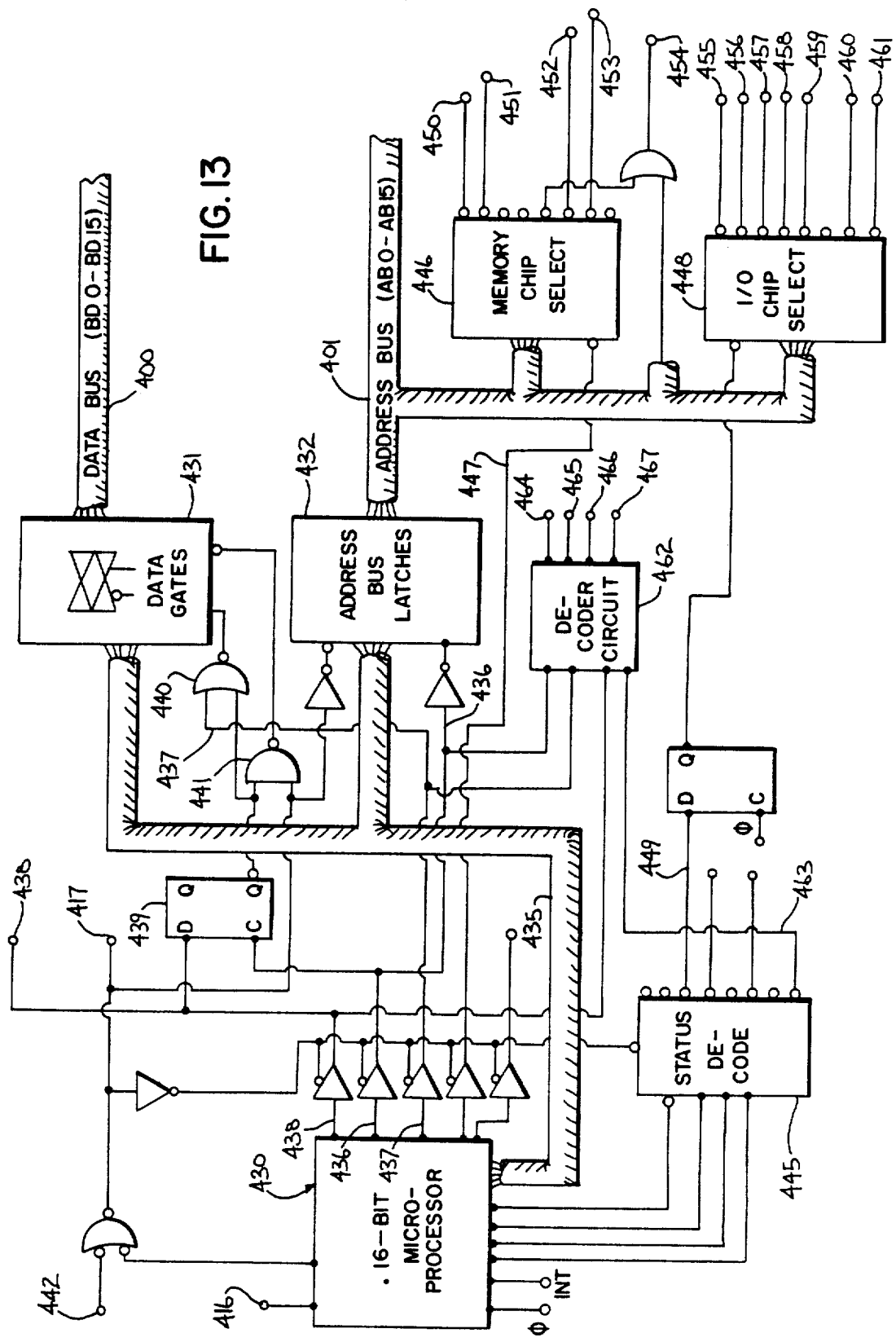
FIG. 13 is an electrical schematic diagram of the processor which forms part of FIG. 12.

Referring particularly to FIGS. 12 and 13, the microprocessor 402 is comprised of a 16-bit microprocessor 430 which couples to a bus driver circuit comprised of a 16-bit bidirectional data gates 431 and a 16-bit address bus latch 432. The microprocessor control lines connect to gates and decoder circuits which are collectively indicated in FIG. 12 as decoder 433 and which drive a number of module control lines indicated collectively in FIG. 12 as control bus 434.

Referring to FIG. 13, the 16-bit microprocessor 430 is commercially available as the model Z8002 and it drives a 16-lead data/address bus 435 which is coupled to both the data gates 431 and the address bus latches 432. The data gates 431 and the latches 432 are controlled by the microprocessor 430 through an address strobe line 436, a data strobe line 437 and a read/write line 438. During each read operation, the read/write line 438 sets a flip-flop 439 to activate a gate 440 and an address generated by the microprocessor 430 is then clocked into the latches 432 by the address strobe line 436. The data strobe line 437 is then driven low to both enable the address in the latches 432 to be applied to the address bus 401 and to enable the gate 431 to input data from the data bus 400. During a write operation the flip-flop 439 is reset to enable a gate 441 and an address is again clocked into latches 432. During the subsequent data strobe, data is coupled from the microprocessor 430, through the gates 431 to the data bus 400 and the address in the latches 432 is applied to the address bus 401. As will be described in more detail hereinafter, a bus disable line 442 may be driven low to disable this circuitry and thus effectively disconnect the microprocessor 430 from the buses 400 and 401 and the read/write line 438. For a detailed description of the 16-bit microprocessor 430 and its operation, reference is made to the "AMZ8000 Family Data Book" published in 1980 by Advanced Micro Devices, Inc.

Referring still to FIG. 13, the control signals for operating the various circuits in the scanner module 7 are derived from address data and control signals generated by the microprocessor 430. A three-to-eight status decode circuit 445 decodes the four status output signals from the microprocessor 430, a memory chip select circuit 446 is enabled by a MEM REQ control line 447 and an I/O chip select circuit 448 is enabled by an I/O REF output 449 from the status decode circuit 445. The chip select circuits are responsive to the address on bus 401 to enable the indicated circuits through control lines 450-461. The functions of these control lines 450-461 are indicated in the following table.

| Control Line | Function |
| --- | --- |
| 450 | Enable PROM 425 |

| Control Line | Function |
| --- | --- |
| 451 | Enable PROM 425 |
| 452 | Enable change detect circuit 427 |
| 453 | Request access to backplane from circuit 403 |
| 454 | Enable RAM 426 |
| 455 | Enable SIO 406 |
| 456 | Enable SIO 407 |
| 457 | Enable CTC 471 |
| 458 | Enable CTC 472 |
| 459 | Latch backplane address (hi portion) in circuit 403 |
| 460 | Enable DMA circuit 487 |
| 461 | Enable SIO 418 |

A decoder circuit 462 connects to the microprocessor control lines 436–438 and to a VIACK output 463 on the status decoder 445. The decoder circuit 462 operates to generate control signals similar to those generated by the 8-bit microprocessor sold commercially as the model Z-80, and reference is made to "A Small Z8000 System" published in 1980 by Zilog, Inc. for a more detailed description of its operation. It generates signals on a WR control line 464, an IORQ line 465, an M1 line 466 and a RD line 467 which are employed to operate many of the integrated circuits in the module 7.

Figure 14:
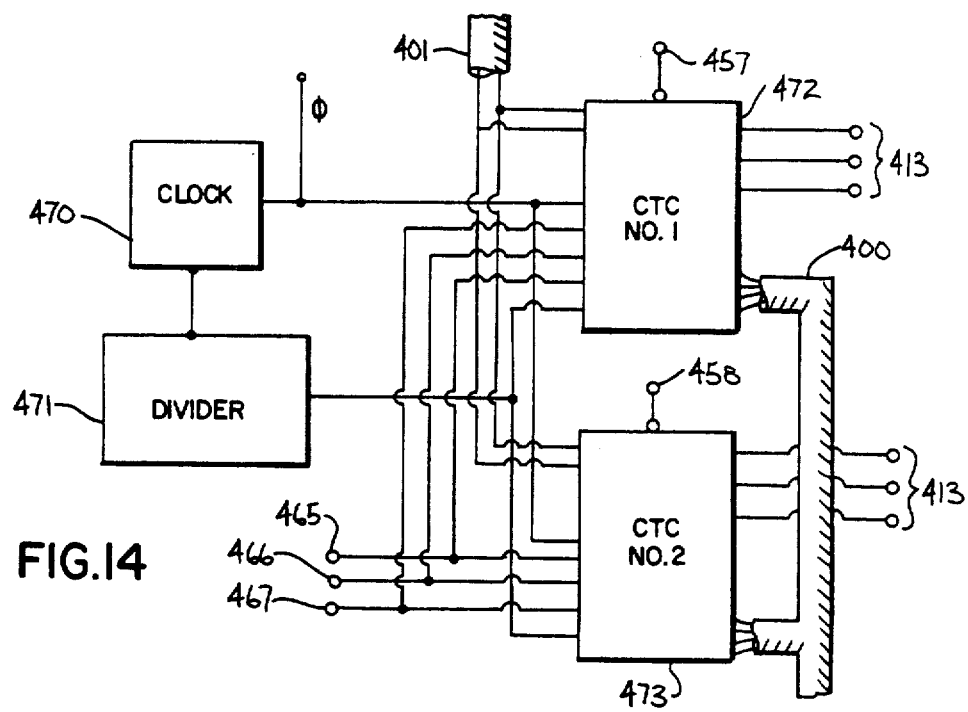
FIG. 14 is an electrical schematic diagram of the clock circuit which forms part of FIG. 12.

Referring particularly to FIGS. 12 and 14, the clock circuit 414 is comprised of a 4 megahertz clock 470, a divider 471 and a pair of counter timer circuits (CTCs) 472 and 473. The clock 470 generates the system clock 0 and it applies a clock signal to the divider 471 which reduces it in frequency to 1.8432 megahertz. The CTCs 472 and 473 receive these clock signals as well as control signals on lines 465–467 and address signals on leads AB3 and AB4. The CTCs 472 and 473 are initialized with data from the data bus 400 to generate clock signals of the desired frequencies on the lines 413 to each channel of the three SIOs 406, 407 and 418. This initialization is under program control and hence the baud rates of the six serial channels on the scanner module 7 may be easily changed to meet the specific requirements of the installation.

Figure 15:
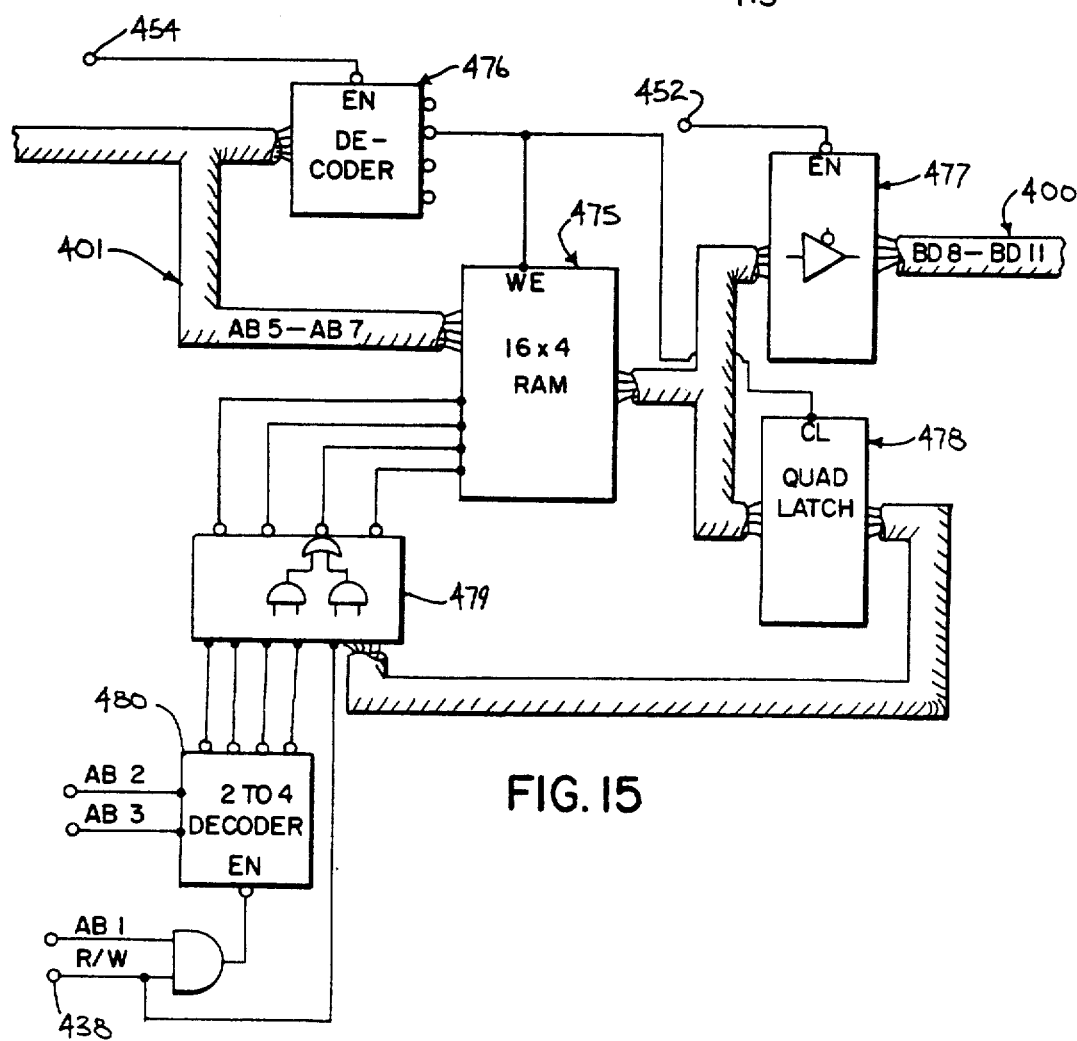
FIG. 15 is an electrical schematic diagram of the change detect circuit which forms part of FIG. 12.

Referring particularly to FIGS. 12 and 15, the change detect circuit 427 includes a sixty-four-bit random access memory (RAM) 475 which is arranged as sixteen 4-bit words. Its four address inputs connect to the address bus 401 and its write enable input (WE) connects to one output of a decoder 476. The RAM 475 is always enabled and it outputs data from one of its sixteen lines to a set of four output gates 477 and a quad latch 478. The output gates 477 are enabled by the control line 452, thus enabling the contents of any line in the RAM 475 to be read out to the data bus 400 under program control.

One task of the microprocessor 402 is to periodically read each line in the RAM 475 to determine if any bits have been set to a logic "1". Each bit in the RAM 475 corresponds to two lines in the image table in RAM 475 corresponds to two lines in the image table in RAM 426, and when a logic "1" is detected, the microprocessor 402 promptly reads those image table lines and prepares a message to output them to the proper I/O rack 16. The I/O scanner module 7 thus monitors the change detect RAM 475 and quickly responds to any changes made in the output image table stored in the RAM 426.

Referring particularly to FIG. 15, the proper bits in the RAM 475 are set to a logic "1" when data is written to the image table in RAM 475. Such a write cycle enables the decoder 476 through RAM enable control line 454 and the decoder 476 clocks the quad latch 478 to latch the 4-bit output of the RAM 475. This same signal writes a new 4-bit word back into the same line of the RAM 475. The new 4-bit word is formed by the old 4-bit word, which is stored in the quad latch 478, and which is logically combined with signals applied to a gate circuit 479. A 2-to-4 decoder 480 connects to the inputs of gate circuit 479 and address bus leads AB2 and AB3 drive one of four of the decoder's outputs low to select one of the four bits in the old 4-bit word. The R/W control line 438 also connects to the gate circuit 479, and it operates to set the selected bit to a logic "1" during a RAM write operation and to reset the selected bit to a logic "0" during a RAM read operation. The new 4-bit word with the selected bit altered by logic gates 479 is thus written back into the RAM 475.

Figure 16:
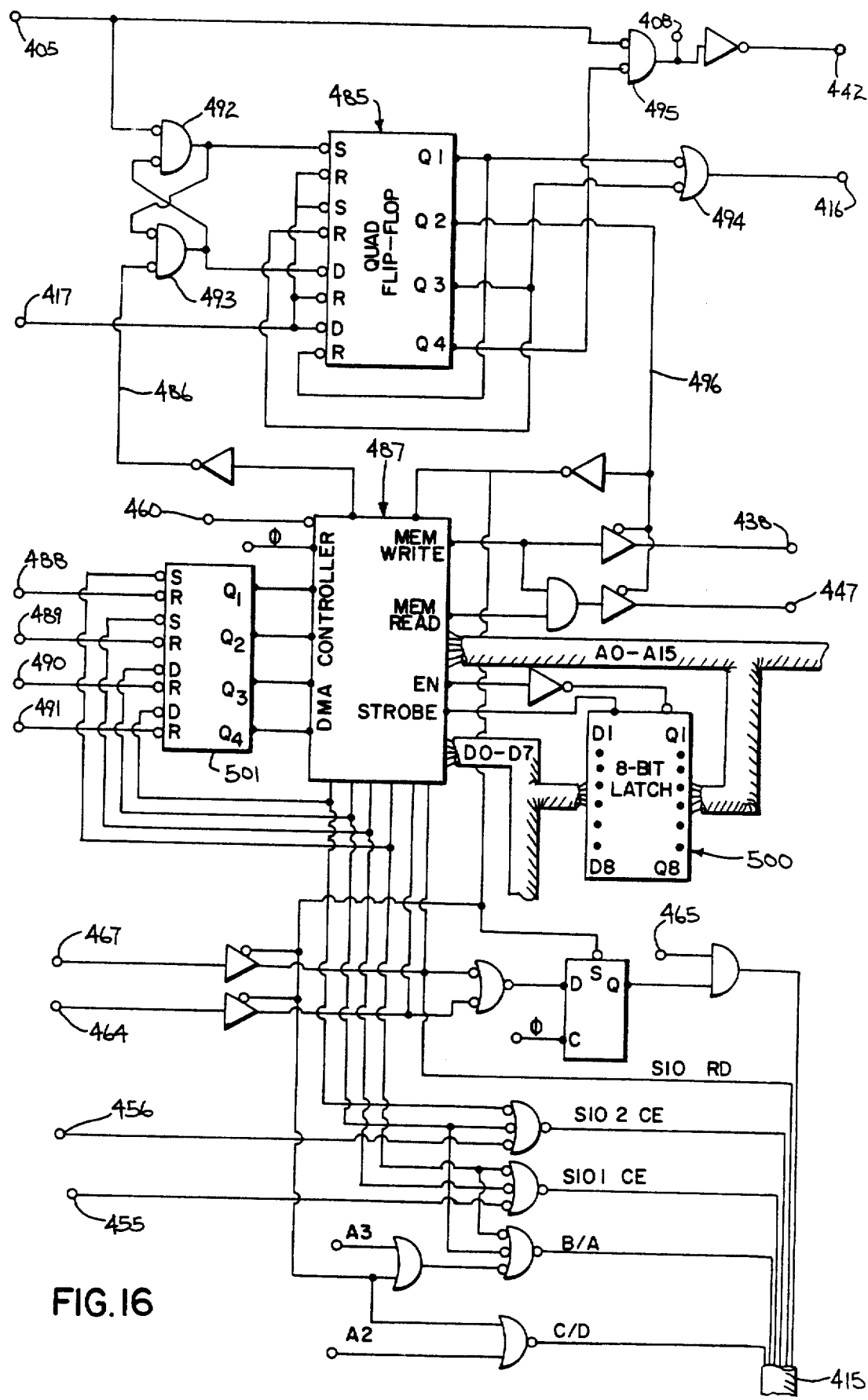
FIG. 16 is an electrical schematic diagram of the DMA circuit which forms part of FIG. 12.

Referring particularly to FIGS. 12 and 16, and DMA circuit 404 is structured about a quad flip-flop 485 which receives requests for the module buses through the backplane bus request control line 405 and a DMA request control line 486. The backplane bus request control line 405 is driven low by the backplane interface circuit 403 when another module in the programmable controller wants access to the I/O scanner module buses. The DMA request control line 486 is driven low by a DMA controller 487, which in turn is driven by the "READY" control lines 488–491 that eminate from the SIOs 406 and 407 and which connect to the DMA controller 487 through a set of flip-flops 501. The DMA controller 487 generates a logic low on the DMA request line 486 when either SIO 406 or 407 is ready to transfer a block of data to or from the module RAM 426.

A pair of AND gates 492 and 493 connect to the inputs of the quad flip-flop 485 and they are interconnected to allow only one of the two DMA request lines 405 or 486 to control at one time. If a DMA request originates from the backplane control line 405, the first flip-flop in the quad flip-flop 485 is set and its Q1 output is driven high. This is applied to an OR gate 494 which drives the bus request control line 416 low. This is applied to the 16-bit microprocessor 430 which responds by relinquishing control of the module buses and generating a logic low signal on the bus acknowledge control line 417. This sets the fourth flip-flop in the quad flip-flop 485 and its Q4 output generates a signal to the BPACK control line 408 through an AND gate 495 to initiate a transfer of data between the module 7 and the system backplane bus 1.

If a DMA request originates from one of the SIOs 406 or 407, the third flip-flop in the quad flip-flop 485 is set by the AND gate 493 and its Q3 output drives the bus request control line 416 through OR gate 494. When the 16-bit microprocessor 430 grants the request by driving control line 417 low, the second flip-flop in the quad flip-flop 485 is set and its Q2 output drives DMA ACK control line 496. The control line 496 signals the DMA controller 487 that the module buses have been relinquished and that it can proceed to perform a data transfer with the requesting SIO channel.

When the DMA controller 487 obtains control of the module buses it also takes the control lines 415 which operate the SIOs 406 and 407 and the RAM 426. The DMA controller 487 is a commercially available device which is described in a data sheet entitled "AM9517A Multimode DMA Controller Advanced Micro Devices Advanced MOS/LSI" published in 1979 by Advanced Micro Devices, Inc. It is "programmed" by the 16-bit microprocessor 430 during initialization to perform a data transfer between each of the four SIO channels and the RAM 426 when it obtains control of the buses. It loads the most significant byte of the data transfer starting address in an 8-bit latch 500 and it then generates this along with the least significant byte on the address bus 401. After each read and write operation, this address is incremented and an internal counter is decremented until the complete block of data is transferred between the requesting SIO channel and the RAM 426. In the preferred embodiment the four requesting SIO channels have rotated priority. At the completion of each message transfer the appropriate flip-flop 501 is reset and another requesting SIO channel may be serviced.

The system I/O scanner module 7 is thus structured to quickly relay any changes in output points dictated by the CPU module 3 on the proper I/O rack 16 and to relay any changes in input points detected by the I/O racks 16 on to the CPU module 3. Secondarily, the I/O scanner module 7 may be employed to interface with the terminal 8 and the front panel 11 and it may be employed to initialize the memory module 2 during power-up.

Referring particularly to FIGS. 1, 12, and 24A, the I/O scanner module 7 is responsible for initializing the programmable controller system during power-up, and for performing tasks associated with its six serial ports and its backplane interface. These functions are coordinated by a scheduler program 650 which is entered from any of four interrupt service routines 651–654 or from any of eight task programs 655–662. The scheduler 650 determines which of the tasks 655–662 should be executed by examining a linked list of task control blocks 663 which are stored in the RAM 426 and indicated at 663. If more than one task is to be executed, the scheduler selects that task having the highest priority. That is, the scheduler examines the task control blocks 663 to determine if the I/O scan task 655 is to be executed, then it determines if the block transfer task 656 is to be executed, followed by the front panel serial driver 657, the backplane driver 658 and the timer utility 659. One of the three tasks 660, 661 or 662 is then given priority and the cycle repeats.

The task control blocks 663 store bits of data which indicate those tasks that are ready to be executed. These bits may be set by any of the tasks or by one of the interrupt service routines 651–654. For example, when the real time clock interrupts every one millisecond, the interrupt service routine 651 is executed to make an entry into the task control block 663 which indicates that the timer utility task 659 is to be executed. This scheduler 650 is then entered, and if no other tasks are ready to run, or if the timer utility 659 has priority, the task 659 will then be executed. An interrupt from the front panel 11 or the serial port on the front panel 11 is serviced by the routine 654 which sets a bit in the task control block 663 for either the front panel task 661 or serial port task 662. When these tasks 661 or 662 are then executed, they interpret commands and may in turn set a bit in the task control block for the front panel driver task 657 which transmits data back to the front panel 11.

When an interrupt occurs as a result of data received from one of the I/O racks 16, the service routine 653 is executed. This I/O rack interrupt service routine 653 not only determines which I/O rack 16 requires service, but it also determines if a block transfer of data from the I/O rack 16 has occurred. If so, the block transfer task 656 is enabled; otherwise, the I/O scan task 655 is enabled. The block transfer function is described in more detail in co-pending U.S. patent application Ser. No. 242,132 which was filed on Mar. 9, 1981, and which is entitled "Programmable Controller for Executing Block Transfer With Remote I/O Interface Racks". The I/O scan task 655 will now be described in connection with a power-up routine 664.

Referring particularly to FIGS. 1, 12 and 24B, the power-up routine in the I/O scanner module 7 is responsible for initializing the programmable controller system during power up. As indicated by process block 700, the first task, however, of the I/O scanner module processor 402 is to execute instructions which initialize the I/O scanner module 7 itself. This includes initialization of the SIOs 406, 407 and 419, the clock circuit 414, the change detect circuit 427 and the RAM 426. The processor 402 then executes instructions indicated by process block 701 to read from each backplane bus module slot to determine what modules are present in the system and which 256K address space they occupy. Instructions indicated by decision block 702 are then executed to determine if an operable programmable controller is configured. If not, the system shuts down.

The I/O scanner module 7 then initializes the sections 620–623 of the memory module 2. More specifically, it creates access control blocks 621 for each module connected to the backplane bus 1 as indicated by process block 703 and it sets up the module status areas 622 as indicated by process block 704. The I/O scanner module 7 also sets the system status counter 606 to the number of modules which require initialization and its sets the I/O prescan counter 610 to the number of I/O scanner modules and I/O bus interface modules present in the system. The power-up routine is then exited and the I/O scan task 655 is entered to complete system initialization.

Figure 24C:
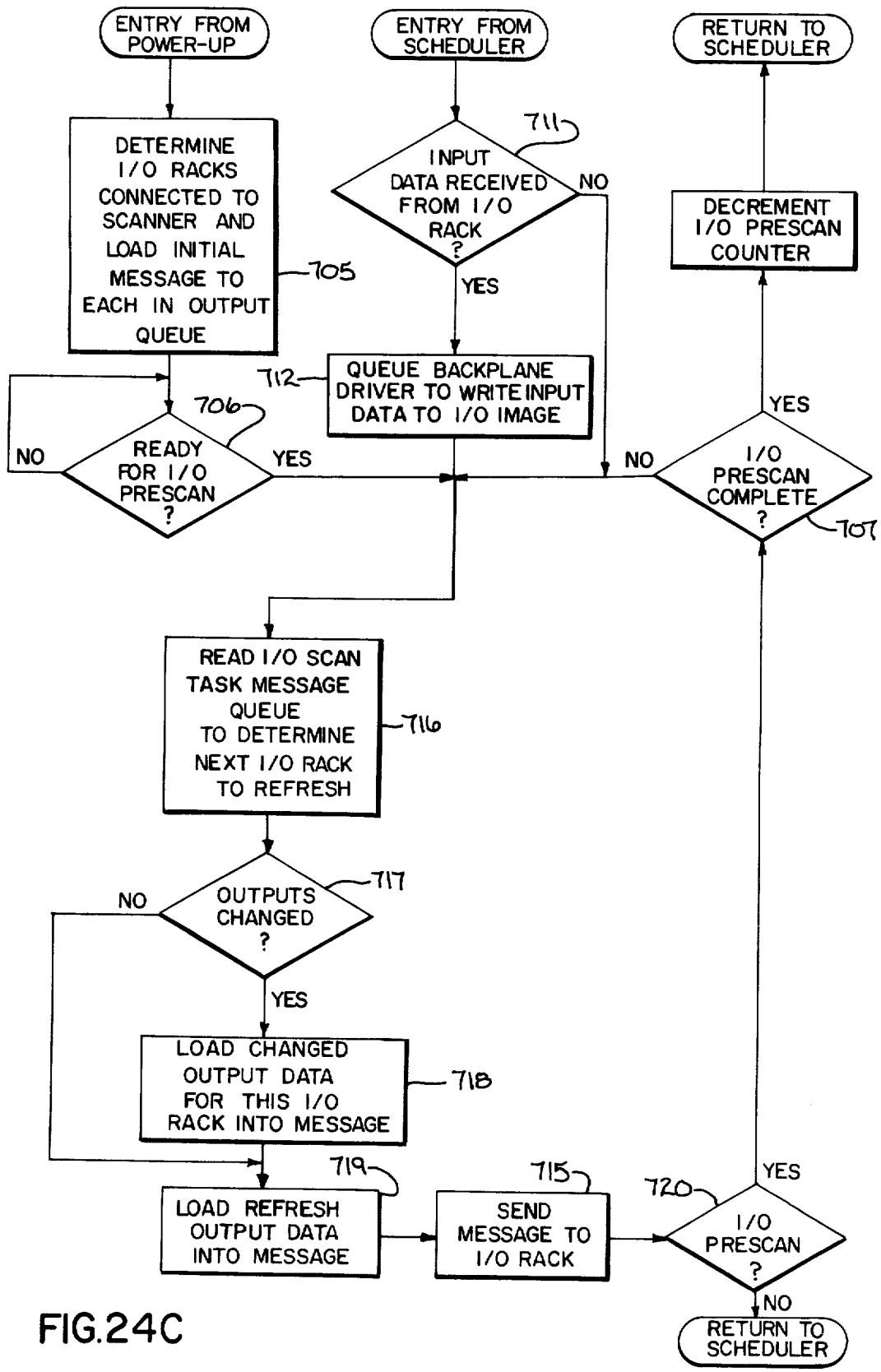

Referring particularly to FIG. 24C, the I/O scan task 655 is entered initially from the power-up program 664. As indicated by process block 705, its first function is to perform an I/O prescan of the I/O racks 16 which are connected to the I/O scanner module 7. More specifically, the adaptors 17 on each I/O rack 16 are interrogated to determine the number and nature of each I/O circuit in the rack 16. Initialization messages are then created and stored in a message queue in the RAM 426 and the module 7 then checks to determine if it can begin the I/O prescan, as indicated by decision block 706.

The I/O scanner module 7 then enters a loop in which messages are output to all I/O racks 16. These initial messages turn all output devices off, and in response, messages are received from each I/O rack 16 which contain data concerning the state of all input devices. When this I/O prescan is complete as determined at decision block 707, the I/O scanner module 7 decrements the I/O prescan counter 610 in the memory module 2 to notify the CPU module 3 that initialization is complete.

Referring particularly to FIGS. 24A and 24C, each time the I/O scanner module 7 receives a message from an I/O rack 16, an interrupt is generated and the I/O rack interrupt routine 653 is executed to queue up the I/O scan task 655. When the I/O scan task is subsequently entered, a check is made at decision block 711 to determine if input data was received. If it was, this data is written into a message queue for the backplane driver task 658 and that task is enabled to write the data to the I/O image table in the CPU module RAM 12 as indicated at process block 712. After the input data has been processed, the I/O scanner module 7 sends output messages to the I/O racks 16. As indicated by process block 716, the message queue for the I/O scan task is examined to determine the next I/O rack 16 to receive refresh output data from the I/O scanner module's output image table. In addition, the change detect RAM 475 is examined to determine if any outputs involving the same I/O rack 16 have been changed. This is accomplished by instructions indicated by decision block 717, and when "change" data is found, it is loaded into the output message queue as indicated by process block 718. As indicated by process block 719, the refresh data is loaded into the output message queue, and it, along with any change data, is sent to the proper I/O rack 16. A test is made at decision block 720 to determine if this is part of the I/O prescan process, and if not, the I/O scanner module 7 returns to the scheduler to perform other tasks.

It should be apparent that in the preferred embodiment of the invention described herein the I/O scanner module 7 performs a substantial portion of the system initialization during power up. It is also possible to program the peripheral processor module 5, the system I/O bus interface module 6, or the CPU module 3 to perform the system initialization functions. It is necessary, however, that one system module initialize the memory module data structures, since it is these data structures which enable the various system modules to operate in a coordinated manner as a programmable controller.

FRONT PANEL

Figure 17:
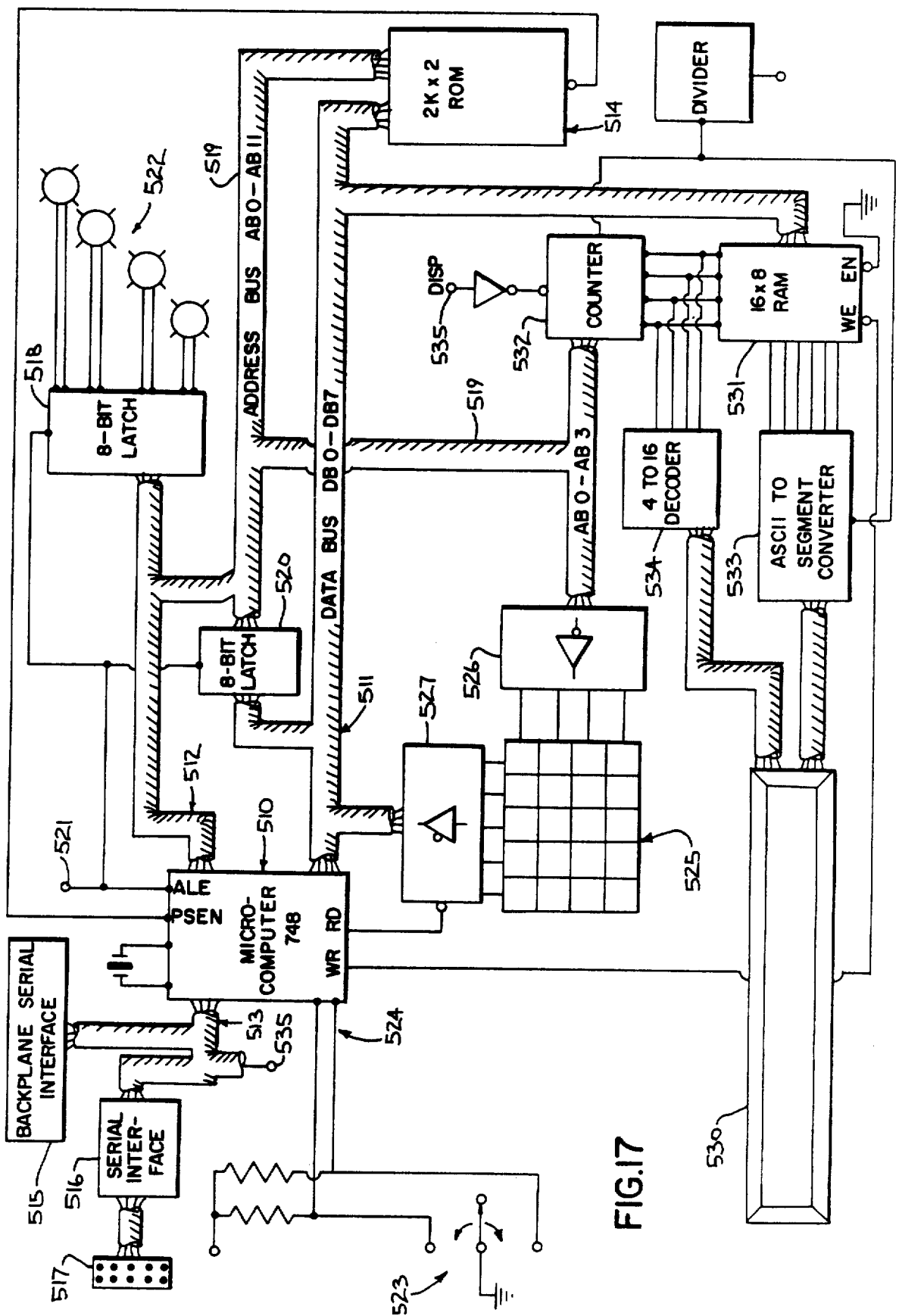
FIG. 17 is an electrical schematic diagram of the front panel interface which forms part of the system of FIG. 1.

Referring particularly to FIGS. 1 and 17, the front panel 11 is mounted on the enclosure door and is connected to the backplane bus 1 by a ribbon connector (not shown in the drawings). The front panel 11 provides the user with a convenient means for inserting data into the programmable controller, reading data from the programmable controller, controlling the programmable controller's mode of operation, provide the user with fault and diagnostic information, and provide a convenient serial data port for communications.

The front panel 11 is structured about an 8-bit microcomputer 510 which drives an 8-bit bidirectional data bus 511 and a pair of 8-bit quasi-bidirectional ports 512 and 513. The microcomputer 510 operates in response to instructions stored both in an internal read-only memory and an external read-only memory (ROM) 514. The microcomputer 510 is programmed to communicate through its port 513 with the two serial communications channels on the backplane bus 1 via a backplane serial interface circuit 515. It is also programmed to communicate through other lines in the port 513 with a serial interface 516 which connects with a connector 517 mounted on the front panel.

The 8-bit port 512 connects directly to an 8-bit latch 518 and four of its lines connect to leads AB8–AB11 in an address bus 519. The other eight leads AB0–AB7 in the address bus 519 connect to the outputs of an 8-bit latch 520, the inputs of which are connected to the data bus 511. An ALE control line 521 clocks both latches 518 and 520 when address data is output by the microcomputer 519. The 8-bit latch 518 drives four dual color light emitting diode (LED) indicators 522. The microcomputer is programmed to energize the indicators 522 and to thereby indicate whether the programmable controller processor is running or not, whether the outputs are enabled or not, and whether remote access to the programmable controller is enabled or not. A memory protect switch 523 is connected to two single-bit inputs 524 on the microcomputer 510, and this is periodically tested to determine the protection mode.

Referring particularly to FIG. 17, one of the major functions of the microcomputer 510 is to scan a twenty-key keyboard 525 and sense the depression of any of its keys. The keyboard is a four by five matrix of switches with four inputs driven by a set of gates 526 which connect to the leads AB0–AB3 in the address bus 519. Five outputs from the keyboard 525 connect to a set of tristate gates 527 and the state of five keyboard switches can be read onto the data bus 511 and into the microcomputer 510 during a read cycle. The microcomputer 510 is programmed to send an appropriate message through the backplane serial interface circuit 515 when it senses a depressed key. A number of modules may receive such messages (i.e., the peripheral processor module 5 or the system I/O scanner module 7) and respond by carrying out specific functions. Some of those functions include sending messages back to the front panel interface 11 for display to the user.

The microcomputer 510 is also programmed to display data on a sixteen-character alpha-numeric display 530. Data to be displayed is output by the microcomputer 510 and written into a random access memory (RAM) 531. A counter 532 connects to the address lines on the display RAM 531, and as it counts it sequentially outputs 6-bit ASCII characters from the RAM 531 to a converter circuit 533. The converter circuit 533 applies a signal to the display 530 to form the character which corresponds to the ASCII input code. A 4-line-to-16-line decoder 534 connects to the output of the counter 532 and it sequentially enables the sixteen LED display devices in synchronism with the ASCII characters output from the display RAM 531. The display 530 is thus continuously "refreshed" with the contents of the display RAM 531. The counter 532 may be preset to address one of the 16 lines in the display RAM 531 when a control line 534 and a 4-bit address is generated on leads AB0–AB3 of the address bus 519. Any one of the sixteen ASCII characters can thus be changed by writing to the addressed line.

SYSTEM COMMUNICATIONS

Figure 26:
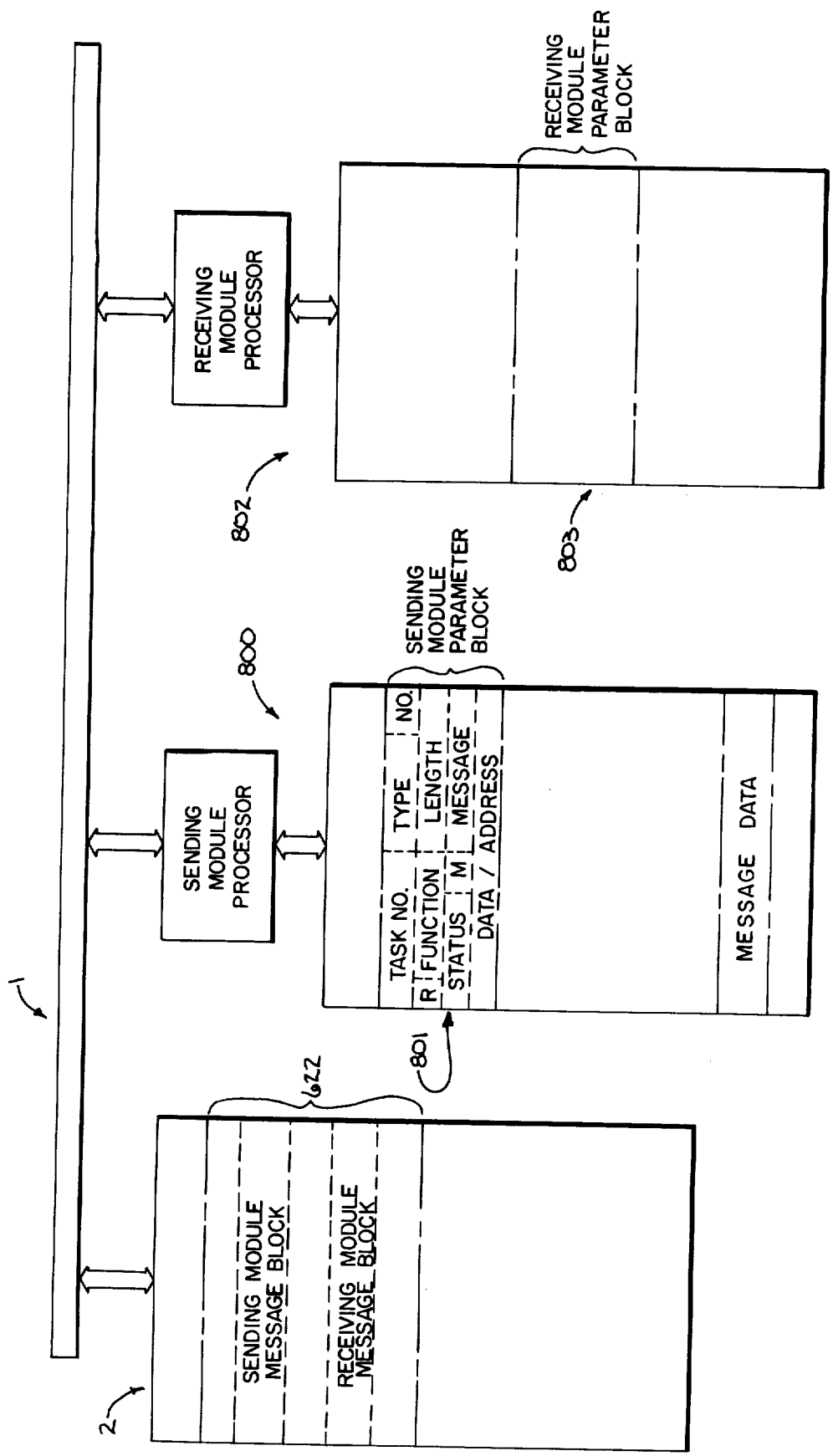
FIG. 26 is a schematic representation of a portion of the system of FIG. 1 used to describe the communication of messages between modules connected to the system backplane bus.

Referring particularly to FIGS. 1, 19C and 26, communication between the modules on the backplane bus 1 is established using the module status blocks 622 stored in the memory module 2. The CPU module 3, the system I/O interface module 6, the peripheral processor module 5, the system I/O scanner module 7 or the communications network module 4 may originate, or send, a message over the backplane bus 1 and any of these same modules may be the designated destination, or receiving, module. As described above with respect to the system I/O scanner module 7, these modules may perform more than one task, and hence the message may originate from a particular task within one module and be received by a particular task in another module. The proper transmission and receipt of messages is carried out by a message handler task on each module which will now be described in more detail.

Referring particularly to FIGS. 19C and 26, when a sending module 800 wishes to send a message to another module, 802, its message handler creates a parameter block 801 and writes the address of that block 801 into the status block 622 for the receiving module 802. More specifically, the sending module message handler loads the parameter block address into the message address portion of the module status block 622 at the location indicated by its "next-in pointer". The sending module message handler then increments the "next-in pointer" and generates the interrupt address of the receiving module 802 on the system backplane bus 1.

The receiving module 802 includes a backplane message interrupt routine which is executed when the receiving module's interrupt address appears on the backplane bus 1. This routine examines its module status block 622 stored in the memory module 2 to obtain the backplane address indicated by the "next-out pointer". Using this address the receiving module 802 reads the parameter block 801 from the sending module's memory, writes a copy 803 in its own memory, and updates the next-out pointer. The task in the receiving module for which the message is intended is notified of the message, and when that task is subsequently executed, it responds to the message. One response is to reply to the message by altering the receiving module parameter block 803, placing its address in the sending module's message block 622, and generating the sending module's interrupt address on the system backplane bus 1. The sending module services this interrupt by coping the receiving module parameter block 803 back to its own memory at 801 where the appropriate sending module task can operate on it. Two way communications is thus established and is "transparent" to the tasks on each module.

Referring still to FIG. 26, the parameter blocks which are employed to communicate between backplane modules may themselves contain the message data, or they may point to message data eleswhere in the system. Each parameter block contains the following data.

TASK NO.: An eight-bit number indicating the task or "virtual channel" with which communications is to be established.

TYPE: A four-bit number indicating the sender module type.

NO.: A four-bit number indicating which one of that type of module is the sender.

R: One bit which indicates whether the message is a send or reply.

FUNCTION: A seven-bit number indicating a particular function the receiving module is to perform. For example:

0 = read data
1 = write data
9 = open gap in control program
10 = close gap in control program
14 = insert macroinstruction in control program
15 = delete macroinstruction in control program LENGTH: An eight-bit number indicating the number of message data words.

STATUS: A four-bit number employed by the receiving module to reply to the sending module. For example:

0 = success, no error
1 = too much message data
2 = no action performed
3 = cannot perform function
4 = address does not exist M: Two-bit number indicating that the message data is at the receiving module (0), the message data is elsewhere in the system (1), or the message data is contained in the parameter block (2).

Message Data/Address: This field contains either message data or an address which points to the message data.

Referring particularly to FIG. 1, it should be apparent that certain programmable controller functions involving more than one backplane module are carried out regularly using the above-described communication technique. For example, when the control program is being created and edited using the programming terminal 8, communications between the peripheral processor module 5 and the CPU module 3 is established to carry out commands entered by the user. The peripheral processor task which interprets user commands entered through the terminal 8 communicates regularly with the CPU module 3 to carry out many of the editing functions. For example, if the user elects to delete a macroinstruction from the control program stored in the memory module 2, the peripheral processor task creates a parameter block which indicates a delete function and which identifies the address of the macroinstruction to be deleted. This parameter control block is copied into the CPU module 3 and the CPU module 3 carries out the delete function. The CPU module 3 then replies to the peripheral processor task that the function has been completed by altering the parameter block and passing it back to the peripheral processor module 5.

| Reference No. | Description |
|---|---|
| Component Appendix - Peripheral Processor | |
| 225 | 16-bit microprocessor AMZ8002 manufactured by Advanced Micro Devices, Inc. |
| 260 | 8-bit micorporcessor Z80 manufactured by Zilog, Inc. |
| 202 | Sixteen 4K×1 static RAM 2141 manufactured by Intel, Inc. |
| 207, 208 | Serial Input/Output (SIO) manufactured by Zilog, Inc. |
| 210, 211 | Counter Timer Circuit (CTC) manufactured by Zilog, Inc. |
| 216, 217, 218, 219, 227 | Quadruple bus transceivers 74LS243 manufactured by Texas Instruments, Inc. |
| 228 | Octal D-type transparent latch 74LS373 manufactured by Texas Instruments, Inc. |
| 237 | Four 8K×8 UVPROMS TMS 2564 manufactured by Texas Instruments, Inc. |
| 238 | Sixteen 4K×1 static RAM 2141 manufactured by Intel, Inc. |
| 241 | 32×8 PROM 82S123 manufactured by Signetics, Inc. |
| 247 | 3-to-8 Line Decoder 74LS138 manufactured by Texas Instruments, Inc. |
| 266, 275 | 2-to-4 Line Decoder 74LS139 manufactured by Texas Instruments, Inc. |
| 262 | 2K×8 UVPROM 2716 manufactured by Intel, Inc. |
| 263 | Two 1K×4 static RAMs 2114 manufactured by Intel, Inc. |
| 272 | Quadruple 2-line-to-1-line multiplexer 74LS257 manufactured by Texas Instruments, Inc. |
| 279 | 8-bit addressable Latch 74LS259 manufactured by Texas Instruments, Inc. |
| 300, 301 | Four, Quadruple 2-line-to-1-line multiplexers 74LS157 manufactured |

-continued

| Reference No. | Description |
|---|---|
| | by Texas Instruments, Inc. |
| 321 | Octal D-type transparent Latch 74LS374 manufactured by Texas Instruments, Inc. |
| 329 | Octal D-type transparent Latch 74LS373 manufactured by Texas Instruments, Inc. |
| 320, 326 | Four octal bus transceivers 74LS245 manufactured by Texas Instruments, Inc. |
| 327 | Hex bus drivers with 3-state outputs 74 367 manufactured by Texas Instruments, Inc. |
| 340 | Two 4-bit magnitude comparators 74LS85 manufactured by Texas Instruments, Inc. |
| 349 | 8-bit parallel-out serial shift register 74LS164 manufactured by Texas Instruments, Inc. |
| 368 | Hex D-type flip-flops 74174 manufactured by Texas Instruments, Inc. |
| Component Appendix - Central Processor | |
| 54, 89, 189 | Quadruple D-type flip-flops 74LS175 manufactured by Texas Instruments, Inc. |
| 33 | Microprogram Controller AM2910 manufactured by Advanced Micro Devices, Inc. |
| 42 | 2K×4 PROM 82S185 manufactured by Signetics, Inc. |
| 31, 41 | 2K×8 PROM 82S191 manufactured by Signetics, Inc. |
| 32, 47, 58, 116, 117, 130 131, 132, 139, 73 | Octal D-type transparent flip-flops 74LS374 manufactured by Texas Instruments, Inc. |
| 39 | Octal D-type flip-flop 74LS273 manufactured by Texas Instruments, Inc. |
| 46, 48, 80, 161, 112 | Octal buffers & line drivers 74LS244 manufactured by Texas Instruments, Inc. |
| 43 | Two 32×8 PROMS 82S123 manufactured by Signetics, Inc. |
| 26 | Four 4-bit bipolar microprocessor slices AM2903 manufactured by Advanced Micro Devices, Inc. |
| 51 | Data selector/Multiplexer 74LS151 manufactured by Texas Instruments, Inc. |
| 109, 113, 138 | Octal D-type transparent Latch 74LS373 manufactured by Texas Instruments, Inc. |
| 140, 63, 76 | Four synchronous 4-bit counters 74 LS163 manufactured by Texas Instruments, Inc. |
| 67 | Dual 4-bit binary counters 74LS393 and Dual 4-bit decode counters 74LS390 manufactured by Texas Instruments, Inc. |
| 83-88 | Dual D-type positive edge triggered flip-flops 74S74 manufactured by Texas Instruments, Inc. |
| 102 | 8-bit addressable latch 74LS259 manufactured by Texas Instruments, Inc. |
| 91 | 8-line-to-3-line priority encoder 74LS148 manufactured by Texas Instruments, Inc. |
| 105 | Two 32×8 PROMs 82S123 manufactured by Signetics, Inc. |
| 150 | Two 4-bit magnitude comparators 74S85 manufactured by Texas Instruments, Inc. |
| 184, 185 | Four-bit shift registers 74S194 manufactured by Texas Instruments, Inc. |
| 196 | Synchronous 4-bit counter 74LS163 manufactured by Texas Instruments, Inc. |
| Component Appendix - I/O Scanner | |
| 406, 407, 418 | Serial Input/Output (SIO) manufactured by Zilog, Inc. |
| 425 | Four 8K×8 UVPROMS TMS 2564 manufactured by Texas Instruments, Inc. |
| 426 | Sixteen 4K×1 static RAM 2141 manufactured by Intel, Inc. |
| 430 | 16-bit microprocessor AMZ8002 manufactured by Advanced Micro Devices, Inc. |
| 431 | Bidirectional data gates SN74LS243 manufactured by Texas Instruments, Inc. |
| 432 | Octal D-type Latches SN74LS373 manufactured by Texas Instruments, Inc. |
| 445, 446, 448 | Decoder/demultiplexer SN74LS138 manufactured by Texas Instruments, Inc. |
| 472, 473 | Counter Timer Circuit (CTC) manufactured by Zilog, Inc. |
| 477 | Three-state octal buffers SN74LS240 manufactured by Texas Instruments, Inc. |
| 478 | Four-bit bistable latch SN74LS75 manufactured by Texas Instruments, Inc. |
| 479 | AND-OR-INVERT gates 74LS51 manufactured by Texas Instruments, Inc. |
| 476, 480 | Decoder/demultiplexer SN74LS139 manufactured by Texas Instruments, Inc. |
| 487 | DMA Controller AM 9517A manufactured by Advanced Micro Devices, Inc. |
| 485, 501 | Quad latches SN74LS279 manufactured by Texas Instruments, Inc. |
| 500 | Octal D-type Latch SN74LS373 manufactured by Texas Instruments, Inc. |
| 475 | 16×4 RAM 82S25 manufactured by Signetics, Inc. |
| Component Appendix - Front Panel | |
| 510 | Eight-bit microcomputer 8748 manufactured by Intel, Inc. |
| 518 | Octal D-type latch SN74LS374 manufactured by Texas Instruments, Inc. |
| 520 | Octal D-type latch SN74LS373 manufactured by Texas Instruments, Inc. |
| 526 | Hex inverter buffer/driver SN7406 manufactured by Texas Instruments, Inc. |
| 527 | Octal 3-state buffers SN74LS240 manufactured by Texas Instruments, Inc. |
| 531 | Two 16×4 RAM 82S25 manufactured by Signetics, Inc. |
| 532 | Presettable binary counter SN74LS197 manufactured by Texas Instruments, Inc. |
| 514 | 2K×8 UVPROM 2716 manufactured by Intel, Inc. |
| 534 | Decoder/demultiplexer SN74LS138 manufactured by Texas Instruments, Inc. |

Appendix A

Microfield Definition

| Mnemonic | Control Lines & Device | Description |
|---|---|---|
| JUMP3 | microsequencer 33 | If register counter is not zero and condition is false, load PC from |

Appendix A-continued

Microfield Definition

| Mnemonic | Control Lines & Device | Description |
|---|---|---|
| | | stack. When register counter is zero and condition is false, load PC from bus 44. If condition is true, increment PC. |
| CONT | microsequencer 33 | Increment PC. |
| LOOP | microsequencer 33 | If condition is true, increment PC. Otherwise put stack in PC. |
| LOAD | microsequencer 33 | Load register counter from bus 44. |
| RET | microsequencer 33 | Pop stack and load in PC. |
| AGAIN | microsequencer 33 | Loop until register counter is zero then load PC from bus 44. |
| BACK | microsequencer 33 | Same, but load PC from stack. |
| JUMP2 | microsequencer 33 | If condition true, load PC from bus 44. Otherwise, load PC from register counter. |
| VECT | microsequencer 33 | Input microaddress from bus 44. |
| CALL2 | microsequencer 33 | Same as JUMP2, but save PC on stack. |
| PUSH | microsequencer 33 | Load register counter from bus 44, push PC on stack. |
| JUMP | microsequencer 33 | Input microaddress from bus 44. |
| MAP | microsequencer 33 | Input microaddress from bus 44. |
| CALL | microsequencer 33 | Push address to stack, get target from bus 44. |
| RESET | microsequencer 33 | Force PC to zero, clear stack pointer. |
| PIPE | data selector 45 | Select data from bus 44. |
| ALV16 | data selector 45 | Select data from bus 44 and bus 40 and put on bus 44. |
| MACRO | data selector 45 | Select data from bus 44 and ALU port 30. |
| IVECT | Interrupt interface 52 | Enable microaddress on to bus 44. |
| ALU | Gates 56 | Couple microaddress from ALU 26 to bus 44. |
| MAP | MAP ROM 41 | Enable microaddress on to bus 44. |
| VECT | VECTOR ROM 42 | Enable microaddress on to bus 44. |
| INSTR | Gates 46 | Couple macroinstruction to ALU port 27 |
| DATA | Gates 48 | Couple data from bus 22 to ALU port 27. |
| RAM | Gates 48 | Couple data from bus 22 to ALU port 27. |
| BFLOP | | Swap high and low bytes in ALU registers. |
| TIME | control line 75 | Read real time clock latch 73. |
| TIME | control line 81 | Read scan counter gates 80. |
| FLAGS | | Read status of flags saved in register. |
| ADDR | address latch 47 | Store address data in latch 47. |
| BACKL | control line 135 | Store LSB of address in latch 131. |
| FETHI | control line 144 | Store MSB of address |
| BACKH | control line 136 | Store MSB of address in latch 132. |
| FETCH | control line 141 | Load address in macro counter 140. |
| DATA | data latch 58 | Store data in latch 58. |
| BACKD | control line 133 | Store data in latch 130. |
| IRES | control line 108 | Enable decoder 107 to reset interrupt. |
| SYST | | Control backplane lines. |
| TIME | control line 77 | Store time in scan counter 76. |
| IMASK | control line 103 | Enable addressable latch 102. |
| ILOAD | control line 123 | Load prefetched macro in register 39 |
| IMM | Gates 57 | Couple macroinstruction data to ALU port 28. |
| MASK | Bit Pointer ROM 43 | Generate bit pointer mask to ALU port 28. |
| NMASK | Bit Pointer ROM 43 | Generate inverted bit pointer mask. |
| HOLD | control line 185 | Activate backplane HOLD line 175. |
| BWH | control lines 185 and 187 | Activate backplane write line and hold it. |
| BRH | control lines 185 and 186 | Activate backplane read line and hold it. |
| WRITE | control line 164 | Write data on CPU bus 22. |
| READ | control line 166 | Read data on CPU bus 22. |
| BACKW | control line 187 | Write data on backplane bus 1. |
| BACKR | control line 186 | Read data on backplane bus 1. |
| ZER | | Set carry to zero. |
| ONE | | Set carry to one. |
| ZFL | | Set carry to ALU zero flag state. |
| CAR | | Set carry to carryout of previous ALU operation. |
| TRUE | STATUS MUX 51 | Was the result true? |
| FALSE | STATUS MUX 51 | Was the result false? |
| INTER | STATUS MUX 51 | Is an interrupt request present? |
| PARITY | STATUS MUX 51 | Is a parity error indicated? |
| CARRY | STATUS MUX 51 | Was there a carry? |
| NCARR | STATUS MUX 51 | Was there no carry? |
| OVER | STATUS MUX 51 | Was there an overflow? |
| MOVER | STATUS MUX 51 | Was there no overflow? |
| MINUS | STATUS MUX 51 | Was the result minus? |
| PLUS | STATUS MUX 51 | Was the result not minus? |
| ZERO | STATUS MUX 51 | Was the result zero? |
| NZERO | STATUS MUX 51 | Was the result not zero? |

We claim:

1. A programmable controller which comprises:
a backplane bus having leads for conducting data signals, leads for conducting address signals, and leads for conducting control signals;
a memory module connected to the leads in the backplane bus for conducting data, address and control signals and including means for storing a control program comprised of a set of macroinstructions, and means for storing a data table;
a CPU module connected to the leads in the backplane bus for conducting data, address and control signals and including
(a) CPU arbitration means for obtaining access to the backplane bus,
(b) fetch means coupled to the CPU arbitration means and being responsive to a FETCH signal to generate address and control signals on the backplane bus and to thereby obtain a macroinstruction from the control program in said memory module through the backplane bus and store it in a macroinstruction register,
(c) memory means for storing an I/O image table, (d) CPU processor means coupled to said fetch means, said memory means and said CPU arbitration means, said processor means being operable to repeatedly execute the control program by sequentially executing macroinstructions in said macroinstruction register and generating FETCH signals to said fetch means, and in doing so, to read and write data to the I/O image table in said memory means and to read and write data to the data table in said memory module through said CPU arbitration means and said backplane bus.

2. The programmable controller as recited in claim 1 which includes an I/O scanner module connected to the leads in the backplane bus for conducting data, address and control signals and in which the I/O scanner module includes;
 (a) scanner arbitration means for obtaining access to the backplane bus,
 (b) scanner processor means coupled to the scanner arbitration means and being operable to input data from sensing devices connected to the programmable controller and to couple the input data to the I/O image table in the CPU module through the scanner arbitration means and backplane bus.

3. The programmable controller as recited in claim 2 in which the memory module includes means for storing data indicative of the status of the CPU module and the I/O scanner module and each of said modules includes means for reading the status data of the other module from the memory module.

4. The programmable controller as recited in claim 2 in which the I/O scanner module includes an output image storage means, the CPU processor means is operable to write output data to said output image storage means through said backplane bus and said scanner processor means is operable to couple said output data from said output image storage means to output devices connected to the programmable controller.

5. The programmable controller as recited in claim 2 which includes a peripheral processor module connected to the leads in the backplane bus for conducting address, data and control signals, and in which the peripheral processor module includes,
 (a) peripheral processor arbitration means for obtaining access to the backplane bus,
 (b) an input/output port for conveying data to and from a peripheral device, and
 (c) peripheral processor processor means coupled to the peripheral processor arbitration means and said input/output port, said peripheral processor processor means being operable to input data through said input/output port and apply it to other modules connected to the backplane bus and to read data from other modules connected to the backplane bus and output it through said input/output port.

6. The programmable controller as recited in claim 1 in which the fetch means includes a plurality of macroinstruction latches connected to said macroinstruction register, and macroinstructions are obtained from the control program and stored in said macroinstruction latches while previous macroinstructions are still being executed.

7. The programmable controller as recited in claim 2 which includes a communications network module connected to the leads in the backplane bus for conducting address, data and control signals, the communications network module being operable to couple data between a serial data highway and other modules connected to the backplane bus.

8. The programmable controller as recited in claim 2 which includes a front panel circuit for inputting data and displaying data and the front panel circuit connects to dedicated control leads in the backplane bus which connect the front panel circuit to another module in the programmable controller.

9. A programmable controller which comprises:
 processor means for executing a control program to operate output devices connected to the programmable controller; and
 I/O scanner means connected to the processor means and coupled to the output devices, the I/O scanner means including:
  (a) means for storing an output image table which indicates the desired state of the output devices;
  (b) refresh means for continuously and sequentially coupling the output image table data to corresponding output devices;
  (c) means for coupling data indicative of changes in the state of output devices from the processor means to locations in the output image table storing means;
  (d) means coupled to the last named means for detecting the state changes made in the output image table by the processor means; and
  (e) output means coupled to the means for detecting state changes in the output image table, and being operable in response to such a detected state change in a selected output image table location to output image table data to the corresponding output device and to thereby update its state.

10. The programmable controller as recited in claim 9 in which the means for storing the output image table is a random access memory having separately addressable locations, the means for coupling data from the processor means to the output image table generates the address of the location to be changed in the random access memory and generates a memory write signal, and the means for detecting such state changes made in the output image table includes:
 change storage means for storing data indicative of a change in the sensed output image table memory address when such sensed address is accompanied by a memory write signal.

11. The programmable controller as recited in claim 10 in which the means for detecting state changes made in the output image table further includes means coupled to the change storage means for erasing a change indication for an output image table memory address when the address is sensed during the generation of a memory read signal.

12. A programmable controller, the combination comprising:
 a plurality of separate, asynchronously operating functional modules connected to a common backplane bus, each functional module including:
  (a) arbitration means for obtaining control of the backplane bus to perform a read or write operation with another functional module;
  (b) message storage means for storing data, said message storage means having designated backplane address;

(c) message handler means coupled to the arbitration means and the message storage means for coupling message data between its message storage means and the message storage means on another functional module; and memory means coupled to the backplane bus for storing a plurality of module message blocks, each module message block being associated with a respective one of the functional modules, and each module message block including:
  (d) means for storing a backplane interrupt address which may be read by other functional modules and employed by them to indicate that message data is available for the associated functional module; and
  (e) means for storing the backplane address of message data which is available for the associated functional module;
wherein the message handler means for one of said functional modules which is sending message data to another one of said functional modules on the backplane bus is operable to store the backplane address of the message data in the module message block for the receiving functional module and is operable to read the receiving module's interrupt address from its module message block and generate the same on the backplane bus to interrupt the receiving functional module and to thereby notify the receiving module that message data is available for it.

13. The programmable controller as recited in claim 12 in which the message storage means in each functional module includes means for storing a parameter block which contains data that identifies the sending functional module and which indicates a function that is to be performed by the receiving functional module.

14. In a control system having a plurality of backplane slots and a plurality of separate, asynchronously operating functional modules located in the backplane slots and connected to a common backplane bus and in which each module is operable through arbitration means for gaining control of the backplane bus to perform a read or write operation with another module connected to the backplane bus, the improvement therein comprising:
  a memory module connected to the backplane bus and storing data structures associated with functional modules connected to the backplane bus, each such data structure including means for storing the backplane bus address of its associated functional module; and
  power-up means connected to the arbitration means on one of said functional modules, the power-up means including means for examining each backplane slot to determine the presence of each functional module in the control system, and means for establishing a data structure in the memory module for each functional module which is present and for writing the backplane address of each such functional module into its associated data structure.

15. The control system as recited in claim 14 in which the power-up means also determines the type of each functional module connected to the backplane bus and the means for establishing a data structure also writes data into the functional module's associated data structure which indicates its type.

16. The control system as recited in claim 14 in which the power-up means includes means coupled to the examining means and responsive to the examining means for determining if the functional modules connected to the backplane bus provide an operable control system.

17. A programmable controller which comprises:
  a backplane bus having leads for conducting data signals, leads for conducting address signals, and leads for conducting control signals;
  a memory module connected to the leads in the backplane bus and including means for storing an I/O image table which indicates the state of sensing devices and operating devices connected to the programmable controller;
  I/O scanner means connected to the leads in the backplane bus and being operable to periodically couple data between the I/O image table and the operating devices and sensing devices connected to the programmable controller;
  a CPU module connected to the leads in the backplane bus and being operable in response to the instructions in a control program to examine the state of the I/O image table and to alter the state of the I/O image table in accordance with the logic embodied in the control program; and
  a peripheral processor module connected to the leads in the backplane bus and including means for inputting data from a terminal and means responsive to the input data and a stored program for writing data to the I/O image table which alters the state thereof, and
  in which the CPU module, I/O scanner means and the peripheral processor module each include arbitration means coupled to the leads in the backplane bus and the arbitration means are operable to enable only one of the CPU module, I/O scanner means or peripheral processor module to access the I/O image table in the memory module at any single moment.

* * * * *